(12) United States Patent
Lei et al.

(10) Patent No.: US 12,543,743 B2
(45) Date of Patent: Feb. 10, 2026

(54) KERATINOLYTIC POLYPEPTIDES AND METHODS OF USE

(71) Applicant: CORNELL UNIVERSITY, Ithaca, NY (US)

(72) Inventors: Xingen Lei, Ithaca, NY (US); Madeleine Keefe, Trumansburg, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 467 days.

(21) Appl. No.: 18/019,660

(22) PCT Filed: Aug. 3, 2021

(86) PCT No.: PCT/US2021/044385
§ 371 (c)(1),
(2) Date: Feb. 3, 2023

(87) PCT Pub. No.: WO2022/031733
PCT Pub. Date: Feb. 10, 2022

(65) Prior Publication Data
US 2024/0180166 A1   Jun. 6, 2024

Related U.S. Application Data

(60) Provisional application No. 63/219,129, filed on Jul. 7, 2021, provisional application No. 63/060,447, filed on Aug. 3, 2020.

(51) Int. Cl.
*A01N 63/50* (2020.01)
*A01P 7/04* (2006.01)
*C12N 9/64* (2006.01)

(52) U.S. Cl.
CPC ............. *A01N 63/50* (2020.01); *A01P 7/04* (2021.08); *C12N 9/6405* (2013.01)

(58) Field of Classification Search
None
See application file for complete search history.

(56) References Cited

U.S. PATENT DOCUMENTS

2004/0191759 A1   9/2004   Abrahmsen et al.
2012/0087862 A1   4/2012   Hood et al.
2012/0301945 A1   11/2012  Madison

OTHER PUBLICATIONS

International Search Report and Written Opinion for Corresponding Application No. PCT/US2021/044385 (mailed Feb. 2, 2022).
Eriksson et al., "The Yellow Mealworm (*Tenebrio molitor*) Genome: A Resource for the Emerging Insects as Food and Feed Industry," J. of Insects as Food and Feed 6(5): 445-455 (2020).
"Hypothetical Protein GEV33_013986 [Tenebrio molitor]" [online database] [retrieved on Jan. 7, 2022] Retrieved from National Center for Biotechnology Information GenBank Database (https://www.ncbi.nlm.nih.gov/protein/KAH0808807.1?report=genbank&log$protalign&blast_rank=1&RID=XHD60WWC01R); GenBank Accession No. KAH0808807.1.
Tribolium Genome Sequencing Consortium, "The Genome of the Model Beetle and Pest Tribolium castaneum," Nature 452:949-955 (2008).
"Membrane-Bound Transcription Factor Site-1 Protease-Like Protein [Tribolium castaneum]," [online database] [retrieved on Jan. 7, 2022] Retrieved from National Center for Biotechnology Information GenBank Database (https://www.ncbi.nlm.nih.gov/protein/EFA00011.2?reoport=genbank&log$protalign&blast_rank=4&RID=XHDPY4EP013); GenBank Accession No. EFA00011.2.

*Primary Examiner* — Anand U Desai
(74) *Attorney, Agent, or Firm* — Troutman Pepper Locke LLP (Rochester)

(57) ABSTRACT

Embodiments described herein relate to a recombinant nucleic acid construct comprising a nucleic acid molecule encoding a polypeptide having at least 90% sequence identity with the amino acid sequence, or fragment thereof, of SEQ ID NO:2; SEQ ID NO:4; SEQ ID NO: 6; SEQ ID NO:8; SEQ ID NO: 10; SEQ ID NO: 12; SEQ ID NO: 14; or SEQ ID NO: 16, as well as keratin-degrading compositions, methods of recombinantly producing a polypeptide, and methods of degrading keratin.

40 Claims, 25 Drawing Sheets

Specification includes a Sequence Listing.

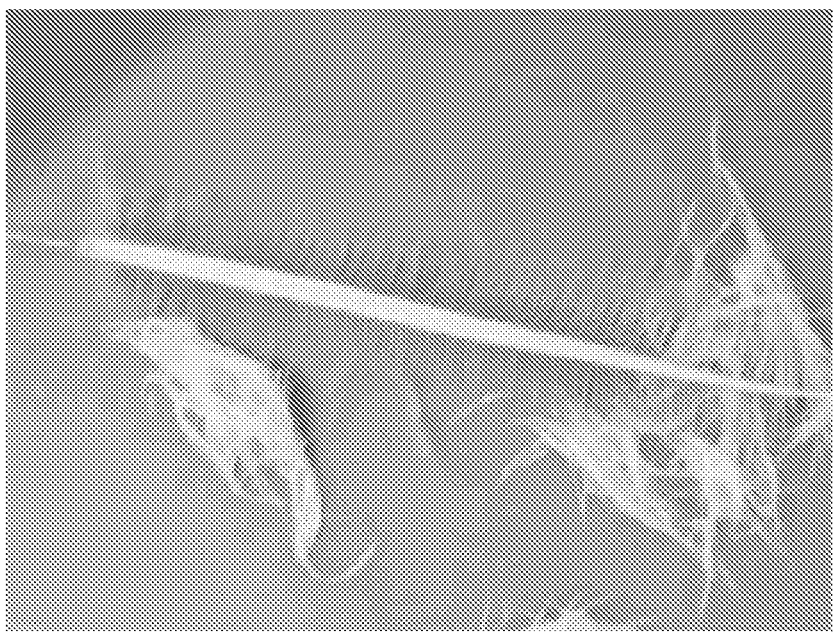
FIG. 10

MALVKYVIIQLLFLLTNSIIYCNLTQKYNETNTEDNLESPLCCNLTTTQRVEVEYSSKLI
ENEYIVTFNGYYKNQARASYINTALNTSGIHKWKILSRENPASDYPSDFDVVILEDTDKL
IGLNALKDHPSVKRVTSQRMVLRTLKFIDAENIRRGPSSLNHNNQFWQATGPHTSPRLLR
AIPRQITSVLQADSLWNMGITGKGIKVAVFDTGLSKSHPHFRKIKERTNWTNEKTLDDGL
GHGTFVAGVIASSKECLGFAPDSELHIPRVFTSNQVSYTSWFLDAFNYAILKKINVLNLS
IGGPDFKDHPFVDKVWELTANRVIMVSAIGNDGPLYGTLNNPADQMDVIGVGGITFEDQI
AKFSSPGMPTWELPQGTEIILLIFMI* (SEQ ID NO: 2)

| BLAST Hit: | % Amino Acid Identity |
|---|---|
| XP_008192180.1 | 86.170 |
| XP_008192186.1 | 86.170 |
| EFA00011.2 | 86.992 |
| XP_017781877.1 | 85.215 |
| KYB28740.1 | 86.992 |

MKLIVLAVLIVAAAASSRIRYDNYQVFRVTPTEQKHLDALKELEGTGYSFWTDVAGLNKP
VDILVAPHLLSNFEDVRSLDLQTEVYIEDVQTLIDRQMPPETNLPARQVTWTKYHTLDD
INNWLQSLAQTYPQNVKVIIGGKSHEQRNIVGVHVSFSASNANRAIFIEGGIHAPEWIAP
ATVTYFLNQLLTSKDASIRAIAERHDWYIFFVVNPDGYVYTFTRDRLWRKTRVPYGTCYG
ADPNRNWNYHWNEVGASNNPCAETYAGPRAFSEPCTRTLSQYIGTIASKLVGYIAFHSYS
QLLLIPYGHSSAHVENYNELYSVGLKAATALSKRYGTRYKVGNIVEVIYAAAGGSMDWVK
GTYKTRLTYTYELRDTGPHGFLLPPDQILPNSLEVLDSLVAIFNEFK* (SEQ ID NO: 4)

| BLAST Hit: | % Amino Acid Identity |
|---|---|
| XP_971346.1 | 61.22 |
| XP_017769856.1 | 59.02 |
| XP_019872101.1 | 58.39 |
| XP_019878495.1 | 58.39 |
| AEC83772.1 | 57.46 |

MTFRDNPLYDFWTPVRLASKTDIMVSPLEQEVFESFLIYHDFKYTIRINNVQDTIEAERM
TQRLIEDVPEGKISFTKYHRYADILAYVRQLASQYPNLVSVETIGKSTENRDLVMVKISS
GGSGKPAILIDGTIHAREWIAPAMVLYIIQELVENPSNSALIKDVDWHILPVINPDGYEY
SHVTNRMWRKTRSRGSRCFGVDGNRNFDFHWGEVGASSDECSETYKGPTPFSEPETRALR
DYVKKNPNKFKLYLTFHSYGQYLLYPWGYTSALPSNARELQSLGESVGRAIQAIAGTKYK
VGSSTNVLYAAAGGSDDWVMGVGGVSLPYTIELPGGGVNGFDLPPSRILPVAKETFEGVK
VFYNYVPNL (SEQ ID NO: 6)

| BLAST Hit: | % Amino Acid Identity |
|---|---|
| RZC35009.1 | 58.56 |
| XP_012260690.1 | 57.89 |
| XP_018335420.1 | 56.83 |
| KAF5297196.1 | 56.67 |
| XP_031348143.1 | 56.55 |

FIG. 11

MGEAVLRAFELHTGVNYTLPKMDQIAMPHFSAGAMENWGLVIYRQTALLYNNRTSTTAHK
ESVLSIIAHEFAHQWFGDLVSPLWWKYLWLNEGFASIYDPIIRDKVKPDWRVLERYVLTL
HSLFNTDGGQNTRPMTSDVYSPAEIGSIFDNISYGKSACVIRMLLNAITDRVFREGIKIY
LLDRAFAAADSYDLWNGLQKAVDQNNMNLSISTLMRTWENQKGYPIIYVRRNYGDLAEI
TQERYLNLNPTPNDTSRWYIPINYATRNNFNFSETAATDWINPNSSYVLKTGANANDWLI
VNKQQTGYYRVNYDNTNWNLIATYLNTSDYDKIHLINRAQLINDAFSLAKSRRLNYSVAL
QLTNYLDRETDVPLHAFFNILNDFSAIAAGAQNYSLFEKRLENILDKAVAELGIREKGH
SDKDHVDNLNRIDVINKACEWGNKRCFSLATQALNNIHAISVDLQGVVLCAGIRNAPEYL
WREIHKQSSNTSLDSTLRSYLNIALGCSHNESILSLYLDAAVDQKVSVFSNIYSKGSFGV
KFIFKYILNNFENIYSKLGAAETGLQIKQISLYLRTNEQLRLLKELQTSNKHPDVVQDFI
LAVNNAENNIAAAKGYWDDISLWIQSTLA (SEQ ID NO: 8)

| BLAST Hit: | % Amino Acid Identity |
|---|---|
| XP_015606016.1 | 40.66 |
| XP_015517540.1 | 40.58 |
| XP_012269271.1 | 40.31 |
| XP_031787739.1 | 39.88 |
| XP_011883715.1 | 39.54 |

MKFLQLLVLFVSVCYSTQETVKVSIYYESLCPDCWRFFINQFNAAYRKIGSSLEVDLLPY
GKATQKNTNGVWTFQCQHGPQECYGNKAQACVLYENPLSTTINYVGCIMGKSNPASDTYL
KMCADSTGVSWTKLQECLKTTRGDKYLAELGERTLKVKPKNVPQLWFNNKYDAMLDIKGI
SNFLPTVCSLFKQKPIGC (SEQ ID NO: 10)

| BLAST Hit: | % Amino Acid Identity |
|---|---|
| KAF5281200.1 | 47.42 |
| KAF2696204.1 | 47.34 |
| KAF5308634.1 | 44.92 |
| XP_008190385.1 | 43.72 |
| XP_022910310.1 | 43.46 |

MMTAAHCLVGTTAARVTVVVGTNTLNAGGQRYAAARLVVHTGYNSNTFQNDIALVQTSTT
IALSSTVSTIQLASSHVGGGVDLTLSGWGTSYPGSAPNNLQYAVLKSIENTACQQRHSS
ATIYSSQICTFTRGGQSACHGDSGGPLASGGTQVGVVSWGRPCAIGYPDVFTRVSSFVNW
IQSNTQ (SEQ ID NO: 12)

| BLAST Hit: | % Amino Acid Identity |
|---|---|
| XP_022905891.1 | 57.38 |
| XP_022905889.1 | 56.45 |
| XP_022905888.1 | 56.45 |
| XP_017494860.1 | 55.61 |
| AJO53282.1 | 55.32 |

FIG. 11 (continued)

MFVYGLCAFFVLIHSTEAHYTQQWAVHIDGGPEVANEVARDHGFINLGQIFNNYYHFAHR
GVSKRSVTPNLRRQQHLQVDTRVKWAQQQKVKFRMKRDFRLQDSDPKWPSMWYLNRGNGL
DMNVIPAWLEGVTGKGAVVTILDDGLEKDHPDLDQNYDPMASYDVNNHDSDPSPRYDMID
SNRHGTRCAGEVAATSNNSVCALGVAHGAQVGGVRMLDGDVTDAVEARSLSLNPQHIDIY
SASWGPDDGKTVDGPGELATRAFVEGVTKGRNGKGSIFVWASGNGGRDHDNCNCDGYTL
SLIHISEPTRPY (SEQ ID NO: 14)

| BLAST Hit: | % Amino Acid Identity |
|---|---|
| XP_031336074.1 | 87.98 |
| XP_031336071.1 | 87.98 |
| KAF5294709.1 | 87.98 |
| XP_031336072.1 | 87.98 |
| EFA11330.2 | 87.16 |

MPLTWGLFVFLCLISYSIEADVFSNSFLVRFRRNVDQREAFKIAARHGFINMGPVLGSKQ
EYHFVNHALPSARTRRSIPFVRRLKVDPLVHTAIQQPGFVRVKRGYKPLKVENLVQNIKP
HKDPADPYFPLQNYLKNTGQNGGKAKLDLNVEAAWAQGITGKNITTAIMDDGVDYMHPDL
KFNYNAKASYDFSSNDPFPYFRYTDDWFNSHGTRCAGEVAAARDNGICGVGVAYNSKIAG
IRMLDQPYMTDLIEANSMGHEPNLIDIYSASWGPTDDGKTVDGPRNATMRAIVRGVNEGR
NGLGNIYVWASGDGGEDDDCNCDGYAASMWTISINSAINDGQNAHYDESCSSTLASTFSN
GAKDPHTGVATTDLYGRCTTTHSGTSAAAPEAAGVFALALEANNKLSWRDIQHLTVLTSK
RNSLFDAKGRFHWTMNGVGLEFNHLFGFGVLDAGAMVALAKQWKTVPARYHCEAGIVSEP
QKIPSSKSLILKIKTNACEGQNTEVKYLEHVQAVLSLNASPRGDLEIFLTSPMGTRSMIL
SRRRNDEDARDGFTKWPFMTTHTWGEYFQGTPWLLEIGFNSQTPQTGYFKEWTLMLHGTRD
PPYTELSVLDPHSKLAIVKKAHEGQAKL (SEQ ID NO: 16)

| BLAST Hit: | % Amino Acid Identity |
|---|---|
| KAF5274087.1 | 89.59 |
| XP_018568978.1 | 89.26 |
| XP_031345805.1 | 89.22 |
| XP_028136109.1 | 88.50 |
| XP_022907339.1 | 87.68 |

*FIG. 11 (continued)*

```
45417  ------------------------------------------------------------    0
75635  ----ATGTT---TGTTTACGGGCTATGTGCATTTTTCGTTTTAATA------------CA   41
85625  ----ATGCCTCTAACCTGGGGGCTTTTCGTATTTCTTTGTCTAATTAGTTATAGTATTGA   56
43962  ATGGGTGAAGCTGTTCTTAGGG-CATTTGAATTACATACTGGAGTCAATTATACACTTCC   59
44648  ------------------------------------------------------------    0
53596  ------------------------------------------------------------    0

45417  ------------------------------------------------------------    0
75635  TTCAACTGAAGCTCATTATACTCAACAGTGGGCTGTACATATAGATGGTGGACCGGAAGT  101
85625  AGCAGATGTATTTAGTAATTCGTTTCTTGTACGTTTCAGAAGAAATGTAGATCAACGGGA  116
43962  AAAAATGGATCAAATTGCTATGCCAC------ATTTTAG---TGC---------------   95
44648  ------------------------------------------------------------    0
53596  ---------------------ATGGCAC------TAGTCAA---GTA-------------   17

45417  ------------------------------------------------------------    0
75635  AGCAAATGAAGTAGCCAGAGATCATGGGTTCATCAATTTAGGACAGATATTTAATAAT--  159
85625  AGCTTTTAAAATCGCCGCCCGTCATGGTTTCATCAATATGGGACCGGTTCTGGGATCAAA  176
43962  -----------------------TGGTGCTATGGAAAATTGGGGTTTAGTAATATATAG  131
44648  -------------------------ATGAAATTCCTTCAACTTTTAGTAC-TTT   28
53596  ---------------------TGTCATTATACAATTACTATTCCTTCTAACAA-ATT   52

45417  ------------------------------------------------------------    0
75635  -----TATTATCACTTTGCTCAT----CGGGGAGTTTCAAAAAGATCTGTAACGC------  205
85625  ACAAGAATATCATTTCGTTAACCATGCTCTTCCTTCAGCAAGGACTAGAAGGAGTATTCC  236
43962  ACAAACTGCTCTTTTATATAACAATAGAACATCAACAACAGCACATAAAGAATCAGTTTT  191
44648  TCGTTAGTGTCTG-----------------------------------------------   41
53596  CCATAATTTACTGTAATCTAACACAAAATATAATGAA-------ACAAA-----------   95

45417  ------------------------------------------------------------    0
75635  --------------------------------CTAATTTACGAAGACA------  221
85625  ATTTGTGAGGCGTCTTAAAGTTGATCCATTGGTGCACACTGCAATACAACAGCC------  290
43962  GTCTATTATTGCGCACGAATTTGCTCATCAATGGTTCGGTGACTTAGTAAGTCCATTATG  251
44648  ------------------------------------------------------------   41
53596  ------TACTGAAGATAATCTTGAATCACCTTTATGCTGTAACTTAACTACTAC------  143

45417  ------------------------------------------------------------    0
75635  ---ACAACATTTACAAGTTGATACTCGTGTTAAATGGGCACAACAACAGAAGGTCAAACG  278
85625  ---AGGATTTGTAAGGGTTAAACGAGGTTATAAGCCATTAAAGGTAGAAAAATCTCGTTCA  347
43962  GTGGAAATATCTTTGGCTTAATGAAGGATTTGCATCAATTTACGATCCTATCATCAGAGA  311
44648  ------------------------------------------------------------   41
53596  ---------------------------------------TCA-ACGTGT  152

45417  ------------------------------------------------------------    0
75635  ACGTATGAAAAGGGACTTCCGATTACAAGATTCG-GATCCAAAATGGCCTAGTATGTGGT  337
85625  AAATATAAAACCT-------CATAAAGATCCAGCT-GATCCATATTTTCCTTTACAATGGT  400
43962  CAAAGTTAAACCTGATTGGAGAGTACTTGAAA---GATACGTACTT-ACTCTTCACAGTC  367
44648  ------------------------------------------------------------   41
53596  AGAAGTAGAATATTCATCAAAATTAATTGAAAATGAATACATAGTA-ACATTTAATGGCT  211
```

FIG. 12 (continued)

```
45417  ------------------------------------------------------------   0
75635  ATTTGA-----------------A---TAGAGGAAATGGATTGGATATGAATGTAATAC 376
85625  ATCTAAAAAATACAGGACAAAATGG---TGGAAAAGCAAAACTCGATTTGAATGTGGAAG 457
43962  TTTTCAACACTGATGGAGGACAGAA-------CACAAGACCTATGACAAGTGATGTATAC 420
44648  ------------------------------------------------------CTATTC  47
53596  ATTATAAAAATCAAGCACGTGCTAGTTACATAAATACTGCCTTAAATACGTCTGGTATCC 271

45417  ------------------------------------------------------------   0
75635  CTG-----CATGGCTAGAAGGTGTAACAG----------------GTA------------ 403
85625  CTG-----CTTGGGCACAAGGAATTACCG----------------GAA------------ 484
43962  AGTCCAGCAGAAATAGGATCAATTTTTGACAA-TATTTCTTACGGCAAATCTGCTTGTGT 479
44648  AAC--------ACAGGAAACAGTTAAAGTTTCAATTTACTATGAGTCATTATGCCCAGAT  99
53596  ATA--------AATGGAAGATATTATCACGTGAAAATCCTGCCAGTGATTATCCAAGTGA 323

45417  ------------------------------------------------------------   0
75635  -----AAGGAGCTGTTGTAACAATACTTGACGATGGTTTAGAAAAAGATCATCCAGA--- 455
85625  -----AAAACATTACAACTGCTATTATGGATGACGGTGTCGATTATATGCATCCAGA--- 536
43962  TATTCGCATGTTGCTAAATGCTATTACGGATCGTGTTTTCAGAGAAGGTATTAAAATCTA 539
44648  TGTTGGAGATTTT----------TTATAAATCAATTTAATGCAGCTTATAGAAAAATTGG 149
53596  TTTTGATGT---------------------AGTTATTTTGGAAGACACAGATAAATTGA 361

45417  ------------------------------------------------------------   0
75635  ---TCTTGATCAAAATTATGATCCTATGGCATCATACGATGTTAATAATCATGATTCTGA 512
85625  ---TTTAAAATTTAACTACAATGCGAAAGCAAGTTACGATTTCAGCAGTAACGACCCTTT 593
43962  CCTGCTTGATAGAGCTTTTGCTGCCGCAGATTCTTATGATTTATGGAATGGATTACAGAA 599
44648  T-AGTTCTCTAG-AAGTGGA---TTTGTTA-CCTTATGGTAAA---GCTACGCAAAAAAA 200
53596  T--TGGTTTAAAT-GCATTAA----AAGATCATCCTTCTGTTAA-----AAGGGTTACATCAC 412

45417  ------------------------------------------------------------   0
75635  TCCAAGTCCTAGATATGATATGATTGATTCTAATCGTCACGGCACTC---GTTGTGCTGG 569
85625  TCCTTATCCAAGATACACAGATGATTGGTTCAACAGTCATGGAACTC----GATGTGCAGG 650
43962  AGCAGTAGATCAAAATAACATGAATTTATCTATAAGTACATTAATGAGAACTTGGGAAAA 659
44648  TACTAATGGTGTTTGGACTTT-CCAATGTCAACATGGACCACAAGAGT--GTTATGGAAA 257
53596  AACGAATGGTATTAAGAACATTAAAATTTATTGATGCTGAGAATATAA--GACGT----- 465

45417  ------------------------------------------------------------   0
75635  TGAAGTGGCAGCAACTAGTAATAATTCTGTTTGTGCACTTGGTGTAGCTCATGGAGCTCA 629
85625  TGAAGTAGCTGCTGCTAGGGACAACGGAATTTGCGGTGTTGGTGTAGCATACAACTCAAA 710
43962  TCAAAAAGGCTAT-----CCGATTATCTATGTTAGGAGAAATTATGGCGATGGCTTAGCAGA 716
44648  TAAAGCACAAGCT----TG--TGTTCTTTACGAAAATCCACTTTCTACAACTATAAATT-- 310
53596  ----GGCAGAAGT----AG--TTTAAATCATAATAATCAATTTTGGCAAGCAACAGGTAGA 516

45417  ------------------------------------------------------------   0
75635  AGTTGGTGGTGTACGTATGCTAGAT---------GGTG----ATGTTACTGATGCTGTTGAAG 679
85625  AATTGCTGGTATTCGCATGTTAGAT---------CAACCCTACATGACTGATTTAATTGAAG 763
43962  AATAACTCAAGAACGTTATTTGAATTTAAATCCTACACCCAACGACACATCCAGATGGTA 776
44648  -ATGTTGGTTGCATCATGGGAAAAT-------CAAATC-CAGCATCTGATACTTACCTTA 361
53596  CATACTAGTAGAAGACTATTAAGAG---------CTATAC-CTA-------------GAC--- 553
```

FIG. 12 *(continued)*

```
45417  ------------------------------------------------------------    0
75635  CTAGATCTCTTAGTTTAAACCCGCAACACATCGATATTTATAGTGCCTCTTGGGGACCAG  739
85625  CTAATTCAATGGGTCATGAACCAAATTTAATAGACATATATAGTGCTTCTTGGGGTCCAA  823
43962  -TATTCCAATTAATTACGCAACAAGAA------ATAATTTCAATTTCTCTGAAACAGCAG  829
44648  -AAATGTGTGCTGATTCAACAGGAGTT-----TCATGGACGAAATTGCAA--------G  406
53596  -AGATCACATCTGTTTTACAAGCTGAT-----TCTTTATGGAATATGGGGATAACAGGAA  607

45417  ------------------------------------------------------------    0
75635  ATGATGATGGCAAAACTGTTGATGGACCAGGTGAATTAGCAACGAGAGCGTTTGTGGAAG  799
85625  CAGACGATGGAAAAACTGTTGACGGTCCTAGGAACGCTACAATGAGAGCAATTGTCAGGG  883
43962  CTACCGACTGGATAAATCCAAATTCTAGTTATGTTTTAAAAACAGGAGCAAATGCTAATG  889
44648  AATGTCTCAAAACTACTAAAGGTGATAAATATTTGGCAGAACTTGGAGAACGT-------  459
53596  AAGGAATAAAAGTAGCTGTATTTGATACTGGTTTATCAAAAAGTCATCCACATTTTA---  664

45417  ------------------------------------------------------------    0
75635  GTGTAACA----------AAGGGAAGAAATGGTAAAGGTTCGA----TATTTGTTTGGGCTT  847
85625  GTGTTAAT----------GAGGGTCGTAATGGTTTGGGTAACA----TTTACGTATGGGCGA  931
43962  ACTGGCTCATCGTAAACAAACAACAAACTGGTTACTATCGCGTTAATTATGACAATACTA  949
44648  ------ACATTGAAAGTGAA--ACCCAAAAATGTACCACA-----ATTGTGGTTT----A  502
53596  GAAAAATCAAAGAAAGAACAAATTGGACTAATGAAAAAACATTAGATGATGGTTTAGGTC  724

45417  ------------------------------------------------------------    0
75635  CTGGTAATGGT---GGAAGAGATCATGACAATTGCAATTGCGATG---------GTTACA  895
85625  GTGGTGATGGT---GGTGAAG----ACGACGATTGCAATTGTGATG-----------GATACG  976
43962  ATTGGAATCTAATTGCTACCTATCTTAATACCTCTGATTATGATAAAATTCATCTAATCA 1009
44648  ATAATAAATAT---GATGC-----GATGTTGGATATAAAA-GGAATATCAAACTTTTTGCC  554
53596  ATGGCACATTT---GTTGCTGGTGTTATAGCATCTAGTAAAGAATGTTTAGGTTTTGCAC  781

45417  ------------------------------------------------------------    0
75635  CCCTGTCTCTTATACACATCTCCGAGCCCACGAGACCGTA--CTAG--------------  939
85625  CTGCAAGTATGTGGACCATCAGTATCAACAGTGCAATTAATGATGGACAAAATGCTCATT 1036
43962  ACCGTGCTCAATTGATCAACGATGCT-----TTCAGTTTAGCA---AAATCGCG--TCGT 1059
44648  AACTGTATG------------------CAGTCTTTTTAAACAAAAA-------------  562
53596  CAGATTCTGAATTGCAT-----ATATT------TAGAGTATTTACAAGTAATCAGGTTTCTT  832

45417  ------------------------------------------------------------    0
75635  ------------------------------------------------------------  939
85625  ACGATGAAAGCTGCTCATCGACACTTGCTTCCACATTTAGCAACGGCGCTAA------GGA 1091
43962  CTAAATTACTCAGTTGCTTTGCAGTTGACTAACTATTTAGATAGAGAAACAGATTACGTA 1119
44648  ------------------------------------------------------------  582
53596  ATACATCTTGGTTTTTGGATGCTTTTAATTATGCAATTTTAAAGAAGATAAATGTACTTA  892

45417  -------------------------------ATGATGACTGCTGCTCATTG----   20
75635  ------------------------------------------------------------  939
85625  TCCTCACACCGGAGTGGCAACAACGGATCTGTATGGAAAATGTACTACAACTCATTCTGG 1151
43962  CCCTTACATGCGTTCTTCAA-----CATTCTTAATGACTTTAGTGCTATTGCTGCTGGTGC 1175
44648  ------------------------------------------------------------  582
53596  ATTT---------------------AAGTATTGGTGGGCCAGATTT  917
```

FIG. 12 (continued)

```
45417  ------------------------------TCTCGTTGGAACTACCGCTGCTCGTGTTACTGTTGT    56
75635  ---------------------------------------------------------------   939
85625  ------------------------AACATCA-----GCTGCAGCACCTGAAGCAGCAGGTGT  1184
43962  CCAAAATTATTCGCTGTTCGAGAAACGTCTTGAAAATATCCTAGATAAAGCAGTTGCTGA  1235
44648  ---------CCTATTGGCTGTTAA--------------------------------------   597
53596  TAAAGATCATCCATTTGTTGATAAAGTTTGGGAACTTACAGCTAATCGTGTTATTATGGT   977

45417  CGTAGGTACTAATACATTGAACGCTGGTGGACAAAGATATGCTGCTGCAAGACTTGTAGT   116
75635  ---------------------------------------------------------------   939
85625  AT----TTGCACTTGCTTTGGAAGCAAACAATAAATTGTCTTGGAGGGACAT----------  1232
43962  AT---TGG-------GAATAAGAGAAAAGGGCCATTCA----------GATAA---------  1268
44648  ---------------------------------------------------------------   597
53596  AT---CTG------CTATTGGAAATGATGGTCCACTATATGGTACTTTAAA---------  1019

45417  ACACACAGGATATAACTCAAATACTTTC---------CAAAATGATATCGCTCTCGTTCA   167
75635  ---------------------------------------------------------------   939
85625  ACAACATTT----------AACAGTATT---AACATCAAAAAGAAATTCA--CTTTTTGA  1277
43962  AGACCACGTAGATAACTTAAATCGTATCGATGTAATCAATAAGGCTTGCG--AATGGGGT  1326
44648  ---------------------------------------------------------------   597
53596  TAATCCTGCTGATCAAATGGATGTTATTGGTGTTGGAGGTATTACTTTTG--AAGA----  1073

45417  AACATCTACTACAATTGCTTTGAGCAGCACTGTTTCAACAATTCAATTGGCAAGCTCACA   227
75635  ---------------------------------------------------------------   939
85625  TGCTAAAGGTCGTTTTCATTGGACTATGAATGGTGTAGGATTAGAAT--------TTAAT  1329
43962  AACAAAAGATGCTTCTCTTTAGCAACACAAGCTTTAAACAATATACATGCAATATCAGTT  1386
44648  ---------------------------------------------------------------   597
53596  ---------------------------------------------------------------  1073

45417  CGTCGG--TGGAGGTGTCGATTTAACACTCAG-----T----GGATGGGGAACTACTTCA   276
75635  ---------------------------------------------------------------   939
85625  CATTTGTTTGGATTTGGCGTATTAGATGCTGGAGCAATGGTAGCTTTAGCAAAACAATGG  1389
43962  GATTTGCAAGGAGTTGTAT---TGTGTGCAG------------GTATTAGAAATGCTCCGG  1432
44648  ---------------------------------------------------------------   597
53596  ---------------------------------------------------------------  1073

45417  TATCCAGGAAGCGCACC--------AAATAATCTTCAATACGCT-------------G   313
75635  ---------------------------------------------------------------   939
85625  AAAACAGTTCCAGCAAGATACCATTGCGAAGCTGGAATTGTATCTGAACCACAAAAAATT  1449
43962  AATATTTGTGGCGTGAAATACATAAGCAAAGCTCTAATACGAGCTTAGACTCAACTCT--  1490
44648  ---------------------------------------------------------------   597
53596  ---------------------------------------------------------------  1073

45417  TCTTAAAATCTATTGAAAATACTGCTTGCCAACAAAGACACAGTTCAGCAACAATTTACA   373
75635  ---------------------------------------------------------------   939
85625  CCATCTAGTAAATCGTTAATATTGAAAATAAAAACAAACGCATGTGAAGGACAAAATACT  1509
43962  ----AAGATCTTATCTTAATATCGCACTTGGTTGCAGTCATAACGAAAGCATACTATCCT  1546
44648  ---------------------------------------------------------------   597
53596  ---------------------------------------------------------------  1073
```

FIG. 12 (continued)

```
45417   GTAGTCAAATTTGTACATTTACTC----------------------------------- 397
75635   ------------------------------------------------------------ 939
85625   GAAGTTAA--------ATATTTGGAACATGTACAAGCAGTTTTATCATTGAATGCAAGTCGGA 1564
43962   TATACTTAGATGCAGCAGTCGATCAAAAAGTATCTGTGTTCAGTAACATTTACAGTAAGG 1606
44648   ------------------------------------------------------------ 597
53596   ------------------------------------------------------------ 1073

45417   ------------------------------------------------------------ 397
75635   ------------------------------------------------------------ 939
85625   GA---------------GGAGATTTAGAAATATTTCTTACATCACCAATGGGTACTAGATC 1610
43962   GTAGTTTTGGAGTTAAATTCATTTTCAAATACATCTTAAATAACTTTGAAAATATTTATT 1666
44648   ------------------------------------------------------------ 597
53596   ------------------------------------------------------------ 1073

45417   ----------GTCAAGGACAAGGTGCATGCCATGGTGACTCCGGTGGTCCATTGGCATC 446
75635   ------------------------------------------------------------ 939
85625   GATGATTTTAAGTCGAAGAAGAAATGATGAGGATGCTCGTGATGGTTTTACAAAATGGCC 1670
43962   CAAAATT------------------AGGAGCTGCTGAAACTGGTTTGCAGATAAAGCA 1706
44648   ------------------------------------------------------------ 597
53596   ------------------------------------------------------------ 1073

45417   TGGCGGCACTCAAGTTGGTGT---------------------CGTTTCATGGGG 479
75635   ------------------------------------------------------------ 939
85625   TTTTATGACTACACATACTTGGGGTGAATATCCACAAGGAACATGGTTATTAGAAATTGG 1730
43962   -GATTTCACTCTA------CTTG------AGAACTAATGAACA-ATTACGTCTGCTAAAGG-A 1754
44648   ------------------------------------------------------------ 597
53596   ---------------------------TCAAATAGCA-AAATTTTCTTCAAGAGG-A 1101

45417   AAGACCATGCGCTATCGGTTATCCCG---------------------------------- 505
75635   ------------------------------------------------------------ 939
85625   TTTTAATTCTCAAACCCCACAAACTGGTTATTTCAAAGAATGGACTTTGATGTTGCATGG 1790
43962   ATTACAAACTTCTAACAAACATCCAGATGTTGTACAAGATTTTATCTTAG-----CAGTG 1809
44648   ------------------------------------------------------------ 597
53596   ATGACCACATGGGAA-----CTTCCACAAGGTACAGAGATTATTTTATTAA------T----- 1148

45417   --------------------------ATGTATTTACTCGCGTTTCTTCATTTGTTAA 536
75635   ------------------------------------------------------------ 939
85625   AACTAGGGATCCTCCATACACTGAGTTGTCAGTATTAGATCCACATTCTAAACTGGCTAT 1850
43962   AAC-----AATGCTGAAAACAATATTGCTGCAG---------------CAAAAGGATAT 1848
44648   ------------------------------------------------------------ 597
53596   ------------------------------------------------------------ 1148

45417   TTGGATCCAATCTAACACACAATAA--------------- 561
75635   ------------------------------------------------------------ 939
85625   AGTGAAGAAAGCTCATGAGGGTCAA---GCAAAATTGTAA-- 1887
43962   TGGGATGATATATCTTTATGGATTCAAAGTACTCTTGCATAA 1890
44648   ------------------------------------------------------------ 597
53596   ---------------ATTTATGATTTAG--------------- 1161
```

| Treatment Description | 0.1% w/v Feather Homogenate in Tris HCl as Substrate | | | | | | | |
|---|---|---|---|---|---|---|---|---|
| | Experimental (Abs 562 nm) | | | Controls (Abs 562 nm) | | | Net | P-Value |
| Proteinase K 1 mg/ml | 0.19 | 0.188 | 0.181 | 0.183 | 0.149 | 0.154 | 0.034 | 0.00316 |
| Tris-HCl pH 8.0 150 mM NaCl | 0.065 | 0.066 | 0.063 | 0.064 | 0.060 | 0.060 | 0.005 | 0.09 |
| 41194 pDEST14 Tris 10kDa | 0.352 | 0.333 | 0.370 | 0.368 | 0.294 | 0.292 | 0.063 | 0.00412 |
| 41659 pDEST14 Tris 10kDa | 0.303 | 0.316 | 0.303 | 0.305 | 0.175 | 0.182 | 0.11 | <0.00001 |
| 43962 pDEST14 Tris 10kDa | 0.357 | 0.353 | 0.330 | 0.329 | 0.190 | 0.188 | 0.153 | 0.000081 |
| 44648 pDEST14 Tris 10kDa | 0.36 | 0.349 | 0.311 | 0.313 | 0.188 | 0.235 | 0.117 | 0.003357 |
| 45417 pDEST14 Tris 10kDa | 0.324 | 0.343 | 0.356 | 0.357 | 0.186 | 0.195 | 0.155 | 0.0001 |
| 53596 pDEST14 Tris 10kDa | 0.244 | 0.251 | 0.262 | 0.272 | 0.166 | 0.167 | 0.093 | 0.0003 |
| 75635 pDEST14 Tris 10kDa | 0.237 | 0.226 | 0.235 | 0.231 | 0.174 | 0.181 | 0.055 | 0.0001 |
| Puc19 Control | 0.188 | 0.219 | 0.237 | 0.234 | 0.185 | 0.179 | 0.038 | 0.045497 |
| 41659, 44648 | 0.265 | 0.282 | 0.276 | 0.278 | 0.154 | 0.155 | 0.119 | 0.000012 |
| 43962, 41659, 45417 | 0.301 | 0.300 | 0.307 | 0.303 | 0.182 | 0.192 | 0.116 | <0.0001 |
| 43962, 44648 | 0.279 | 0.279 | 0.290 | 0.312 | 0.182 | 0.186 | 0.110 | 0.000516 |
| 43962, 44648, 45417 | 0.294 | 0.286 | 0.276 | 0.305 | 0.179 | 0.192 | 0.105 | 0.000238 |
| 43962, 53596 | 0.212 | 0.259 | 0.276 | 0.288 | 0.167 | 0.173 | 0.089 | 0.012 |

SEQUENCE LISTING

<160> NUMBER OF SEQ ID NOS: 20

<210> SEQ ID NO 1
<211> LENGTH: 1161
<212> TYPE: DNA
<213> ORGANISM: Artificial Sequence
<220> FEATURE:
<223> OTHER INFORMATION: AprE-like Serine Protease

<400> SEQUENCE: 1

```
atggcactag tcaagtatgt cattatacaa ttactattcc ttctaacaaa ttccataatt      60
tactgtaatc taacacaaaa atataatgaa acaaatactg aagataatct tgaatcacct     120
ttatgctgta acttaactac tactcaacgt gtagaagtag aatattcatc aaaattaatt     180
gaaaatgaat acatagtaac atttaatggc tattataaaa atcaagcacg tgctagttac     240
ataaatactg ccttaaatac gtctggtatc cataaatgga agatattatc acgtgaaaat     300
cctgccagtg attatccaag tgattttgat gtagttattt tggaagacac agataaattg     360
attggtttaa atgcattaaa agatcatcct tctgttaaaa gggttacatc acaacgaatg     420
gtattaagaa cattaaaatt tattgatgct gagaatataa gacgtggcag aagtagttta     480
aatcataata atcaattttg gcaagcaaca ggtagacata ctagtagaag actattaaga     540
gctataccta gacagatcac atctgtttta caagctgatt ctttatggaa tatggggata     600
acaggaaaag gaataaaagt agctgtattt gatactggtt tatcaaaaag tcatccacat     660
tttagaaaaa tcaagaaag aacaaattgg actaatgaaa aaacattaga tgatggttta     720
ggtcatggca catttgttgc tggtgttata gcatctagta agaatgtttt aggttttgca     780
ccagattctg aattgcatat atttagagta tttacaagta atcaggtttc ttatacatct     840
tggtttttgg atgcttttaa ttatgcaatt ttaaagaaga taaatgtact taatttaagt     900
attggtgggc cagattttaa agatcatcca tttgttgata agtttggga acttacagct     960 aatcgtgtta ttatggtatc tgctattgga aatgatggtc cactatatgg tactttaaat    1020
aatcctgctg atcaaatgga tgttattggt gttggaggta ttactttga agatcaaata    1080 gcaaaatttt cttcaagagg aatgaccaca tgggaacttc cacaaggtac agagattatt    1140
ttattaatat ttatgattta g                                              1161
```

<210> SEQ ID NO 2
<211> LENGTH: 386
<212> TYPE: PRT
<213> ORGANISM: Artificial Sequence
<220> FEATURE:
<223> OTHER INFORMATION: AprE-like Serine Protease

<400> SEQUENCE: 2

Met Ala Leu Val Lys Tyr Val Ile Ile Gln Leu Leu Phe Leu Leu Thr
1               5                   10                  15

Asn Ser Ile Ile Tyr Cys Asn Leu Thr Gln Lys Tyr Asn Glu Thr Asn
                20                  25                  30

Thr Glu Asp Asn Leu Glu Ser Pro Leu Cys Cys Asn Leu Thr Thr Thr
            35                  40                  45

Gln Arg Val Glu Val Glu Tyr Ser Ser Lys Leu Ile Glu Asn Glu Tyr
        50                  55                  60

Ile Val Thr Phe Asn Gly Tyr Tyr Lys Asn Gln Ala Arg Ala Ser Tyr
65                  70                  75                  80

Ile Asn Thr Ala Leu Asn Thr Ser Gly Ile His Lys Trp Lys Ile Leu
                85                  90                  95

```
Ser Arg Glu Asn Pro Ala Ser Asp Tyr Pro Ser Asp Phe Asp Val Val
            100                 105                 110

Ile Leu Glu Asp Thr Asp Lys Leu Ile Gly Leu Asn Ala Leu Lys Asp
            115                 120                 125

His Pro Ser Val Lys Arg Val Thr Ser Gln Arg Met Val Leu Arg Thr
            130                 135                 140

Leu Lys Phe Ile Asp Ala Glu Asn Ile Arg Arg Gly Arg Ser Ser Leu
145                 150                 155                 160

Asn His Asn Asn Gln Phe Trp Gln Ala Thr Gly Arg His Thr Ser Arg
                165                 170                 175

Arg Leu Leu Arg Ala Ile Pro Arg Gln Ile Thr Ser Val Leu Gln Ala
            180                 185                 190

Asp Ser Leu Trp Asn Met Gly Ile Thr Gly Lys Gly Ile Lys Val Ala
            195                 200                 205

Val Phe Asp Thr Gly Leu Ser Lys Ser His Pro His Phe Arg Lys Ile
            210                 215                 220

Lys Glu Arg Thr Asn Trp Thr Asn Glu Lys Thr Leu Asp Asp Gly Leu
225                 230                 235                 240

Gly His Gly Thr Phe Val Ala Gly Val Ile Ala Ser Ser Lys Glu Cys
                245                 250                 255

Leu Gly Phe Ala Pro Asp Ser Glu Leu His Ile Phe Arg Val Phe Thr
            260                 265                 270

Ser Asn Gln Val Ser Tyr Thr Ser Trp Phe Leu Asp Ala Phe Asn Tyr
            275                 280                 285

Ala Ile Leu Lys Lys Ile Asn Val Leu Asn Leu Ser Ile Gly Gly Pro
            290                 295                 300

Asp Phe Lys Asp His Pro Phe Val Asp Lys Val Trp Glu Leu Thr Ala
305                 310                 315                 320

Asn Arg Val Ile Met Val Ser Ala Ile Gly Asn Asp Gly Pro Leu Tyr
                325                 330                 335

Gly Thr Leu Asn Asn Pro Ala Asp Gln Met Asp Val Ile Gly Val Gly
            340                 345                 350

Gly Ile Thr Phe Glu Asp Gln Ile Ala Lys Phe Ser Ser Arg Gly Met
            355                 360                 365

Thr Thr Trp Glu Leu Pro Gln Gly Thr Glu Ile Ile Leu Leu Ile Phe
370                 375                 380

Met Ile
385

<210> SEQ ID NO 3
<211> LENGTH: 1224
<212> TYPE: DNA
<213> ORGANISM: Artificial Sequence
<220> FEATURE:
<223> OTHER INFORMATION: Metalloprotease

<400> SEQUENCE: 3
atgaaattga tcgtacttgc tgtacttatt gtcgctgctg cggccagcag tagaattcgc      60
tatgacaatt atcaagtttt tcgtgtaact ccaactgaac agaaacacct cgatgcactt     120
aaagaattgg aaggaactgg ttacagtttt tggactgatg tagctggttt aaacaaacca     180
gttgatatct tggtagcgcc acatcttcta agcaatttcg aggatctagt gagatcactt     240
gacttgcaaa ccgaagttta tatcgaagat gtacagacat taatcgacag acaaatgcca     300
ccggaaacaa atttaacagc tcgtcaagta acttggacta aatatcacac acttgatgat     360
```

```
atcaataatt ggcttcaatc tttggcccaa acttatccac aaaacgtcaa agtgattatt    420
ggtggaaaat cacacgaaca acgtaacatt gtaggtgtac atgtttcatt ttctgctagt    480
aatgctaata gagccatctt tattgaaggt ggaatacacg ctcgtgaatg gattgctcca    540
gctactgtta cgtatttctt aaatcaattg ttaacaagca aagatgcttc aattcgtgct    600
attgcagaac gtcatgattg gtacattttc cctgttgtca accctgatgg atacgtctat    660
actttcacta gggatcgtct atggcgtaaa acacgtgtac catatggtac ctgttatggt    720
gctgatccta atcgtaactg gaactaccat tggaacgaag ttggagccag caacaatcca    780
tgcgctgaaa catatgctgg tccaagagca ttctcagaac catgcacaag aacattatca    840
caatatattg gcactattgc atctaaatta gtgggttata ttgctttcca ctcttactca    900
caactactcc taattcctta tggacattct tccgctcatg tcgaaaacta taacgaattg    960
tattcagttg gactgaaagc agctacagcc ttgtctaaac gttatggaac aagatacaag   1020
gtcggaaata tcgtagaagt tatttatgct gctgctggag gtagtatgga ttgggttaaa   1080
ggtacttaca aacccgtttt aacatacaca tatgaattgc gtgatactgg tcgtcatggt   1140
ttccttcttc caccagacca aattcttcca aactcactgg aagtcctaga ttctcttgta   1200
gccatattca atgaatttaa ataa                                          1224

<210> SEQ ID NO 4
<211> LENGTH: 407
<212> TYPE: PRT
<213> ORGANISM: Artificial Sequence
<220> FEATURE:
<223> OTHER INFORMATION: Metalloprotease

<400> SEQUENCE: 4

Met Lys Leu Ile Val Leu Ala Val Leu Ile Val Ala Ala Ala Ala Ser
1               5                   10                  15

Ser Arg Ile Arg Tyr Asp Asn Tyr Gln Val Phe Arg Val Thr Pro Thr
            20                  25                  30

Glu Gln Lys His Leu Asp Ala Leu Lys Glu Leu Glu Gly Thr Gly Tyr
        35                  40                  45

Ser Phe Trp Thr Asp Val Ala Gly Leu Asn Lys Pro Val Asp Ile Leu
    50                  55                  60

Val Ala Pro His Leu Leu Ser Asn Phe Glu Asp Leu Val Arg Ser Leu
65                  70                  75                  80

Asp Leu Gln Thr Glu Val Tyr Ile Glu Asp Val Gln Thr Leu Ile Asp
                85                  90                  95

Arg Gln Met Pro Pro Glu Thr Asn Leu Thr Ala Arg Gln Val Thr Trp
            100                 105                 110

Thr Lys Tyr His Thr Leu Asp Asp Ile Asn Asn Trp Leu Gln Ser Leu
        115                 120                 125

Ala Gln Thr Tyr Pro Gln Asn Val Lys Val Ile Gly Gly Lys Ser
    130                 135                 140

His Glu Gln Arg Asn Ile Val Gly Val His Val Ser Phe Ser Ala Ser
145                 150                 155                 160

Asn Ala Asn Arg Ala Ile Phe Ile Glu Gly Gly Ile His Ala Arg Glu
                165                 170                 175

Trp Ile Ala Pro Ala Thr Val Thr Tyr Phe Leu Asn Gln Leu Leu Thr
            180                 185                 190

Ser Lys Asp Ala Ser Ile Arg Ala Ile Ala Glu Arg His Asp Trp Tyr
        195                 200                 205
```

Ile Phe Pro Val Val Asn Pro Asp Gly Tyr Val Tyr Thr Phe Thr Arg
    210                 215                 220

Asp Arg Leu Trp Arg Lys Thr Arg Val Pro Tyr Gly Thr Cys Tyr Gly
225                 230                 235                 240

Ala Asp Pro Asn Arg Asn Trp Asn Tyr His Trp Asn Glu Val Gly Ala
                245                 250                 255

Ser Asn Asn Pro Cys Ala Glu Thr Tyr Ala Gly Pro Arg Ala Phe Ser
                260                 265                 270

Glu Pro Cys Thr Arg Thr Leu Ser Gln Tyr Ile Gly Thr Ile Ala Ser
                275                 280                 285

Lys Leu Val Gly Tyr Ile Ala Phe His Ser Tyr Ser Gln Leu Leu Leu
    290                 295                 300

Ile Pro Tyr Gly His Ser Ser Ala His Val Glu Asn Tyr Asn Glu Leu
305                 310                 315                 320

Tyr Ser Val Gly Leu Lys Ala Ala Thr Ala Leu Ser Lys Arg Tyr Gly
                325                 330                 335

Thr Arg Tyr Lys Val Gly Asn Ile Val Glu Val Ile Tyr Ala Ala Ala
                340                 345                 350

Gly Gly Ser Met Asp Trp Val Lys Gly Thr Tyr Lys Thr Arg Leu Thr
                355                 360                 365

Tyr Thr Tyr Glu Leu Arg Asp Thr Gly Arg His Gly Phe Leu Leu Pro
    370                 375                 380

Pro Asp Gln Ile Leu Pro Asn Ser Leu Glu Val Leu Asp Ser Leu Val
385                 390                 395                 400

Ala Ile Phe Asn Glu Phe Lys
                405

<210> SEQ ID NO 5
<211> LENGTH: 1110
<212> TYPE: DNA
<213> ORGANISM: Artificial Sequence
<220> FEATURE:
<223> OTHER INFORMATION: Carboxypeptidase A/B-like

<400> SEQUENCE: 5
atgactttcc gtgataatcc tttatacgac ttttggacac ctgtaagact agctagtaaa      60
actgatatta tggtttctcc tcttgaacaa gaagtatttg aatccttttt gatttatcat     120
gacttcaaat acactataag aattaacaat gttcaagata caattgaagc tgaacgtatg     180
acacaacgac taatagaaga tgttcctgaa ggaaaaatca gttttacaaa gtatcatcgt     240
tatgctgata ttcttgctta cgtaagacaa cttgcatcac agtatccgaa tcttgtatct     300
gtagaaacaa ttggaaagag tactgaaaat cgtgatcttg taatggttaa aatttcttcc     360
ggtggaagtg gtaaaccagc aatttttaatt gatggaacta ttcatgcacg tgaatggatt     420
gcaccagcta tggttttata tattattcaa gaattagttg aaaatcccag caacagtgca     480
cttattaaag atgtcgattg cacacatatta ccagttataa atccagatgg ttatgaatat     540
tctcatgtca ctaatcgaat gtggaggaaa actcgttcac gtggttcacg ttgttttggt     600
gttgatggca atcgtaactt tgattttcac tggggcgaag ttggtgctag ctcagacgaa     660
tgtagtgaaa cttacaaagg tcctacacca ttctcagaac agaaactcg tgctctcagg     720 gattatgtta agaaaaaccc aaataaaattc aaactttatt tgactttcca cagttatggc     780
cagtatttgt tataccctg gggttataca tcagccttac catcaaacgc tagggaatta     840
caatcattag gagaaagcgt tggtcgcgct attcaagcaa ttgctggaac caaatataaa     900

```
gtaggaagtt caacaaatgt tttgtatgct gctgctggtg gtagcgatga ttgggttatg      960
ggtgttggtg gtgtttcact tccttacaca attgaacttc ctggcggtgg tgttaacggt     1020
tttgatttac ctccatctag aatactacca gtcgcaaaag aaacatttga aggtgttaaa     1080
gttttttata attatgtcag aaatttataa                                       1110
```

<210> SEQ ID NO 6
<211> LENGTH: 369
<212> TYPE: PRT
<213> ORGANISM: Artificial Sequence
<220> FEATURE:
<223> OTHER INFORMATION: Carboxypeptidase A/B-like

<400> SEQUENCE: 6

```
Met Thr Phe Arg Asp Asn Pro Leu Tyr Asp Phe Trp Thr Pro Val Arg
1               5                   10                  15

Leu Ala Ser Lys Thr Asp Ile Met Val Ser Pro Leu Glu Gln Glu Val
            20                  25                  30

Phe Glu Ser Phe Leu Ile Tyr His Asp Phe Lys Tyr Thr Ile Arg Ile
        35                  40                  45

Asn Asn Val Gln Asp Thr Ile Glu Ala Glu Arg Met Thr Gln Arg Leu
    50                  55                  60

Ile Glu Asp Val Pro Glu Gly Lys Ile Ser Phe Thr Lys Tyr His Arg
65                  70                  75                  80

Tyr Ala Asp Ile Leu Ala Tyr Val Arg Gln Leu Ala Ser Gln Tyr Pro
                85                  90                  95

Asn Leu Val Ser Val Glu Thr Ile Gly Lys Ser Thr Glu Asn Arg Asp
            100                 105                 110

Leu Val Met Val Lys Ile Ser Ser Gly Gly Ser Gly Lys Pro Ala Ile
        115                 120                 125

Leu Ile Asp Gly Thr Ile His Ala Arg Glu Trp Ile Ala Pro Ala Met
    130                 135                 140

Val Leu Tyr Ile Ile Gln Glu Leu Val Glu Asn Pro Ser Asn Ser Ala
145                 150                 155                 160

Leu Ile Lys Asp Val Asp Trp His Ile Leu Pro Val Ile Asn Pro Asp
                165                 170                 175

Gly Tyr Glu Tyr Ser His Val Thr Asn Arg Met Trp Arg Lys Thr Arg
            180                 185                 190

Ser Arg Gly Ser Arg Cys Phe Gly Val Asp Gly Asn Arg Asn Phe Asp
        195                 200                 205

Phe His Trp Gly Glu Val Gly Ala Ser Ser Asp Glu Cys Ser Glu Thr
    210                 215                 220

Tyr Lys Gly Pro Thr Pro Phe Ser Glu Pro Glu Thr Arg Ala Leu Arg
225                 230                 235                 240

Asp Tyr Val Lys Lys Asn Pro Asn Lys Phe Lys Leu Tyr Leu Thr Phe
                245                 250                 255

His Ser Tyr Gly Gln Tyr Leu Leu Tyr Pro Trp Gly Tyr Thr Ser Ala
            260                 265                 270

Leu Pro Ser Asn Ala Arg Glu Leu Gln Ser Leu Gly Glu Ser Val Gly
        275                 280                 285

Arg Ala Ile Gln Ala Ile Ala Gly Thr Lys Tyr Lys Val Gly Ser Ser
    290                 295                 300

Thr Asn Val Leu Tyr Ala Ala Ala Gly Gly Ser Asp Asp Trp Val Met
305                 310                 315                 320
```

```
Gly Val Gly Gly Val Ser Leu Pro Tyr Thr Ile Glu Leu Pro Gly Gly
            325                 330                 335

Gly Val Asn Gly Phe Asp Leu Pro Pro Ser Arg Ile Leu Pro Val Ala
        340                 345                 350

Lys Glu Thr Phe Glu Gly Val Lys Val Phe Tyr Asn Tyr Val Arg Asn
    355                 360                 365

Leu

<210> SEQ ID NO 7
<211> LENGTH: 1890
<212> TYPE: DNA
<213> ORGANISM: Artificial Sequence
<220> FEATURE:
<223> OTHER INFORMATION: Aminopeptidase N-like

<400> SEQUENCE: 7
```

| | | | | | |
|---|---|---|---|---|---|
| atgggtgaag | ctgttcttag | ggcatttgaa | ttacatactg | gagtcaatta | tacacttcca | 60 |
| aaaatggatc | aaattgctat | gccacatttt | agtgctggtg | ctatggaaaa | ttggggttta | 120 |
| gtaatatata | gacaaactgc | tcttttatat | aacaatagaa | catcaacaac | agcacataaa | 180 |
| gaatcagttt | tgtctattat | tgcgcacgaa | tttgctcatc | aatggttcgg | tgacttagta | 240 |
| agtccattat | ggtggaaata | tctttggctt | aatgaaggat | ttgcatcaat | ttacgatcct | 300 |
| atcatcagag | acaaagttaa | acctgattgg | agagtacttg | aaagatacgt | acttactctt | 360 |
| cacagtcttt | tcaacactga | tggaggacag | aacacaagac | ctatgacaag | tgatgtatac | 420 |
| agtccagcag | aaataggatc | aattttttgac | aatatttctt | acggcaaatc | tgcttgtgtt | 480 |
| attcgcatgt | tgctaaatgc | tattacggat | cgtgttttca | gagaaggtat | taaaatctac | 540 |
| ctgcttgata | gagcttttgc | tgccgcagat | tcttatgatt | tatggaatgg | attacagaaa | 600 |
| gcagtagatc | aaaataacat | gaatttatct | ataagtacat | taatgagaac | ttgggaaaat | 660 |
| caaaaaggct | atccgattat | ctatgttagg | agaaattatg | gcgatggctt | agcagaaata | 720 |
| actcaagaac | gttatttgaa | tttaaatcct | acacccaacg | cacatccag | atggtatatt | 780 |
| ccaattaatt | acgcaacaag | aaataatttc | aatttctctg | aaacagcagc | taccgactgg | 840 |
| ataaatccaa | attctagtta | tgttttaaaa | acaggagcaa | atgctaatga | ctggctcatc | 900 |
| gtaaacaaac | aacaaactgg | ttactatcgc | gttaattatg | acaatactaa | ttggaatcta | 960 |
| attgctacct | atcttaatac | ctctgattat | gataaaattc | atctaatcaa | ccgtgctcaa | 1020 |
| ttgatcaacg | atgctttcag | tttagcaaaa | tcgcgtcgtc | taaattactc | agttgctttg | 1080 |
| cagttgacta | actatttaga | tagagaaaca | gattacgtac | ccttacatgc | gttcttcaac | 1140 |
| attcttaatg | actttagtgc | tattgctgct | ggtgcccaaa | attattcgct | gttcgagaaa | 1200 |
| cgtcttgaaa | atatcctaga | taagcagtt | gctgaattgg | gaataagaga | aaagggccat | 1260 |
| tcagataaag | accacgtaga | taacttaaat | cgtatcgatg | taatcaataa | ggcttgcgaa | 1320 |
| tggggtaaca | aaagatgctt | ctcttttagca | acacaagctt | taaacaatat | acatgcaata | 1380 |
| tcagttgatt | tgcaaggagt | tgtattgtgt | gcaggtatta | gaaatgctcc | ggaatatttg | 1440 |
| tggcgtgaaa | tacataagca | aagctctaat | acgagcttag | actcaactct | aagatcttat | 1500 |
| cttaatatcg | cacttggttg | cagtcataac | gaaagctac | tatccttata | cttagatgca | 1560 |
| gcagtcgatc | aaaaagtatc | tgtgttcagt | aacatttaca | gtaagggtag | ttttggagtt | 1620 |
| aaattcattt | tcaaatacat | cttaaataac | tttgaaaata | tttattcaaa | attaggagct | 1680 |
| gctgaaactg | gtttgcagat | aaagcagatt | tcactctact | gagaactaa | tgaacaatta | 1740 |

```
cgtctgctaa aggaattaca aacttctaac aaacatccag atgttgtaca agattttatc    1800
ttagcagtga acaatgctga aaacaatatt gctgcagcaa aaggatattg ggatgatata    1860
tctttatgga ttcaaagtac tcttgcataa                                     1890

<210> SEQ ID NO 8
<211> LENGTH: 629
<212> TYPE: PRT
<213> ORGANISM: Artificial Sequence
<220> FEATURE:
<223> OTHER INFORMATION: Aminopeptidase N-like

<400> SEQUENCE: 8

Met Gly Glu Ala Val Leu Arg Ala Phe Glu Leu His Thr Gly Val Asn
1               5                   10                  15

Tyr Thr Leu Pro Lys Met Asp Gln Ile Ala Met Pro His Phe Ser Ala
                20                  25                  30

Gly Ala Met Glu Asn Trp Gly Leu Val Ile Tyr Arg Gln Thr Ala Leu
            35                  40                  45

Leu Tyr Asn Asn Arg Thr Ser Thr Ala His Lys Glu Ser Val Leu
    50                  55                  60

Ser Ile Ile Ala His Glu Phe Ala His Gln Trp Phe Gly Asp Leu Val
65                  70                  75                  80

Ser Pro Leu Trp Trp Lys Tyr Leu Trp Leu Asn Glu Gly Phe Ala Ser
                85                  90                  95

Ile Tyr Asp Pro Ile Ile Arg Asp Lys Val Lys Pro Asp Trp Arg Val
            100                 105                 110

Leu Glu Arg Tyr Val Leu Thr Leu His Ser Leu Phe Asn Thr Asp Gly
        115                 120                 125

Gly Gln Asn Thr Arg Pro Met Thr Ser Asp Val Tyr Ser Pro Ala Glu
    130                 135                 140

Ile Gly Ser Ile Phe Asp Asn Ile Ser Tyr Gly Lys Ser Ala Cys Val
145                 150                 155                 160

Ile Arg Met Leu Leu Asn Ala Ile Thr Asp Arg Val Phe Arg Glu Gly
                165                 170                 175

Ile Lys Ile Tyr Leu Leu Asp Arg Ala Phe Ala Ala Ala Asp Ser Tyr
            180                 185                 190

Asp Leu Trp Asn Gly Leu Gln Lys Ala Val Asp Gln Asn Asn Met Asn
        195                 200                 205

Leu Ser Ile Ser Thr Leu Met Arg Thr Trp Glu Asn Gln Lys Gly Tyr
    210                 215                 220

Pro Ile Ile Tyr Val Arg Arg Asn Tyr Gly Asp Gly Leu Ala Glu Ile
225                 230                 235                 240

Thr Gln Glu Arg Tyr Leu Asn Leu Asn Pro Thr Pro Asn Asp Thr Ser
                245                 250                 255

Arg Trp Tyr Ile Pro Ile Asn Tyr Ala Thr Arg Asn Asn Phe Asn Phe
            260                 265                 270

Ser Glu Thr Ala Ala Thr Asp Trp Ile Asn Pro Asn Ser Ser Tyr Val
        275                 280                 285

Leu Lys Thr Gly Ala Asn Ala Asn Asp Trp Leu Ile Val Asn Lys Gln
    290                 295                 300

Gln Thr Gly Tyr Tyr Arg Val Asn Tyr Asp Asn Thr Asn Trp Asn Leu
305                 310                 315                 320

Ile Ala Thr Tyr Leu Asn Thr Ser Asp Tyr Asp Lys Ile His Leu Ile
                325                 330                 335
```

```
Asn Arg Ala Gln Leu Ile Asn Asp Ala Phe Ser Leu Ala Lys Ser Arg
            340                 345                 350
Arg Leu Asn Tyr Ser Val Ala Leu Gln Leu Thr Asn Tyr Leu Asp Arg
        355                 360                 365
Glu Thr Asp Tyr Val Pro Leu His Ala Phe Asn Ile Leu Asn Asp
    370                 375                 380
Phe Ser Ala Ile Ala Ala Gly Ala Gln Asn Tyr Ser Leu Phe Glu Lys
385                 390                 395                 400
Arg Leu Glu Asn Ile Leu Asp Lys Ala Val Ala Glu Leu Gly Ile Arg
                405                 410                 415
Glu Lys Gly His Ser Asp Lys Asp His Val Asp Asn Leu Asn Arg Ile
            420                 425                 430
Asp Val Ile Asn Lys Ala Cys Glu Trp Gly Asn Lys Arg Cys Phe Ser
                435                 440                 445
Leu Ala Thr Gln Ala Leu Asn Asn Ile His Ala Ile Ser Val Asp Leu
    450                 455                 460
Gln Gly Val Val Leu Cys Ala Gly Ile Arg Asn Ala Pro Glu Tyr Leu
465                 470                 475                 480
Trp Arg Glu Ile His Lys Gln Ser Ser Asn Thr Ser Leu Asp Ser Thr
                485                 490                 495
Leu Arg Ser Tyr Leu Asn Ile Ala Leu Gly Cys Ser His Asn Glu Ser
                500                 505                 510
Ile Leu Ser Leu Tyr Leu Asp Ala Ala Val Asp Gln Lys Val Ser Val
            515                 520                 525
Phe Ser Asn Ile Tyr Ser Lys Gly Ser Phe Gly Val Lys Phe Ile Phe
530                 535                 540
Lys Tyr Ile Leu Asn Asn Phe Glu Asn Ile Tyr Ser Lys Leu Gly Ala
545                 550                 555                 560
Ala Glu Thr Gly Leu Gln Ile Lys Gln Ile Ser Leu Tyr Leu Arg Thr
                565                 570                 575
Asn Glu Gln Leu Arg Leu Leu Lys Glu Leu Gln Thr Ser Asn Lys His
                580                 585                 590
Pro Asp Val Val Gln Asp Phe Ile Leu Ala Val Asn Asn Ala Glu Asn
            595                 600                 605
Asn Ile Ala Ala Ala Lys Gly Tyr Trp Asp Asp Ile Ser Leu Trp Ile
    610                 615                 620
Gln Ser Thr Leu Ala
625

<210> SEQ ID NO 9
<211> LENGTH: 597
<212> TYPE: DNA
<213> ORGANISM: Artificial Sequence
<220> FEATURE:
<223> OTHER INFORMATION: GILT reductase-like

<400> SEQUENCE: 9
atgaaattcc ttcaactttt agtactttc gttagtgtct gctattcaac acaggaaaca      60
gttaaagttt caatttacta tgagtcatta tgcccagatt gttggagatt ttttataaat    120
caatttaatg cagcttatag aaaaattggt agttctctag aagtggattt gttacccttat   180 ggtaaagcta cgcaaaaaaa tactaatggt gtttggactt ccaatgtca acatggacca    240 caagagtgtt atggaaataa agcacaagct tgtgttcttt acgaaaatcc actttctaca    300
actataaatt atgttggttg catcatggga aaatcaaatc cagcatctga tacttaccct    360
```

```
aaaatgtgtg ctgattcaac aggagtttca tggacgaaat tgcaagaatg tctcaaaact    420
actaaaggtg ataaatattt ggcagaactt ggagaacgta cattgaaagt gaaacccaaa    480
aatgtaccac aattgtggtt taataataaa tatgatgcga tgttggatat aaaaggaata    540
tcaaactttt tgccaactgt atgcagtctt tttaaacaaa aacctattgg ctgttaa       597
```

<210> SEQ ID NO 10
<211> LENGTH: 198
<212> TYPE: PRT
<213> ORGANISM: Artificial Sequence
<220> FEATURE:
<223> OTHER INFORMATION: GILT reductase-like

<400> SEQUENCE: 10

```
Met Lys Phe Leu Gln Leu Leu Val Leu Phe Val Ser Val Cys Tyr Ser
1               5                   10                  15

Thr Gln Glu Thr Val Lys Val Ser Ile Tyr Tyr Glu Ser Leu Cys Pro
            20                  25                  30

Asp Cys Trp Arg Phe Phe Ile Asn Gln Phe Asn Ala Ala Tyr Arg Lys
        35                  40                  45

Ile Gly Ser Ser Leu Glu Val Asp Leu Leu Pro Tyr Gly Lys Ala Thr
    50                  55                  60

Gln Lys Asn Thr Asn Gly Val Trp Thr Phe Gln Cys Gln His Gly Pro
65                  70                  75                  80

Gln Glu Cys Tyr Gly Asn Lys Ala Gln Ala Cys Val Leu Tyr Glu Asn
                85                  90                  95

Pro Leu Ser Thr Thr Ile Asn Tyr Val Gly Cys Ile Met Gly Lys Ser
            100                 105                 110

Asn Pro Ala Ser Asp Thr Tyr Leu Lys Met Cys Ala Asp Ser Thr Gly
        115                 120                 125

Val Ser Trp Thr Lys Leu Gln Glu Cys Leu Lys Thr Thr Lys Gly Asp
    130                 135                 140

Lys Tyr Leu Ala Glu Leu Gly Glu Arg Thr Leu Lys Val Lys Pro Lys
145                 150                 155                 160

Asn Val Pro Gln Leu Trp Phe Asn Asn Lys Tyr Asp Ala Met Leu Asp
                165                 170                 175

Ile Lys Gly Ile Ser Asn Phe Leu Pro Thr Val Cys Ser Leu Phe Lys
            180                 185                 190

Gln Lys Pro Ile Gly Cys
        195
```

<210> SEQ ID NO 11
<211> LENGTH: 561
<212> TYPE: DNA
<213> ORGANISM: Artificial Sequence
<220> FEATURE:
<223> OTHER INFORMATION: Trypsin-like

<400> SEQUENCE: 11

```
atgatgactg ctgctcattg tctcgttgga actaccgctg ctcgtgttac tgttgtcgta     60
ggtactaata cattgaacgc tggtggacaa agatatgctg ctgcaagact tgtagtacac    120
acaggatata actcaaatac tttccaaaat gatatcgctc tcgttcaaac atctactaca    180
attgctttga gcagcactgt ttcaacaatt caattggcaa gctcacacgt cggtggaggt    240
gtcgatttaa cactcagtgg atggggaact acttcatatc caggaagcgc accaaataat    300
cttcaatacg ctgtcttaaa atctattgaa atactgcttg ccaacaaaga cacagttca    360
```

| | | | | |
|---|---|---|---|---|
| gcaacaattt | acagtagtca | aatttgtaca | tttactcgtc | aaggacaagg tgcatgccat | 420 |
| ggtgactccg | gtggtccatt | ggcatctggc | ggcactcaag | ttggtgtcgt ttcatgggga | 480 |
| agaccatgcg | ctatcggtta | tcccgatgta | tttactcgcg | tttcttcatt tgttaattgg | 540 |
| atccaatcta | acacacaata | a | | | 561 |

<210> SEQ ID NO 12
<211> LENGTH: 186
<212> TYPE: PRT
<213> ORGANISM: Artificial Sequence
<220> FEATURE:
<223> OTHER INFORMATION: Trypsin-like

<400> SEQUENCE: 12

Met Met Thr Ala Ala His Cys Leu Val Gly Thr Thr Ala Ala Arg Val
1               5                   10                  15

Thr Val Val Val Gly Thr Asn Thr Leu Asn Ala Gly Gly Gln Arg Tyr
            20                  25                  30

Ala Ala Ala Arg Leu Val Val His Thr Gly Tyr Asn Ser Asn Thr Phe
        35                  40                  45

Gln Asn Asp Ile Ala Leu Val Gln Thr Ser Thr Thr Ile Ala Leu Ser
    50                  55                  60

Ser Thr Val Ser Thr Ile Gln Leu Ala Ser Ser His Val Gly Gly Gly
65                  70                  75                  80

Val Asp Leu Thr Leu Ser Gly Trp Gly Thr Thr Ser Tyr Pro Gly Ser
                85                  90                  95

Ala Pro Asn Asn Leu Gln Tyr Ala Val Leu Lys Ser Ile Glu Asn Thr
            100                 105                 110

Ala Cys Gln Gln Arg His Ser Ser Ala Thr Ile Tyr Ser Ser Gln Ile
        115                 120                 125

Cys Thr Phe Thr Arg Gln Gly Gln Gly Ala Cys His Gly Asp Ser Gly
    130                 135                 140

Gly Pro Leu Ala Ser Gly Gly Thr Gln Val Gly Val Val Ser Trp Gly
145                 150                 155                 160

Arg Pro Cys Ala Ile Gly Tyr Pro Asp Val Phe Thr Arg Val Ser Ser
                165                 170                 175

Phe Val Asn Trp Ile Gln Ser Asn Thr Gln
            180                 185

<210> SEQ ID NO 13
<211> LENGTH: 939
<212> TYPE: DNA
<213> ORGANISM: Artificial Sequence
<220> FEATURE:
<223> OTHER INFORMATION: S8 Convertase-like

<400> SEQUENCE: 13

| | | | | |
|---|---|---|---|---|
| atgtttgttt | acgggctatg | tgcatttttc | gttttaatac | attcaactga agctcattat | 60 |
| actcaacagt | gggctgtaca | tatagatggt | ggaccggaag | tagcaaatga agtagccaga | 120 |
| gatcatgggt | tcatcaattt | aggacagata | tttaataatt | attatcactt gctcatcgg | 180 |
| ggagtttcaa | aaagatctgt | aacgcctaat | ttacgaagac | aacaacattt acaagttgat | 240 |
| actcgtgtta | atgggcaca | caacagaag | gtcaaacgac | gtatgaaaag ggacttccga | 300 |
| ttacaagatt | cggatccaaa | atggcctagt | atgtggtatt | tgaatagagg aaatggattg | 360 |
| gatatgaatg | taatacctgc | atggctagaa | ggtgtaacag | gtaaaggagc tgttgtaaca | 420 |
| atacttgacg | atggtttaga | aaaagatcat | ccagatcttg | atcaaaatta tgatcctatg | 480 |

| | | |
|---|---|---|
| gcatcatacg atgttaataa tcatgattct gatccaagtc ctagatatga tatgattgat | 540 | |
| tctaatcgtc acggcactcg ttgtgctggt gaagtggcag caactagtaa taattctgtt | 600 | |
| tgtgcacttg gtgtagctca tggagctcaa gttggtggtg tacgtatgct agatggtgat | 660 | |
| gttactgatg ctgttgaagc tagatctctt agtttaaacc cgcaacacat cgatatttat | 720 | |
| agtgcctctt ggggaccaga tgatgatggc aaaactgttg atggaccagg tgaattagca | 780 | |
| acgagagcgt ttgtggaagg tgtaacaaag ggaagaaatg gtaaaggttc gatatttgtt | 840 | |
| tgggcttctg gtaatggtgg aagagatcat gacaattgca attgcgatgg ttacaccctg | 900 | |
| tctcttatac acatctccga gcccacgaga ccgtactag | 939 | |

<210> SEQ ID NO 14
<211> LENGTH: 312
<212> TYPE: PRT
<213> ORGANISM: Artificial Sequence
<220> FEATURE:
<223> OTHER INFORMATION: S8 Convertase-like

<400> SEQUENCE: 14

Met Phe Val Tyr Gly Leu Cys Ala Phe Phe Val Leu Ile His Ser Thr
1               5                   10                  15

Glu Ala His Tyr Thr Gln Gln Trp Ala Val His Ile Asp Gly Gly Pro
            20                  25                  30

Glu Val Ala Asn Glu Val Ala Arg Asp His Gly Phe Ile Asn Leu Gly
        35                  40                  45

Gln Ile Phe Asn Asn Tyr Tyr His Phe Ala His Arg Gly Val Ser Lys
    50                  55                  60

Arg Ser Val Thr Pro Asn Leu Arg Arg Gln Gln His Leu Gln Val Asp
65                  70                  75                  80

Thr Arg Val Lys Trp Ala Gln Gln Gln Lys Val Lys Arg Arg Met Lys
                85                  90                  95

Arg Asp Phe Arg Leu Gln Asp Ser Asp Pro Lys Trp Pro Ser Met Trp
            100                 105                 110

Tyr Leu Asn Arg Gly Asn Gly Leu Asp Met Asn Val Ile Pro Ala Trp
        115                 120                 125

Leu Glu Gly Val Thr Gly Lys Gly Ala Val Val Thr Ile Leu Asp Asp
    130                 135                 140

Gly Leu Glu Lys Asp His Pro Asp Leu Asp Gln Asn Tyr Asp Pro Met
145                 150                 155                 160

Ala Ser Tyr Asp Val Asn Asn His Asp Ser Asp Pro Ser Pro Arg Tyr
                165                 170                 175

Asp Met Ile Asp Ser Asn Arg His Gly Thr Arg Cys Ala Gly Glu Val
            180                 185                 190

Ala Ala Thr Ser Asn Asn Ser Val Cys Ala Leu Gly Val Ala His Gly
        195                 200                 205

Ala Gln Val Gly Gly Val Arg Met Leu Asp Gly Asp Val Thr Asp Ala
    210                 215                 220

Val Glu Ala Arg Ser Leu Ser Leu Asn Pro Gln His Ile Asp Ile Tyr
225                 230                 235                 240

Ser Ala Ser Trp Gly Pro Asp Asp Asp Gly Lys Thr Val Asp Gly Pro
                245                 250                 255

Gly Glu Leu Ala Thr Arg Ala Phe Val Glu Gly Val Thr Lys Gly Arg
            260                 265                 270

Asn Gly Lys Gly Ser Ile Phe Val Trp Ala Ser Gly Asn Gly Gly Arg

```
            275                 280                 285
Asp His Asp Asn Cys Asn Cys Asp Gly Tyr Thr Leu Ser Leu Ile His
    290                 295                 300

Ile Ser Glu Pro Thr Arg Pro Tyr
305                 310

<210> SEQ ID NO 15
<211> LENGTH: 1887
<212> TYPE: DNA
<213> ORGANISM: Artificial Sequence
<220> FEATURE:
<223> OTHER INFORMATION: S8 Convertase-like with propeptide

<400> SEQUENCE: 15
atgcctctaa cctgggggct tttcgtattt ctttgtctaa ttagttatag tattgaagca      60
gatgtattta gtaattcgtt tcttgtacgt ttcagaagaa atgtagatca acgggaagct     120
tttaaaatcg ccgcccgtca tggtttcatc aatatgggac cggttctggg atcaaaacaa     180
gaatatcatt tcgttaacca tgctcttcct tcagcaagga ctagaaggag tattccattt     240
gtgaggcgtc ttaaagttga tccattggtg cacactgcaa tacaacagcc aggatttgta     300
agggttaaac gaggttataa gccattaaag gtagaaaatc tcgttcaaaa tataaaacct     360
cataaagatc cagctgatcc atattttcct ttacaatggt atctaaaaaa tacaggacaa     420
aatggtggaa aagcaaaact cgatttgaat gtggaagctg cttgggcaca aggaattacc     480
ggaaaaaaca ttacaactgc tattatggat gacggtgtcg attatatgca tccagattta     540
aaatttaact acaatgcgaa agcaagttac gatttcagca gtaacgaccc ttttccttat     600
ccaagataca cagatgattg gttcaacagt catggaactc gatgtgcagg tgaagtagct     660
gctgctaggg acaacggaat tgcggtgtt ggtgtagcat acaactcaaa aattgctggt     720
attcgcatgt tagatcaacc ctacatgact gatttaattg aagctaattc aatgggtcat     780
gaaccaaatt taatagacat atatagtgct tcttggggtc aacagacga tggaaaaact     840 gttgacggtc ctaggaacgc tacaatgaga gcaattgtca ggggtgttaa tgagggtcgt     900
aatggtttgg gtaacattta cgtatgggcg agtggtgatg tggtgaaga cgacgattgc     960 aattgtgatg gatacgctgc aagtatgtgg accatcagta tcaacagtgc aattaatgat    1020
ggacaaaatg ctcattacga tgaaagctgc tcatcgacac ttgcttccac atttagcaac    1080
ggcgctaagg atcctcacac cggagtggca acaacggatc tgtatggaaa atgtactaca    1140
actcattctg gaacatcagc tgcagcacct gaagcagcag gtgtatttgc acttgctttg    1200
gaagcaaaca ataaattgtc ttggagggac atacaacatt taacagtatt aacatcaaaa    1260
agaaattcac ttttttgatgc taaaggtcgt tttcattgga ctatgaatgg tgtaggatta    1320
gaatttaatc atttgtttgg atttggcgta ttagatgctg gagcaatggt agctttagca    1380
aaacaatgga aaacagttcc agcaagatac cattgcgaag ctggaattgt atctgaacca    1440
caaaaaattc catctagtaa atcgttaata ttgaaaataa aaacaaacgc atgtgaagga    1500
caaaatactg aagttaaata tttggaacat gtacaagcag ttttatcatt gaatgcaagt    1560
cggagaggag atttagaaat atttcttaca tcaccaatgg gtactagatc gatgattta    1620 agtcgaagaa gaaatgatga ggatgctcgt gatggtttta caaaatggcc ttttatgact    1680
acacatactt gggtgaata tccacaagga acatggttat agaaattgg ttttaattct    1740 caaaccccac aaactggtta tttcaaagaa tggactttga tgttgcatgg aactagggat    1800
cctccataca ctgagttgtc agtattagat ccacattcta aactggctat agtgaagaaa    1860
```

```
gctcatgagg gtcaagcaaa attgtaa                                              1887
```

<210> SEQ ID NO 16
<211> LENGTH: 628
<212> TYPE: PRT
<213> ORGANISM: Artificial Sequence
<220> FEATURE:
<223> OTHER INFORMATION: S8 Convertase-like with propeptide

<400> SEQUENCE: 16

```
Met Pro Leu Thr Trp Gly Leu Phe Val Phe Leu Cys Leu Ile Ser Tyr
1               5                   10                  15

Ser Ile Glu Ala Asp Val Phe Ser Asn Ser Phe Leu Val Arg Phe Arg
            20                  25                  30

Arg Asn Val Asp Gln Arg Glu Ala Phe Lys Ile Ala Ala Arg His Gly
        35                  40                  45

Phe Ile Asn Met Gly Pro Val Leu Gly Ser Lys Gln Glu Tyr His Phe
    50                  55                  60

Val Asn His Ala Leu Pro Ser Ala Arg Thr Arg Arg Ser Ile Pro Phe
65                  70                  75                  80

Val Arg Arg Leu Lys Val Asp Pro Leu Val His Thr Ala Ile Gln Gln
                85                  90                  95

Pro Gly Phe Val Arg Val Lys Arg Gly Tyr Lys Pro Leu Lys Val Glu
            100                 105                 110

Asn Leu Val Gln Asn Ile Lys Pro His Lys Asp Pro Ala Asp Pro Tyr
        115                 120                 125

Phe Pro Leu Gln Trp Tyr Leu Lys Asn Thr Gly Gln Asn Gly Gly Lys
    130                 135                 140

Ala Lys Leu Asp Leu Asn Val Glu Ala Ala Trp Ala Gln Gly Ile Thr
145                 150                 155                 160

Gly Lys Asn Ile Thr Thr Ala Ile Met Asp Asp Gly Val Asp Tyr Met
                165                 170                 175

His Pro Asp Leu Lys Phe Asn Tyr Asn Ala Lys Ala Ser Tyr Asp Phe
            180                 185                 190

Ser Ser Asn Asp Pro Phe Pro Tyr Pro Arg Tyr Thr Asp Asp Trp Phe
        195                 200                 205

Asn Ser His Gly Thr Arg Cys Ala Gly Glu Val Ala Ala Ala Arg Asp
    210                 215                 220

Asn Gly Ile Cys Gly Val Gly Val Ala Tyr Asn Ser Lys Ile Ala Gly
225                 230                 235                 240

Ile Arg Met Leu Asp Gln Pro Tyr Met Thr Asp Leu Ile Glu Ala Asn
                245                 250                 255

Ser Met Gly His Glu Pro Asn Leu Ile Asp Ile Tyr Ser Ala Ser Trp
            260                 265                 270

Gly Pro Thr Asp Asp Gly Lys Thr Val Asp Gly Pro Arg Asn Ala Thr
        275                 280                 285

Met Arg Ala Ile Val Arg Gly Val Asn Glu Gly Arg Asn Gly Leu Gly
    290                 295                 300

Asn Ile Tyr Val Trp Ala Ser Gly Asp Gly Gly Glu Asp Asp Cys
305                 310                 315                 320

Asn Cys Asp Gly Tyr Ala Ala Ser Met Trp Thr Ile Ser Ile Asn Ser
                325                 330                 335

Ala Ile Asn Asp Gly Gln Asn Ala His Tyr Asp Glu Ser Cys Ser Ser
            340                 345                 350
```

-continued

```
Thr Leu Ala Ser Thr Phe Ser Asn Gly Ala Lys Asp Pro His Thr Gly
            355                 360                 365
Val Ala Thr Thr Asp Leu Tyr Gly Lys Cys Thr Thr Thr His Ser Gly
        370                 375                 380
Thr Ser Ala Ala Ala Pro Glu Ala Ala Gly Val Phe Ala Leu Ala Leu
385                 390                 395                 400
Glu Ala Asn Asn Lys Leu Ser Trp Arg Asp Ile Gln His Leu Thr Val
                405                 410                 415
Leu Thr Ser Lys Arg Asn Ser Leu Phe Asp Ala Lys Gly Arg Phe His
            420                 425                 430
Trp Thr Met Asn Gly Val Gly Leu Glu Phe Asn His Leu Phe Gly Phe
        435                 440                 445
Gly Val Leu Asp Ala Gly Ala Met Val Ala Leu Ala Lys Gln Trp Lys
    450                 455                 460
Thr Val Pro Ala Arg Tyr His Cys Glu Ala Gly Ile Val Ser Glu Pro
465                 470                 475                 480
Gln Lys Ile Pro Ser Ser Lys Ser Leu Ile Leu Lys Ile Lys Thr Asn
                485                 490                 495
Ala Cys Glu Gly Gln Asn Thr Glu Val Lys Tyr Leu Glu His Val Gln
            500                 505                 510
Ala Val Leu Ser Leu Asn Ala Ser Arg Arg Gly Asp Leu Glu Ile Phe
        515                 520                 525
Leu Thr Ser Pro Met Gly Thr Arg Ser Met Ile Leu Ser Arg Arg Arg
    530                 535                 540
Asn Asp Glu Asp Ala Arg Asp Gly Phe Thr Lys Trp Pro Phe Met Thr
545                 550                 555                 560
Thr His Thr Trp Gly Glu Tyr Pro Gln Gly Thr Trp Leu Leu Glu Ile
                565                 570                 575
Gly Phe Asn Ser Gln Thr Pro Gln Thr Gly Tyr Phe Lys Glu Trp Thr
            580                 585                 590
Leu Met Leu His Gly Thr Arg Asp Pro Pro Tyr Thr Glu Leu Ser Val
        595                 600                 605
Leu Asp Pro His Ser Lys Leu Ala Ile Val Lys Lys Ala His Glu Gly
    610                 615                 620
Gln Ala Lys Leu
625
```

<210> SEQ ID NO 17
<211> LENGTH: 1158
<212> TYPE: DNA
<213> ORGANISM: Artificial Sequence
<220> FEATURE:
<223> OTHER INFORMATION: AprE-like Serine Protease

<400> SEQUENCE: 17

```
atgcctcggt cgcttccgtc gggcaaggac ccggctgtat tgcggcaaga aatgctcgac      60
cacggcttgg ggcttttccg cgaaattacg gtcgaagaaa gccgggtagg agaagttgtt     120
gccgctttgc agagcttccc tggtgtcgaa acggtgcaag aagaacttcc gattgtcgta     180
gatgacgaaa ttgaaaagcg agttagcagg tcgagtagcg ccgagatggg tcgttcaagc     240
gagggagata ttatcgatg caagagcaag tcgcagcgaa actgccagtc gtatttggct      300
gacgcgaacg accgtcatta caactacaac attgcgggc tcaatgtgta cgcggtgcat      360
gagcggtatc cgcataactg gggcaagggg gtgaatttgg tgtccataga ggcgtcgttc     420
tgggacccgg agcacgaaga tttgcccgtt caagcgaaga ttctcaaccc gcccttttgg     480
```

```
aaacctgacg ggcacgatac gctgagcgtc ggaataatgt ttgcgaagag aaatggaaag      540
gcgctcacag gcatcgcggt cgatgcgacg cccatgtaca gtatgtacgg cttgaaacag      600
ttggggaaca ttattccgct gctcaagccc ggcgatgtta ttcagcttgg ggttcaattc      660
gacaccggca gaggcgggat ggctccagtg gagtatgttg agcccatacg ggaggctatt      720
gctttcctcg taaaacaggg tatccatgtt gtcatggcct ccggcaacgg gtcgaacgac      780
gtcgaccagt acccgagctg taaccgcgag agggacagcg cgccatttta cgcatgcgcc      840
atcgaccctg agtttgggag tcgcgcgagc ttcaccaatt acggccatcg gtgcgacttg      900
tacgcctggg gcctggaggt ctacaccacc gattacgacc gcaaatatcc cggtgtgcac      960
aaccggtacg acttccactc gggcacgtca gcgtccaatc cgcttctggc gggcgtcgtg     1020
gctcttcttc aaggcattgc attcgaagag ggtctcgggg ccatcccccc tctgaagatg     1080
cgcgaaatcc tcgtgagaac cgcccataaa ctccccaaag ctaccctgg ttataacctg       1140
tctcttatac acatctga                                                   1158
```

<210> SEQ ID NO 18
<211> LENGTH: 385
<212> TYPE: PRT
<213> ORGANISM: Artificial Sequence
<220> FEATURE:
<223> OTHER INFORMATION: AprE-like Serine Protease

<400> SEQUENCE: 18

```
Met Pro Arg Ser Leu Pro Ser Gly Lys Asp Pro Ala Val Leu Arg Gln
1               5                   10                  15

Glu Met Leu Asp His Gly Leu Gly Leu Phe Arg Glu Ile Thr Val Glu
            20                  25                  30

Glu Ser Arg Val Gly Glu Val Val Ala Ala Leu Gln Ser Phe Pro Gly
        35                  40                  45

Val Glu Thr Val Gln Glu Glu Leu Pro Ile Val Val Asp Asp Glu Ile
    50                  55                  60

Glu Lys Arg Val Ser Arg Ser Ser Ala Glu Met Gly Arg Ser Ser
65                  70                  75                  80

Glu Gly Asp Asn Tyr Arg Cys Lys Ser Lys Ser Gln Arg Asn Cys Gln
                85                  90                  95

Ser Tyr Leu Ala Asp Ala Asn Asp Arg His Tyr Asn Tyr Asn Ile Gly
            100                 105                 110

Gly Leu Asn Val Tyr Ala Val His Glu Arg Tyr Pro His Asn Trp Gly
        115                 120                 125

Lys Gly Val Asn Leu Val Ser Ile Glu Ala Ser Phe Trp Asp Pro Glu
    130                 135                 140

His Glu Asp Leu Pro Val Gln Ala Lys Ile Leu Asn Pro Pro Phe Trp
145                 150                 155                 160

Lys Pro Asp Gly His Asp Thr Leu Ser Val Gly Ile Met Phe Ala Lys
                165                 170                 175

Arg Asn Gly Lys Ala Leu Thr Gly Ile Ala Val Asp Ala Thr Pro Met
            180                 185                 190

Tyr Ser Met Tyr Gly Leu Lys Gln Leu Gly Asn Ile Ile Pro Leu Leu
        195                 200                 205

Lys Pro Gly Asp Val Ile Gln Leu Gly Val Gln Phe Asp Thr Gly Arg
    210                 215                 220

Gly Gly Met Ala Pro Val Glu Tyr Val Glu Pro Ile Arg Glu Ala Ile
225                 230                 235                 240
```

```
Ala Phe Leu Val Lys Gln Gly Ile His Val Val Met Ala Ser Gly Asn
                245                 250                 255

Gly Ser Asn Asp Val Asp Gln Tyr Pro Ser Cys Asn Arg Glu Arg Asp
            260                 265                 270

Ser Gly Ala Ile Tyr Ala Cys Ala Ile Asp Pro Glu Phe Gly Ser Arg
        275                 280                 285

Ala Ser Phe Thr Asn Tyr Gly His Arg Cys Asp Leu Tyr Ala Trp Gly
    290                 295                 300

Leu Glu Val Tyr Thr Thr Asp Tyr Asp Arg Lys Tyr Pro Gly Val His
305                 310                 315                 320

Asn Arg Tyr Asp Phe His Ser Gly Thr Ser Ala Ser Asn Pro Leu Leu
                325                 330                 335

Ala Gly Val Val Ala Leu Leu Gln Gly Ile Ala Phe Glu Glu Gly Leu
            340                 345                 350

Gly Ala Ile Pro Pro Leu Lys Met Arg Glu Ile Leu Val Arg Thr Ala
        355                 360                 365

His Lys Leu Pro Lys Ala Thr Pro Gly Tyr Asn Leu Ser Leu Ile His
    370                 375                 380

Ile
385

<210> SEQ ID NO 19
<211> LENGTH: 717
<212> TYPE: DNA
<213> ORGANISM: Artificial Sequence
<220> FEATURE:
<223> OTHER INFORMATION: Green Fluorescent Protein

<400> SEQUENCE: 19
atgagtaaag gagaagaact tttcactgga gttgtcccaa ttcttgttga attagatggt      60
gatgttaatg ggcacaaatt ttctgtcagt ggagagggtg aaggtgatgc aacatacgga     120
aaacttaccc ttaaatttat ttgcactact ggaaaactac ctgttccatg gccaacactt     180
gtcactactt tctcttatgg tgttcaatgc ttttcaagat acccagatca tatgaaacgg     240
catgactttt tcaagagtgc catgcccgaa ggttatgtac aggaaagaac tatatttttc     300
aaagatgacg ggaactacaa gacacgtgct gaagtcaagt ttgaaggtga taccctTgtt     360
aatagaatcg agttaaaagg tattgatttt aagaagatg gaaacattct tggacacaaa     420
ttggaataca actataactc acacaatgta tacatcatgg cagacaaaca aaagaatgga     480
atcaaagtta acttcaaaat tagacacaac attgaagatg gaagcgttca actagcagac     540
cattatcaac aaaatactcc aattggcgat ggccctgtcc ttttaccaga caaccattac     600
ctgtccacac aatctgccct ttcgaaagat cccaacgaaa agagagacca catggtcctt     660
cttgagtttg taacagctgc tgggattaca catggcatgg atgaactata caaatag       717

<210> SEQ ID NO 20
<211> LENGTH: 238
<212> TYPE: PRT
<213> ORGANISM: Artificial Sequence
<220> FEATURE:
<223> OTHER INFORMATION: Green Fluorescent Protein

<400> SEQUENCE: 20

Met Ser Lys Gly Glu Glu Leu Phe Thr Gly Val Val Pro Ile Leu Val
1               5                   10                  15

Glu Leu Asp Gly Asp Val Asn Gly His Lys Phe Ser Val Ser Gly Glu
```

-continued

```
                    20                  25                  30
Gly Glu Gly Asp Ala Thr Tyr Gly Lys Leu Thr Leu Lys Phe Ile Cys
        35                  40                  45

Thr Thr Gly Lys Leu Pro Val Pro Trp Pro Thr Leu Val Thr Thr Phe
        50                  55                  60

Ser Tyr Gly Val Gln Cys Phe Ser Arg Tyr Pro Asp His Met Lys Arg
65                  70                  75                  80

His Asp Phe Phe Lys Ser Ala Met Pro Glu Gly Tyr Val Gln Glu Arg
                85                  90                  95

Thr Ile Phe Phe Lys Asp Asp Gly Asn Tyr Lys Thr Arg Ala Glu Val
                100                 105                 110

Lys Phe Glu Gly Asp Thr Leu Val Asn Arg Ile Glu Leu Lys Gly Ile
        115                 120                 125

Asp Phe Lys Glu Asp Gly Asn Ile Leu Gly His Lys Leu Glu Tyr Asn
        130                 135                 140

Tyr Asn Ser His Asn Val Tyr Ile Met Ala Asp Lys Gln Lys Asn Gly
145                 150                 155                 160

Ile Lys Val Asn Phe Lys Ile Arg His Asn Ile Glu Asp Gly Ser Val
                165                 170                 175

Gln Leu Ala Asp His Tyr Gln Gln Asn Thr Pro Ile Gly Asp Gly Pro
                180                 185                 190

Val Leu Leu Pro Asp Asn His Tyr Leu Ser Thr Gln Ser Ala Leu Ser
        195                 200                 205

Lys Asp Pro Asn Glu Lys Arg Asp His Met Val Leu Leu Glu Phe Val
        210                 215                 220

Thr Ala Ala Gly Ile Thr His Gly Met Asp Glu Leu Tyr Lys
225                 230                 235
```

KERATINOLYTIC POLYPEPTIDES AND METHODS OF USE

This application is a national stage application under 35 U.S.C. § 371 of International Application No. PCT/US2021/044385, filed Aug. 3, 2021, which claims the priority benefit of U.S. Provisional Application Ser. No. 63/219,129, filed Jul. 7, 2021, and U.S. Provisional Application Ser. No. 63/060,447, filed Aug. 3, 2020, which are hereby incorporated by reference in their entirety.

The instant application contains a computer readable Sequence Listing which has been submitted electronically in ASCII format ("Sequence Listing ASCII") and is hereby incorporated by reference in its entirety. The Sequence Listing ASCII, created on Feb. 3, 2023, is named 147402-008813-ST25.txt and is 49,476 bytes in size.

This invention was made with government support under Grant No. 2019-69012-29905 awarded by the U.S. Department of Agriculture. The government has certain rights in the invention.

FIELD

Embodiments described herein relate to recombinant nucleic acid molecules encoding keratin-degrading polypeptides, as well as methods of recombinantly producing such peptides, methods of degrading keratin, and keratin-degrading compositions.

BACKGROUND

The black carpet beetle (BCB) (*Attagenus unicolor*) is a household pest known for its destructive and expansive appetite. It feeds on a wide variety of materials including food scraps, grains, clothing, and carpets, the last from which its name is derived. The BCB is also among the small number of insects that have the unique ability to consume many different types of animal byproducts including hair, leather, silk, wool, feathers, and other keratin-rich materials that are indigestible to nearly all other organisms (Baker, J E, "Isolation and Properties of Digestive Carboxypeptidases From Midguts of Larvae of the Black Carpet Beetle *Attagenus megatoma*," *Insect. Biochem.* 11:583-591 (1981) and Baker, J E, "Resolution and Partial Characterization of the Digestive Proteinases From Larvae of the Black Carpet Beetle," In: Bhaskaran G (ed) *Current Topics in Insect Endocrinology and Nutrition*, Springer, Boston, MA pp. 283-315 (1981)).

While early studies on the BCB detailed the digestive anatomy and identified the digestive enzyme classes (Dunkel and Boush, "Studies on the Internal Anatomy of the Black Carpet Beetle, *Attagenus megatoma*," *Ann. Entomol. Soc. Am.* 61:755-765 (1968)), there remains no genomic or systematic sequence-based data to supplement these studies. This information would be imperative to identifying those enzymes that play a role in keratin degradation by this species.

In recent years, microbial biotechnology has become crucial to the advancement of a multitude of scientific fields including agriculture, food and animal science, human and veterinary medicine, and others. The utilization of these biological systems to overexpress functional proteins has revolutionized the study and application of specialized enzymes and other molecules that can be used in biotechnological approaches to solve global issues. With global populations continuing to rise, so has both the demand for finding alternative protein sources and the need to deal with excessive amounts of waste generated by industrial and municipal processes. The discovery of unique and specialized enzymes and their overexpression in microbial systems allows for these to be applied on a much larger scale than naturally intended, thus contributing to faster and more efficient and economical processes.

One area of recent concern has been the overaccumulation of waste, particularly from the food and fashion industries which generate billions of tons of material every year (Food and Agriculture Organization of the United Nations. FAOSTAT Statistical Database, [Rome]:FAO (1997)). Of this waste, woolen fabrics and keratin-rich materials such as fur, claws, and feathers are of higher concern in that they are chemically inert and unable to break down in landfills due to the strength of the keratin structure (Pahua-Ramos et al., "Degradation of Chicken Feathers: A Review," *BioTechnol: An Indian J.* 13(6): 1-24 (2017)). With few organisms or microorganisms known to be able to effectively and sustainably eliminate this material, it has been difficult to expand the specialized capability of these few organisms past small fermentation studies (Brandelli, A, "Bacterial Keratinases: Useful Enzymes for Bioprocessing Agroindustrial Wastes and Beyond," *Food Bioproc. Tech.* 1:105-116 (2008); Brandelli et al., "Biochemical Features of Microbial Keratinases and Their Production and Applications," *Appl. Microbiol. Biotech.* 85:1735-1750 (2010); Lange et al., "Microbial Decomposition of Keratin in Nature—A New Hypothesis of Industrial Relevance," *Appl. Microbiol. Biotechnol.* 100:2083-2096 (2016); and Mazotto et al., "Biodegradation of Feather Waste by Extracellular Keratinases and Gelatinases From *Bacillus* spp," *World J. Microb. Biot.* 27: 1355-1365 (2011)). However, genetic recombination of existing bacterial and fungal expression systems is a means by which this obstacle can be overcome.

While several microbial keratinolytic enzyme candidates have been identified over the years, few are able to perform at sustainable temperatures and acidity, and even fewer can degrade keratin-rich material in a timely fashion (Brandelli, A, "Bacterial Keratinases: Useful Enzymes for Bioprocessing Agroindustrial Wastes and Beyond," *Food Bioproc. Tech.* 1:105-116 (2008) and Brandelli et al., "Biochemical Features of Microbial Keratinases and Their Production and Applications," *Appl. Microbiol. Biotech.* 85:1735-1750 (2010)). The search therefore continues for a highly efficient and sustainable keratinolytic enzyme that can be scaled up to industrial and commercial conditions.

The present invention is directed to overcoming these and other deficiencies in the art.

SUMMARY

One aspect of the present disclosure relates to a recombinant nucleic acid construct comprising a nucleic acid molecule encoding a polypeptide having at least 90% sequence identity with the amino acid sequence, or fragment thereof, of SEQ ID NO:2; SEQ ID NO:4; SEQ ID NO:6; SEQ ID NO:8; SEQ ID NO:10; SEQ ID NO:12; SEQ ID NO:14; or SEQ ID NO:16.

Another aspect of the present disclosure relates to a keratin-degrading composition comprising a polypeptide having at least 90% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO:14; or SEQ ID NO: 16, where the polypeptide is capable of degrading keratin or assisting in degrading keratin; and a carrier.

Yet another aspect of the present disclosure relates to a method of recombinantly producing a polypeptide. The method involves transforming a host cell with a heterologous nucleic acid molecule, where the nucleic acid molecule encodes a polypeptide having at least 90% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO: 14; or SEQ ID NO:16.

A further aspect of the present disclosure relates to a method of degrading keratin. The method involves providing a keratin-degrading composition according to the present disclosure and contacting the keratin-degrading composition with a material comprising keratin under conditions effective to degrade the keratin.

As described in the Examples of the present disclosure, next generation sequencing was used to make a de novo transcriptome assembly of black carpet beetle fed either a standard control diet or exclusively poultry feathers. A compilation of all transcriptomic proteases was generated and subsequently compared to the protease profiles of several other insect species. Differential expression and homology-based screening of the transcriptome were used in parallel to generate a complete profile of target keratinolytic enzymes. The examples of the present disclosure demonstrate the identification, cloning, expression, and characterization of keratin-degrading enzymes from the transcriptome of the black carpet beetle.

BRIEF DESCRIPTION OF THE DRAWINGS

FIG. 10 shows images of feathers prior to (left panel) and following (right panel) incubation with a GILT-reductase like polypeptide having the amino acid sequence of SEQ ID NO: 10. A poultry feather was washed with water and diluted ethanol and checked for mites and debris prior to drying overnight. After drying, the feather was sterilized via autocloave (121° C. for 20 minutes) before proceeding. An *E. coli* culture transformed with an expression vector encoding the amino acid sequence of SEQ ID NO: 10 was induced and a single weighted sterile poultry feather was aseptically added to the culture medium and submerged via mixing. The cultures were then returned to the incubator and allowed to ferment for three days at 30° C. After fermentation, all visible feather pieces were removed from the culture and washed with water and diluted ethanol before being allowed to air dry overnight.

FIG. 11 shows the results of a BLAST search against the amino acid sequences of SEQ ID NO:2, SEQ ID NO:4, SEQ:6, SEQ ID NO:8, SEQ ID NO: 10, SEQ ID NO: 12, SEQ ID NO:14, and SEQ ID NO:16. Blast hits are identified by GenBank sequence accession number, each of which is available in the NIH sequence database and each of which is hereby incorporated by reference in its entirety.

FIG. 12 shows an alignment of the amino acid sequences referenced herein as 45417 (SEQ ID NO:12), 75635 (SEQ ID NO:14), 85625 (SEQ ID NO:16), 43962 (SEQ ID NO:8), 44648 (SEQ ID NO:10), and 53596 (SEQ ID NO:2), respectively.

FIG. 13A and FIG. 13B show a bar graph (FIG. 13A) and a table (FIG. 13B) demonstrating the net absorbance average of various evaluated enzymes: buffer only, proteinase K, Puc19, 41194, 41659, 43962, 44648, 4541, 53596, 75635, 41659/44648, 43962/41659/45417, 43962/44648, 43962/44648/45417, and 43962/53596.

DETAILED DESCRIPTION

General Definitions

Figure 1:
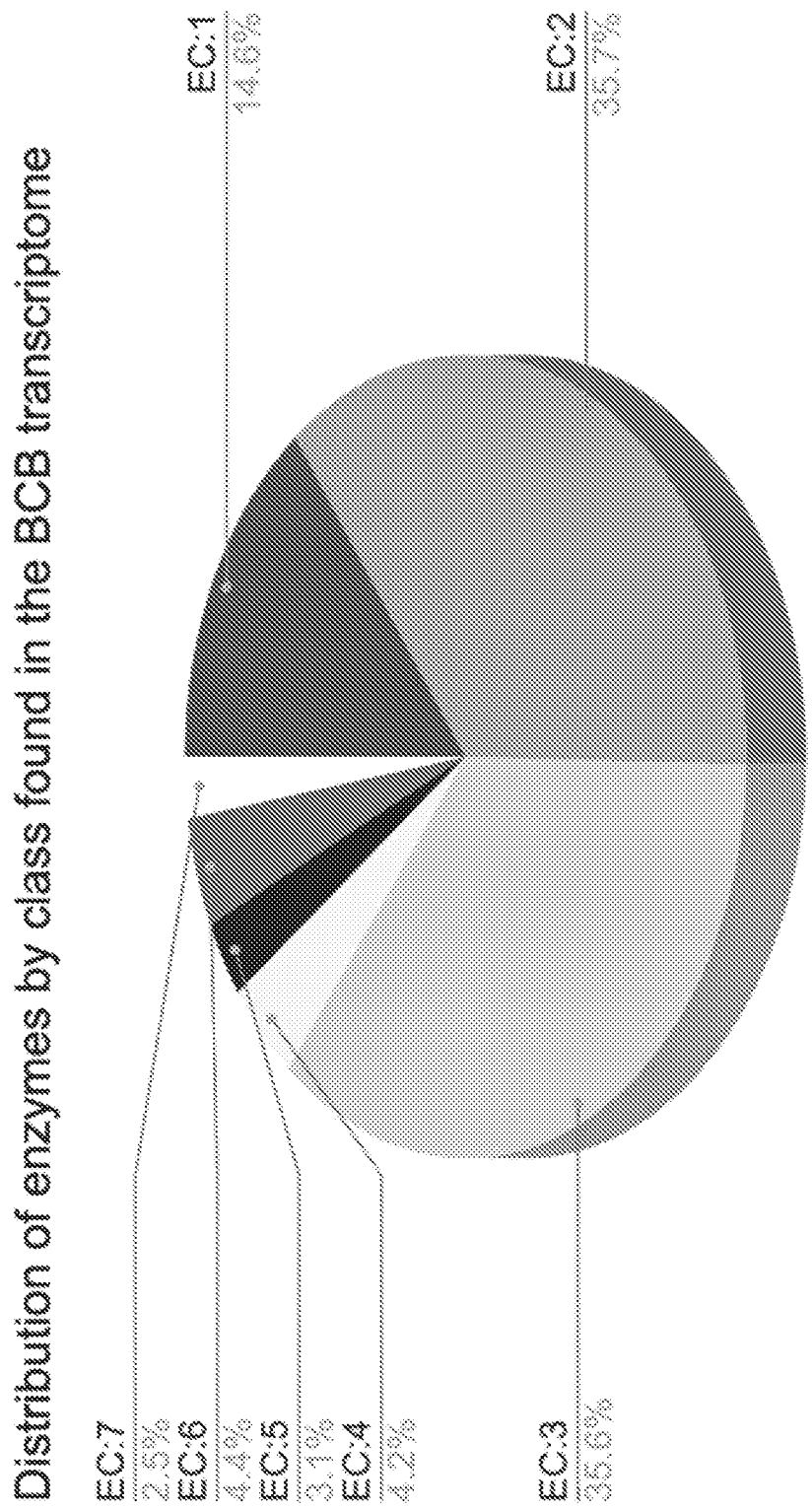
FIG. 1 is a pie chart showing the distribution of enzyme classes in the BCB transcriptome. The majority of enzymes found in the BCB transcriptome fall under the transferase (35.7%) and hydrolase classes (35.6%), respectively. These are followed by oxidoreductases, which make up approximately 14.6% of enzymes.
Figure 2A:
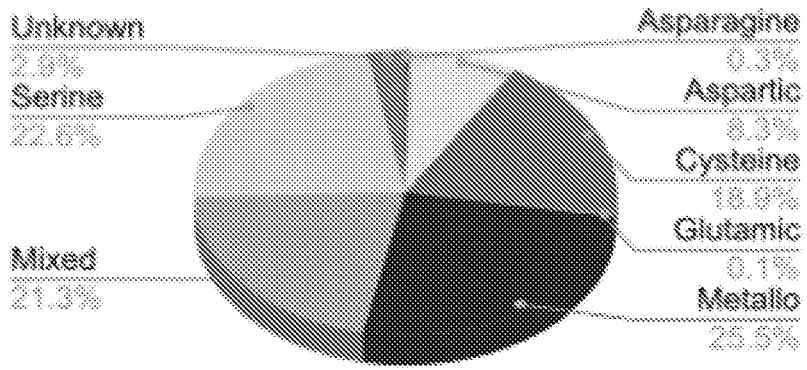
FIG. 2A-FIG. 2F are pic graphs comparing the distribution of insect peptidases by type across model species. Distribution of transcriptomic or genomic peptidases by type in the BCB transcriptome (FIG. 2A), *Anoplophora glabripennis* (FIG. 2B), *Dendroctonus ponderosae* (FIG. 2C), *Leptinotarsa declimlinata* (FIG. 2D), *Onthophagus taurus* (FIG. 2E), and *Tribolium castaneum* (FIG. 2F).
Figure 2B:
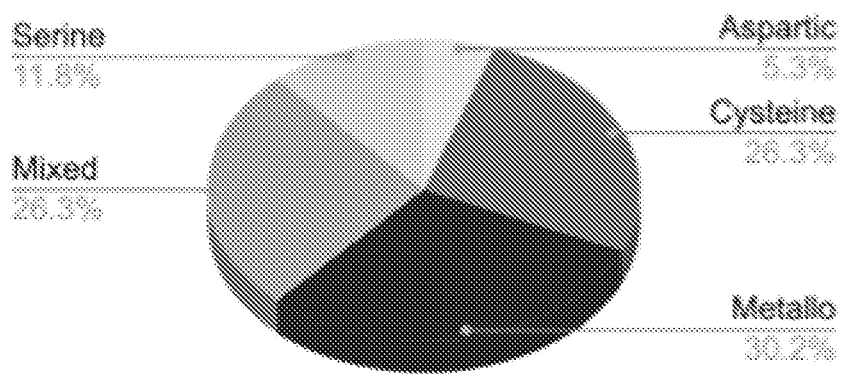
Figure 2C:
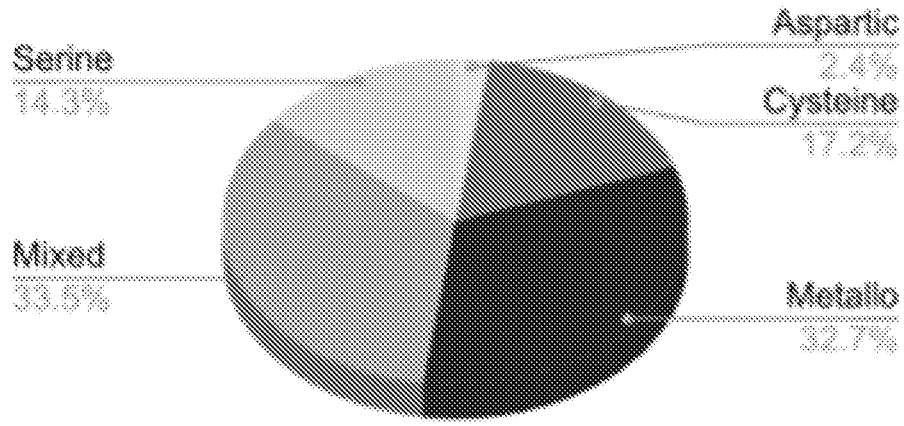
Figure 2D:
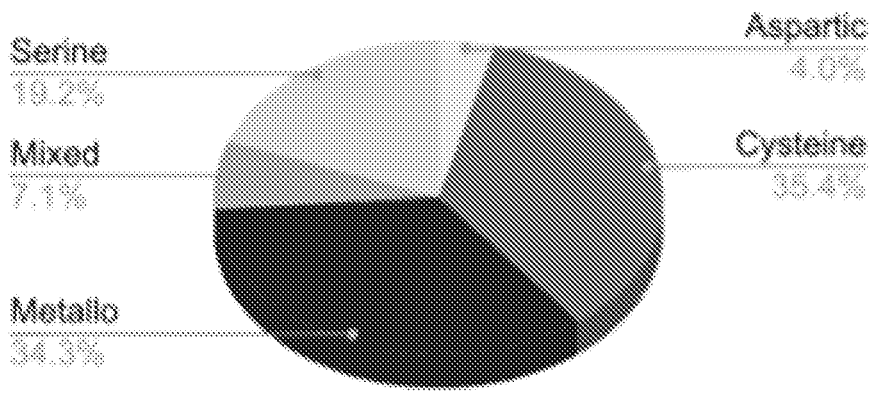
Figure 2E:
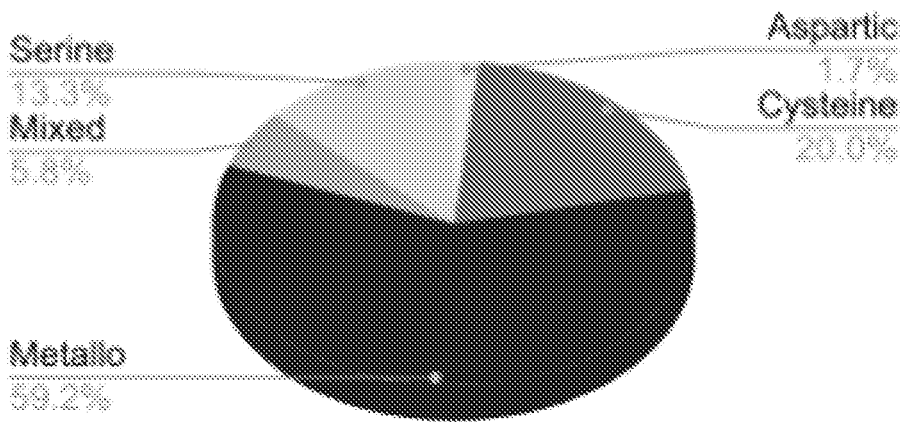
Figure 2F:
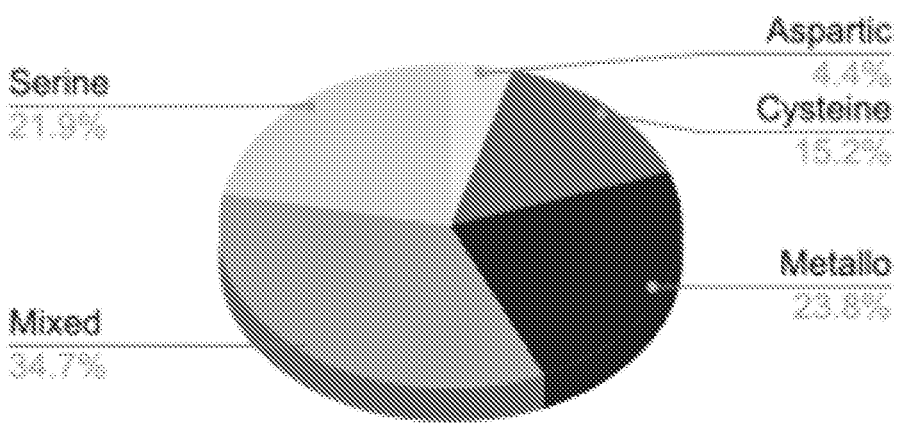

Unless otherwise indicated, the definitions and embodiments described in this and other sections are intended to be applicable to all embodiments and aspects of the present application herein described for which they are suitable as would be understood by a person skilled in the art.

Unless defined otherwise, all technical and scientific terms used in this disclosure have the same meanings as commonly understood by one of ordinary skill in the art to which this disclosure belongs.

Preferences and options for a given aspect, feature, embodiment, or parameter of the invention should, unless the context indicates otherwise, be regarded as having been disclosed in combination with any and all preferences and options for all other aspects, features, embodiments, and parameters of the invention.

As used herein, the singular forms "a," "an," and "the" and the like include plural referents unless the context clearly dictates otherwise. Thus, for example, reference to "a compound" includes both a single compound and a plurality of different compounds.

Terms of degree such as "substantially", "about", and "approximately" as used herein mean a reasonable amount of deviation of the modified term such that the end result is not significantly changed. These terms of degree should be construed as including a deviation of at least ±1% (and up to ±5% or ±10%) of the modified term if this deviation would not negate the meaning of the word it modifies.

The term "and/or" as used herein means that the listed items are present, or used, individually or in combination. In effect, this term means that "at least one of" or "one or more" of the listed items is used or present.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "involving", "having", and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. In embodiments or claims where the term comprising (or the like) is used as the transition phrase, such embodiments can also be envisioned with replacement of the term "comprising" with the terms "consisting of" or "consisting essentially of." The methods, kits, systems, and/or compositions of the present disclosure can comprise, consist essentially of, or consist of, the components disclosed.

In embodiments comprising an "additional" or "second" component, the second component as used herein is different from the other components or first component. A "third" component is different from the other, first, and second components, and further enumerated or "additional" components are similarly different.

As used herein, amino acid residues will be indicated either by their full name or according to the standard three-letter or one-letter amino acid code.

As used herein, the terms "polypeptide" or "protein" refer to a polymeric form of amino acids of any length, which can include coded and non-coded amino acids, chemically or biochemically modified or derivatized amino acids, and polypeptides having modified peptide backbones.

As used herein, the terms "nucleic acid molecule", "polynucleotide", "polynucleic acid", "nucleic acid" are used interchangeably and refer to polymeric form of nucleotides of any length, either deoxyribonucleotides or ribonucleotides, or analogs thereof. A nucleic acid molecule is represented by a nucleic acid sequence, which is primarily characterized by its base sequence. Polynucleotides may have any three-dimensional structure, and may perform any function, known or unknown. Non-limiting examples of polynucleotides include a gene, a gene fragment, exons, introns, messenger RNA (mRNA), transfer RNA, ribosomal RNA, ribozymes, cDNA, recombinant polynucleotides, branched polynucleotides, plasmids, vectors, isolated DNA of any sequence, control regions, isolated RNA of any sequence, nucleic acid probes, and primers. The nucleic acid molecule may be linear or circular.

As used herein, the term "homology" denotes at least secondary structural identity or similarity between two macromolecules, particularly between two polypeptides or polynucleotides, from same or different taxons, wherein the similarity is due to shared ancestry. Hence, the term "homologs" denotes so-related macromolecules having said secondary and optionally tertiary structural similarity. For comparing two or more nucleotide sequences, the "(percentage of) sequence identity" between a first nucleotide sequence and a second nucleotide sequence may be calculated using methods known by the person skilled in the art (e.g., by dividing the number of nucleotides in the first nucleotide sequence that are identical to the nucleotides at the corresponding positions in the second nucleotide sequence by the total number of nucleotides in the first nucleotide sequence and multiplying by 100% or by using a known computer algorithm for sequence alignment such as NCBI Blast). In determining the degree of sequence similarity between two amino acid sequences, the skilled person may take into account so-called "conservative" amino acid substitutions, which can generally be described as amino acid substitutions in which an amino acid residue is replaced with another amino acid residue of similar chemical structure and which has little or essentially no influence on the function, activity, or other biological properties of the polypeptide. Amino acid sequences and nucleic acid sequences are said to be "exactly the same" if they have 100% sequence identity over their entire length.

"Sequence identity" is herein defined as a relationship between two or more amino acid (polypeptide or protein) sequences or two or more nucleic acid (polynucleotide) sequences, as determined by comparing the sequences. The identity between two amino acid sequences is preferably defined by assessing their identity based on the full length of said sequence (i.e., over its whole length or as a whole).

In the art, "identity" also means the degree of sequence relatedness between amino acid sequences, as the case may be, as determined by the match between strings of such sequences. "Similarity" between two amino acid sequences is determined by comparing the amino acid sequence and its conserved amino acid substitutes of one polypeptide to the sequence of a second polypeptide. "Identity" and "similarity" can be readily calculated by known methods, including but not limited to those described in Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part I, Griffin, A. M., and Griffin, H. G., eds., Humana Press, New Jersey, 1994; Sequence Analysis in Molecular Biology, von Heine, G., Academic Press, 1987; and Sequence Analysis Primer, Gribskov, M. and Devereux, J., eds., M Stockton Press, New York, 1991; and Carillo, H., and Lipman, D., SIAM J. Applied Math, 48:1073 (1988), which are hereby incorporated by reference in their entirety.

Preferred methods to determine identity are designed to give the largest match between the sequences tested. Methods to determine identity and similarity are codified in publicly available computer programs. For example, computer program methods to determine identity and similarity between two sequences include, e.g., the GCG program package (Devereux, J., et al., Nucleic Acids Research 12 (1): 387 (1984), which is hereby incorporated by reference in its entirety), BestFit, FASTA, BLASTN, and BLASTP (Altschul, S. F. et al., J. Mol. Biol. 215:403-410 (1990), which is hereby incorporated by reference in its entirety), EMBOSS Needle (Madeira, F., et al., Nucleic Acids Research 47(W1): W636-W641 (2019), which is hereby incorporated by reference in its entirety); the BLAST program, which is publicly available from NCBI and other sources (BLAST Manual, Altschul, S., et al., NCBI NLM NIH Bethesda, MD 20894; Altschul, S., et al., J. Mol. Biol. 215:403-410 (1990), which is hereby incorporated by reference in its entirety); the EMBOSS program, which is publicly available from EMBL-EBI; as well as the Smith Waterman algorithm and the EMBOSS Needle program, which are well known.

Also provided herein are embodiments wherein any embodiment described herein may be combined with any one or more other embodiments, provided the combination is not mutually exclusive.

Black Carpet Beetle

The Black Carpet beetle (BCB) is a common storage pest known for its variable but destructive diet. Like other Dermestids, it is a scavenger species, and will feed on a wide range of stored goods and textiles. Differentiating the BCB from other Dermestids, however, is its remarkable and unique ability to digest keratin rich materials, including hair, wool, and feathers (Baker, J. E., "Resolution and Partial Characterization of the Digestive Proteinases from Larvae of the Black Carpet Beetle," Curr. Opin. Insect. Sci. 283-315 (1981), which is hereby incorporated by reference in its entirety). This ability is likely due to the high reducing conditions of the larval midgut, combined with a set of specialized digestive proteases that are capable of breaking down the keratin structure (Baker, J. E., "Protein Utilization by Larvae of the Black Carpet Beetle, Attagenus megatoma," J. Insect Physiol. 21(3):613-621 (1975), which is hereby incorporated by reference in its entirety).

Application of the BCB digestive capacity would be extremely useful in addressing the overabundance of keratin-rich wastes generated from global food production, particularly the meat industries (Pahua-Ramos et al., "Degradation of Chicken Feathers: A Review," BioTechnol: An Indian J. 13(6): 1-24 (2017), which is hereby incorporated by reference in its entirety). Poultry feather waste is of special concern as it is generated by the tens of millions of metric tons every year and is resistant to chemical and physical degradation (Saravanan and Dhurai, "Exploration on the Amino Acid Content and Morphological Structure in Chicken Feather Fiber," J. Text. Appar. Technol. 7(3): 1-4 (2012) and Bertsch and Coello, "A Biotechnological Process for Treatment and Recycling Poultry Feathers as a Feed Ingredient," Bioresour. Technol. 96(15): 1703-1708 (2005), which are hereby incorporated by reference in their entirety). The beta keratin structure and high proportion of disulfide bonds cause feathers to be virtually indestructible outside of incineration or harsh chemical treatment. While a small portion is converted into feather meal, the vast majority of this tonnage is discarded as waste (Arunachalam, et al., "Enzymatic Reduction of Disulfide Bonds in Lysosomes: Characterization of a Gamma-interferon-inducible Lysosomal Thiol Reductase (GILT)," PNAS 97:745-750 (2000) and Baker, JE, "Isolation and Properties of Digestive Carboxypeptidases From Midguts of Larvac of the Black Carpet Beetle Attagenus megatoma," Insect. Biochem. 11:583-591 (1981), which are hereby incorporated by reference in their entirety). However, with feathers consisting of approximately 90% protein, this waste is a sink source of untapped protein content that could be utilized for other purposes (Saravanan and Dhurai, "Exploration on the Amino Acid Content and Morphological Structure in Chicken Feather Fiber," J. Text. Appar. Technol. 7(3): 1-4 (2012), which is hereby incorporated by reference in its entirety).

While there are several microbial strains documented in the literature that possess keratinolytic activity (Brandelli, A, "Bacterial Keratinases: Useful Enzymes for Bioprocessing Agroindustrial Wastes and Beyond," Food Bioproc. Tech. 1:105-116 (2008); Brandelli et al., "Biochemical Features of Microbial Keratinases and Their Production and Applications," Appl. Microbiol. Biotech 85:1735-1750 (2010); and Lange et al., "Microbial Decomposition of Keratin in Nature—A New Hypothesis of Industrial Relevance," Appl. Microbiol. Biotechnol. 100:2083-2096 (2016), which are hereby incorporated by reference in their entirety), the industrial application of these strains is compromised due to economic and environmental limitations. Most of the keratinolytic enzymes secreted are functionally optimal at thermophilic or extremophilic conditions (Brandelli, A, "Bacterial Keratinases: Useful Enzymes for Bioprocessing Agroindustrial Wastes and Beyond," Food Bioproc. Tech. 1:105-116 (2008); Brandelli et al., "Biochemical Features of Microbial Keratinases and Their Production and Applications," Appl. Microbiol. Biotech. 85:1735-1750 (2010); and Lange et al., "Microbial Decomposition of Keratin in Nature—A New Hypothesis of Industrial Relevance," Appl. Microbiol. Biotechnol. 100:2083-2096 (2016), which are hereby incorporated by reference in their entirety), which compromises the sustainability and efficiency of the system. In contrast, studies of the black carpet beetle presented herein demonstrate that black carpet beetle digestive enzymes function at lower internal temperatures (~25° C.-30° C.) and neutral pH ranges (5.0-8.5) (Baker, J E, "Isolation and Properties of Digestive Carboxypeptidases From Midguts of Larvae of the Black Carpet Beetle Attagenus megatoma," Insect Biochem. 11:583-591 (1981) and Baker, J E, "Resolution and Partial Characterization of the Digestive Proteinases From Larvae of the Black Carpet Beetle," In: Bhaskaran G (ed) *Current Topics in Insect Endocrinology and Nutrition*, Springer, Boston, MA pp. 283-315 (1981), which are hereby incorporated by reference in their entirety), making them unique compared with these extremophilic keratinolytic enzymes. Combining the effective and specialized activity of these enzymes with simple and safe overexpression systems such as, e.g., the bacterial *E. coli* system would allow the full potential of these enzymes to be realized.

Embodiments of the disclosure relate to nucleic acid molecules encoding polypeptides with keratinolytic activity that were derived from the black carpet beetle. However, homologs (as described herein above) are also contemplated. For example, nucleic acid molecules encoding homologous polypeptides from other, e.g., beetle species are contemplated herein. Thus, in some embodiments, the nucleic acid molecule of the present disclosure encodes a homologous polypeptide from *Anthrenus verbasci* (Varied carpet beetle), *Anthrenus scrophulariae* (Common carpet beetle), *Dermestes maculatus* (Hide beetle), *Trox perrisii* (Keratin beetle), or *Trox fumaris* (Southern African hair beetle).

Recombinant Nucleic Acid Constructs

Aspects of the present disclosure relate to a recombinant nucleic acid construct comprising a nucleic acid molecule encoding a polypeptide having at least 75%, 76%, 77%, 78%, 79%, 80%, 81%, 82%, 83%, 84%, 85%, 86%, 87%, 88%, 89%, 90%, 91%, 92%, 93%, 94%, 96%, 97%, 98%, 99%, or more sequence identity with the amino acid sequence, or fragment thereof, of SEQ ID NO:2; SEQ ID NO:4; SEQ ID NO:6; SEQ ID NO:8; SEQ ID NO:10; SEQ ID NO: 12; SEQ ID NO: 14; or SEQ ID NO:16.

One aspect of the present disclosure relates to a recombinant nucleic acid construct comprising a nucleic acid molecule encoding a polypeptide having at least 90% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO:16.

As used herein, the "recombinant nucleic acid construct" of the disclosure refers to a nucleic acid molecule containing a combination of two or more genetic elements not naturally occurring together. For example, the recombinant nucleic acid construct may include a nucleic acid molecule encoding a polypeptide of interest together with a heterologous nucleic acid molecule (e.g., a heterologous promoter and/or terminator as described herein). The recombinant nucleic acid construct may comprise non-naturally occurring nucleotide sequences that can be in the form of linear DNA, circular DNA, i.e., placed within a vector (e.g., a bacterial vector) or integrated into a genome. In some embodiments, the recombinantly produced polypeptides of the present disclosure have enhanced or increased thermostability, catalytic efficiency, specific activity, and or/substrate specificity as compared to a polypeptide that is not recombinantly produced (e.g., one naturally expressed in its native host).

As described in more detail infra, the recombinant nucleic acid construct may be introduced into the host cell of interest to effectuate the expression of a polypeptide of the present disclosure (e.g., a polypeptide having at least 75%, 76%, 77%, 78%, 79%, 80%, 81%, 82%, 83%, 84%, 85%, 86%, 87%, 88%, 89%, 90%, 91%, 92%, 93%, 94%, 96%, 97%, 98%, 99%, or more sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO:14; or SEQ ID NO:16).

Exemplary nucleic acid sequences of nucleic acid molecules encoding a polypeptide of the present disclosure (e.g., SEQ ID NOs: 1, 3, 5, 7, 9, 11, 13, and 15) and an amino acid sequences of the polypeptides of the present disclosure (e.g., SEQ ID NOs: 2, 4, 6, 8, 10, 12, 14, and 16) are set forth in the table titled "Nucleotide and Encoded Amino Acid Sequences of Certain Embodiments of the Disclosure" below. Thus, in some embodiments, the recombinant nucleic acid molecule encodes a polypeptide comprising the amino acid sequence, or fragment thereof, of SEQ ID NO:2; SEQ ID NO:4; SEQ ID NO:6; SEQ ID NO:8; SEQ ID NO:10; SEQ ID NO:12; SEQ ID NO: 14; or SEQ ID NO:16.

Nucleotide and Encoded Amino Acid Sequences of Certain Embodiments of the Disclosure

| Description | Nucleotide Sequence | Encoded Amino Acid Sequence |
|---|---|---|
| "53596": AprE-like Serine Protease | ATGGCACTAGTCAAGTATGTCATTATACAATTACTATT<br>CCTTCTAACAAATTCCATAATTTACTGTAATCTAACAC<br>AAAAATATAATGAAACAAATACTGAAGATAATCTTGAA<br>TCACCTTTATGCTGTAACTTAACTACTACTCAACGTGT<br>AGAAGTAGAATATTCATCAAAATTAATTGAAAATGAAT<br>ACATAGTAACATTTAATGGCTATTATAAAAATCAAGCA<br>CGTGCTAGTTACATAAATACTGCCTTAAATACGTCTGG<br>TATCCATAAATGGAAGATATTATCACGTGAAAATCCTG<br>CCAGTGATTATCCAAGTGATTTTGATGTAGTTATTTTG<br>GAAGACACAGATAAATTGATTGGTTTAAATGCATTAAA<br>AGATCATCCTTCTGTTAAAAGGGTTACATCACAACGAA<br>TGGTATTAAGAACATTAAAATTTATTGATGCTGAGAAT<br>ATAAGACGTGGCAGAAGTAGTTTAAATCATAATAATCA<br>ATTTTGGCAAGCAACAGGTAGACATACTAGTAGAAGAC<br>TATTAAGAGCTATACCTAGACAGATCACATCTGTTTTA<br>CAAGCTGATTCTTTATGGAATATGGGGATAACAGGAAA<br>AGGAATAAAAGTAGCTGTATTTGATACTGGTTTATCAA<br>AAAGTCATCCACATTTTAGAAAAATCAAAGAAAGAACA<br>AATTGGACTAATGAAAAAACATTAGATGATGGTTTAGG<br>TCATGGCACATTTGTTGCTGGTGTTATAGCATCTAGTA<br>AAGAATGTTTAGGTTTTGCACCAGATTCTGAATTGCAT<br>ATATTTAGAGTATTTACAAGTAATCAGGTTTCTTATAC<br>ATCTTGGTTTTTGGATGCTTTTAATTATGCAATTTTAA | MALVKYVIIQLLFLLT<br>NSIIYCNLTQKYNETN<br>TEDNLESPLCCNLTTT<br>QRVEVEYSSKLIENEY<br>IVTENGYYKNQARASY<br>INTALNISGIHKWKIL<br>SRENPASDYPSDEDVV<br>ILEDTDKLIGLNALKD<br>HPSVKRVTSQRMVLRT<br>LKFIDAENIRRGRSSL<br>NHNNQFWQATGRHTSR<br>RLLRAIPRQITSVLQA<br>DSLWNMGITGKGIKVA<br>VEDTGLSKSHPHERKI<br>KERTNWTNEKTLDDGL<br>GHGTFVAGVIASSKEC<br>LGFAPDSELHIFRVET<br>SNQVSYTSWELDAFNY<br>AILKKINVLNLSIGGP<br>DFKDHPFVDKVWELTA<br>NRVIMVSAIGNDGPLY<br>GTLNNPADQMDVIGVG<br>GITFEDQIAKFSSRGM |

-continued

Nucleotide and Encoded Amino Acid Sequences of Certain Embodiments of the Disclosure

| Description | Nucleotide Sequence | Encoded Amino Acid Sequence |
|---|---|---|
| | AGAAGATAAATGTACTTAATTTAAGTATTGGTGGGCCA GATTTTAAAGATCATCCATTTGTTGATAAAGTTTGGA ACTTACAGCTAATCGTGTTATTATGGTATCTGCTATTG GAAATGATGGTCCACTATATGGTACTTTAAATAATCCT GCTGATCAAATGGATGTTATTGGTGTTGGAGGTATTAC TTTTGAAGATCAAATAGCAAAATTTTCTTCAAGAGGAA TGACCACATGGGAACTTCCACAAGGTACAGAGATTATT TTATTAATATTTATGATTTAG (SEQ ID NO: 1) | TTWELPQGTEIILLIF MI (SEQ ID NO: 2) |
| "41194": Metallo- protease | ATGAAATTGATCGTACTTGCTGTACTTATTGTCGCTGC TGCGGCCAGCAGTAGAATTCGCTATGACAATTATCAAG TTTTTCGTGTAACTCCAACTGAACAGAAACACCTCGAT GCACTTAAAGAATTGGAAGGAACTGGTTACAGTTTTTG GACTGATGTAGCTGGTTTAAACAAACCAGTTGATATCT TGGTAGCGCCACATCTTCTAAGCAATTTCGAGGATCTA GTGAGATCACTTGACTTGCAAACCGAAGTTTATATCGA AGATGTACAGACATTAATCGACAGACAAATGCCACCGG AAACAAATTTAACAGCTCGTCAAGTAACTTGGACTAAA TATCACACACTTGATGATATCAATAATTGGCTTCAATC TTTGGCCCAAACTTATCCACAAAACGTCAAAGTGATTA TTGGTGGAAAATCACACGAACAACGTAACATTGTAGGT GTACATGTTTCATTTTCTGCTAGTAATGCTAATAGAGC CATCTTTATTGAAGGTGGAATACACGCTCGTGAATGGA TTGCTCCAGCTACTGTTACGTATTTCTTAAATCAATTG TTAACAAGCAAAGATGCTTCAATTCGTGCTATTGCAGA ACGTCATGATTGGTACATTTTCCCTGTTGTCAACCCTG ATGGATACGTCTATACTTTCACTAGGGATCGTCTATGG CGTAAAACACGTGTACCATATGGTACCTGTTATGGTGC TGATCCTAATCGTAACTGGAACTACCATTGGAACGAAG TTGGAGCCAGCAACAATCCATGCGCTGAAACATATGCT GGTCCAAGAGCATTCTCAGAACCATGCACAAGAACATT ATCACAATATATTGGCACTATTGCATCTAAATTAGTGG GTTATATTGCTTTCCACTCTTACTCACAACTACTCCTA ATTCCTTATGGACATTCTTCCGCTCATGTCGAAAACTA TAACGAATTGTATTCAGTTGGACTGAAAGCAGCTACAG CCTTGTCTAAACGTTATGGAACAAGATACAAGGTCGGA AATATCGTAGAAGTTATTTATGCTGCTGCTGGAGGTAG TATGGATTGGGTTAAAGGTACTTACAAAACCCGTTTAA CATACACATATGAATTGCGTGATACTGGTCGTCATGGT TTCCTTCTTCCACCAGACCAAATTCTTCCAAACTCACT GGAAGTCCTAGATTCTCTTGTAGCCATATTCAATGAAT TTAAATAA (SEQ ID NO: 3) | MKLIVLAVLIVAAAAS SRIRYDNYQVERVTPT EQKHLDALKELEGTGY SFWTDVAGLNKPVDIL VAPHLLSNFEDLVRSL DLQTEVYIEDVQTLID RQMPPETNLTARQVTW TKYHTLDDINNWLQSL AQTYPQNVKVIIGGKS HEQRNIVGVHVSESAS NANRAIFIEGGIHARE WIAPATVTYFLNQLLT SKDASIRAIAERHDWY IFPVVNPDGYVYTFTR DRLWRKTRVPYGTCYG ADPNRNWNYHWNEVGA SNNPCAETYAGPRAFS EPCTRTLSQYIGTIAS KLVGYIAFHSYSQLLL IPYGHSSAHVENYNEL YSVGLKAATALSKRYG TRYKVGNIVEVIYAAA GGSMDWVKGTYKTRLT YTYELRDTGRHGELLP PDQILPNSLEVLDSLV AIFNEFK (SEQ ID NO: 4) |
| "41659": Carboxy- peptidase A/B-like | ATGACTTTCCGTGATAATCCTTTATACGACTTTTGGAC ACCTGTAAGACTAGCTAGTAAAACTGATATTATGGTTT CTCCTCTTGAACAAGAAGTATTTGAATCCTTTTTGATT TATCATGACTTCAAATACACTATAAGAATTAACAATGT TCAAGATACAATTGAAGCTGAACGTATGACACAACGAC TAATAGAAGATGTTCCTGAAGGAAAAATCAGTTTTACA AAGTATCATCGTTATGCTGATATTCTTGCTTACGTAAG ACAACTTGCATCACAGTATCCGAATCTTGTATCTGTAG AAACAATTGGAAAGAGTACTGAAAATCGTGATCTTGTA ATGGTTAAAATTCTTCCGGTGGAAGTGGTAAACCAGC AATTTTAATTGATGGAACTATTCATGCACGTGAATGGA TTGCACCAGCTATGGTTTTATATATTATTCAAGAATTA GTTGAAAATCCCAGCAACAGTGCACTTATTAAAGATGT CGATTGGCACATATTACCAGTTATAAATCCAGATGGTT ATGAATATTCTCATGTCACTAATCGAATGTGGAGGAAA ACTCGTTCACGTGGTTCACGTTGTTTGGTGTTGATGG CAATCGTAACTTTGATTTTCACTGGGGCGAAGTTGGTG CTAGCTCAGACGAATGTAGTGAAACTTACAAAGGTCCT ACACCATTCTCAGAACCAGAACTCGTGCTCTCAGGGA TTATGTTAAGAAAAACCCAAATAAATTCAAACTTTATT TGACTTTCCACAGTTATGGCCAGTATTTGTTATACCCT TGGGGTTATACATCAGCCTTACCATCAAACGCTAGGGA ATTACAATCATTAGGAGAAAGCGTTGGTCGCGCTATTC AAGCAATTGCTGGAACCAAATATAAAGTAGGAAGTTCA ACAAATGTTTTGTATGCTGCTGCTGGTGGTAGCGATGA TTGGGTTATGGGTGTTGGTGGTGTTTCACTTCCTTACA CAATTGAACTTCCTGGCGGTGGTGTTAACGGTTTTGAT TTACCTCCATCTAGAATACTACCAGTCGCAAAAGAAAC ATTTGAAGGTGTTAAAGTTTTTTATAATTATGTCAGAA ATTTATAA (SEQ ID NO: 5) | MTFRDNPLYDFWTPVR LASKTDIMVSPLEQEV FESFLIYHDEKYTIRI NNVQDTIEAERMTQRL IEDVPEGKISFTKYHR YADILAYVRQLASQYP NLVSVETIGKSTENRD LVMVKISSGGSGKPAI LIDGTIHAREWIAPAM VLYIIQELVENPSNSA LIKDVDWHILPVINPD GYEYSHVTNRMWRKTR SRGSRCFGVDGNRNED FHWGEVGASSDECSET YKGPTPFSEPETRALR DYVKKNPNKFKLYLTF HSYGQYLLYPWGYTSA LPSNARELQSLGESVG RAIQAIAGTKYKVGSS TNVLYAAAGGSDDWVM GVGGVSLPYTIELPGG GVNGFDLPPSRILPVA KETFEGVKVFYNYVRN L (SEQ ID NO: 6) |

| Description | Nucleotide Sequence | Encoded Amino Acid Sequence |
| --- | --- | --- |
| "43962": Aminopeptidase-N-like | ATGGGTGAAGCTGTTCTTAGGGCATTTGAATTACATAC<br>TGGAGTCAATTATACACTTCCAAAAATGGATCAAATTG<br>CTATGCCACATTTTAGTGCTGGTGCTATGGAAAATTGG<br>GGTTTAGTAATATATAGACAAACTGCTCTTTTATATAA<br>CAATAGAACATCAACAACAGCACATAAAGAATCAGTTT<br>TGTCTATTATTGCGCACGAATTTGCTCATCAATGGTTC<br>GGTGACTTAGTAAGTCCATTATGGTGGAAATATCTTTG<br>GCTTAATGAAGGATTTGCATCAATTTACGATCCTATCA<br>TCAGAGACAAAGTTAAACCTGATTGGAGAGTACTTGAA<br>AGATACGTACTTACTCTTCACAGTCTTTTCAACACTGA<br>TGGAGGACAGAACACAAGACCTATGACAAGTGATGTAT<br>ACAGTCCAGCAGAAATAGGATCAATTTTTGACAATATT<br>TCTTACGGCAAATCTGCTTGTGTTATTCGCATGTTGCT<br>AAATGCTATTACGGATCGTGTTTTCAGAGAAGGTATTA<br>AAATCTACCTGCTTGATAGAGCTTTTGCTGCCGCAGAT<br>TCTTATGATTTATGGAATGGATTACAGAAAGCAGTAGA<br>TCAAAATAACATGAATTTATCTATAAGTACATTAATGA<br>GAACTTGGGAAAATCAAAAAGGCTATCCGATTATCTAT<br>GTTAGGAGAAAATTATGGCGATGGCTTAGCAGAAATAAC<br>TCAAGAACGTTATTTGAATTTAAATCCTACACCCAACG<br>ACACATCCAGATGGTATATTCCAATTAATTACGCAACA<br>AGAAATAATTTCAATTTCTCTGAAACAGCAGCTACCGA<br>CTGGATAAATCCAAATTCTAGTTATGTTTTAAAAACAG<br>GAGCAAATGCTAATGACTGGCTCATCGTAAACAAACAA<br>CAAACTGGTTACTATCGCGTTAATTATGACAATACTAA<br>TTGGAATCTAATTGCTACCTATCTTAATACCTCTGATT<br>ATGATAAATTCATCTAATCAACCGTGCTCAATTGATC<br>AACGATGCTTTCAGTTTAGCAAAATCGCGTCGTCTAAA<br>TTACTCAGTTGCTTTGCAGTTGACTAACTATTTAGATA<br>GAGAAACAGATTACGTACCCTTACATGCGTTCTTCAAC<br>ATTCTTAATGACTTTAGTGCTATTGCTGCTGGTGCCCA<br>AAATTATTCGCTGTTCGAGAAACGTCTTGAAAATATCC<br>TAGATAAAGCAGTTGCTGAATTGGGAATAAGAGAAAAG<br>GGCCATTCAGATAAAGACCACGTAGATAACTTAAATCG<br>TATCGATGTAATCAATAAGGCTTGCGAATGGGGTAACA<br>AAAGATGCTTCTCTTTAGCAACACAAGCTTTAAACAAT<br>ATACATGCAATATCAGTTGATTTGCAAGGAGTTGTATT<br>GTGTGCAGGTATTAGAAATGCTCCGGAATATTTGTGGC<br>GTGAAATACATAAGCAAAGCTCTAATACGAGCTTAGAC<br>TCAACTCTAAGATCTTATCTTAATATCGCACTTGGTTG<br>CAGTCATAACGAAAGCATACTATCCTTATACTTAGATG<br>CAGCAGTCGATCAAAAAGTATCTGTGTTCAGTAACATT<br>TACAGTAAGGGTAGTTTTGGAGTTAAATTCATTTTCAA<br>ATACATCTTAAATAACTTTGAAAATATTTATTCAAAAT<br>TAGGAGCTGCTGAAACTGGTTTGCAGATAAAGCAGATT<br>TCACTCTACTTGAGAACTAATGAACAATTACGTCTGCT<br>AAAGGAATTACAAACTTCTAACAAACATCCAGATGTTG<br>TACAAGATTTTATCTTAGCAGTGAACAATGCTGAAAAC<br>AATATTGCTGCAGCAAAAGGATATTGGGATGATATATC<br>TTTATGGATTCAAAGTACTCTTGCATAA (SEQ ID NO: 7) | MGEAVLRAFELHTGVN<br>YTLPKMDQIAMPHFSA<br>GAMENWGLVIYRQTAL<br>LYNNRTSTTAHKESVL<br>SIIAHEFAHQWFGDLV<br>SPLWWKYLWLNEGFAS<br>IYDPIIRDKVKPDWRV<br>LERYVLTLHSLENTDG<br>GQNTRPMTSDVYSPAE<br>IGSIFDNISYGKSACV<br>IRMLLNAITDRVFREG<br>IKIYLLDRAFAAADSY<br>DLWNGLQKAVDQNNMN<br>LSISTLMRTWENQKGY<br>PIIYVRRNYGDGLAEI<br>TQERYLNLNPTPNDTS<br>RWYIPINYATRNNENF<br>SETAATDWINPNSSYV<br>LKTGANANDWLIVNKQ<br>QTGYYRVNYDNTNWNL<br>IATYLNTSDYDKIHLI<br>NRAQLINDAFSLAKSR<br>RLNYSVAL<br>QLTNYLDRETDYVPLH<br>AFFNILNDESAIAAGA<br>QNYSLFEKRLENILDK<br>AVAELGIREKGHSDKD<br>HVDNLNRIDVINKACE<br>WGNKRCFSLATQALNN<br>IHAISVDLQGVVLCAG<br>IRNAPEYLWREIHKQS<br>SNTSLDSTLRSYLNIA<br>LGCSHNESILSLYLDA<br>AVDQKVSVESNIYSKG<br>SFGVKFIFKYILNNFE<br>NIYSKLGAAETGLQIK<br>QISLYLRTNEQLRLLK<br>ELQTSNKHPDVVQDFI<br>LAVNNAENNIAAAKGY<br>WDDISLWIQSTLA<br>(SEQ ID NO: 8) |
| "44648": GILT-reductase-like | ATGAAATTCCTTCAACTTTTAGTACTTTTCGTTAGTGT<br>CTGCTATTCAACACAGGAAACAGTTAAAGTTTCAATTT<br>ACTATGAGTCATTATGCCCAGATTGTTGGAGATTTTTT<br>ATAAATCAATTTAATGCAGCTTATAGAAAAATTGGTAG<br>TTCTCTAGAAGTGGATTTGTTACCTTATGGTAAAGCTA<br>CGCAAAAAAATACTAATGGTGTTTGGACTTTCCAATGT<br>CAACATGGACCACAAGAGTGTTATGGAAATAAAGCACA<br>AGCTTGTGTTCTTTACGAAAATCCACTTTCTACAACTA<br>TAAATTATGTTGGTTGCATCATGGGAAAATCAAATCCA<br>GCATCTGATACTTACCTTAAAATGTGTGCTGATTCAAC<br>AGGAGTTTCATGGACGAAATTGCAAGAATGTCTCAAAA<br>CTACTAAAGGTGATAAATATTTGGCAGAACTTGGAGAA<br>CGTACATTGAAAGTGAAACCCAAAAATGTACCACAATT<br>GTGGTTTAATAATAAATATGATGCGATGTTGGATATAA<br>AAGGAATATCAAACTTTTTGCCAACTGTATGCAGTCTT<br>TTTAAACAAAAACCTATTGGCTGTTAA (SEQ ID NO: 9) | MKFLQLLVLFVSVCYS<br>TQETVKVSIYYESLCP<br>DCWRFFINQFNAAYRK<br>IGSSLEVDLLPYGKAT<br>QKNTNGVWTFQCQHGP<br>QECYGNKAQACVLYEN<br>PLSTTINYVGCIMGKS<br>NPASDTYLKMCADSTG<br>VSWTKLQECLKTTKGD<br>KYLAELGERTLKVKPK<br>NVPQLWENNKYDAMLD<br>IKGISNFLPTVCSLFK<br>QKPIGC (SEQ ID NO: 10) |

| Description | Nucleotide Sequence | Encoded Amino Acid Sequence |
|---|---|---|
| "45417": Trypsin-like | ATGATGACTGCTGCTCATTGTCTCGTTGGAACTACCGC TGCTCGTGTTACTGTTGTCGTAGGTACTAATACATTGA ACGCTGGTGGACAAAGATATGCTGCTGCAAGACTTGTA GTACACACAGGATATAACTCAAATACTTTCCAAAATGA TATCGCTCTCGTTCAAACATCTACTACAATTGCTTTGA GCAGCACTGTTTCAACAATTCAATTGGCAAGCTCACAC GTCGGTGGAGGTGTCGATTTAACACTCAGTGGATGGGG AACTACTTCATATCCAGGAAGCGCACCAAATAATCTTC AATACGCTGTCTTAAAATCTATTGAAAATACTGCTTGC CAACAAAGACACAGTTCAGCAACAATTTACAGTAGTCA AATTTGTACATTTACTCGTCAAGGACAAGGTGCATGCC ATGGTGACTCCGGTGGTCCATTGGCATCTGGCGGCACT CAAGTTGGTGTCGTTTCATGGGGAAGACCATGCGCTAT CGGTTATCCCGATGTATTTACTCGCGTTTCTTCATTTG TTAATTGGATCCAATCAACACACAATAA (SEQ ID NO: 11) | MMTAAHCLVGTTAARV TVVVGTNTLNAGGQRY AAARLVVHTGYNSNTF QNDIALVQTSTTIALS STVSTIQLASSHVGGG VDLTLSGWGTTSYPGS APNNLQYAVLKSIENT ACQQRHSSATIYSSQI CTFTRQGQGACHGDSG GPLASGGTQVGVVSWG RPCAIGYPDVFTRVSS FVNWIQSNTQ (SEQ ID NO: 12) |
| "75635": S8 Convertase -like | ATGTTTGTTTACGGCTATGTGCATTTTTCGTTTTAAT ACATTCAACTGAAGCTCATTATACTCAACAGTGGGCTG TACATATAGATGGTGACCGGAAGTAGCAAATGAAGTA GCCAGAGATCATGGGTTCATCAATTTAGGACAGATATT TAATAATTATTATCACTTTGCTCATCGGGGAGTTTCAA AAAGATCTGTAACGCCTAATTTACGAAGACAACAACAT TTACAAGTTGATACTCGTGTTAAATGGGCACAACAACA GAAGGTCAAACGACGTATGAAAAGGGACTTCCGATTAC AAGATTCGGATCCAAAATGGCCTAGTATGTGGTATTTG AATAGAGGAAATGGATTGGATATGAATGTAATACCTGC ATGGCTAGAAGGTGTAACAGGTAAAGGAGCTGTTGTAA CAATACTTGACGATGGTTTAGAAAAAGATCATCCAGAT CTTGATCAAAATTATGATCCTATGGCATCATACGATGT TAATAATCATGATTCTGATCCAAGTCCTAGATATGATA TGATTGATTCTAATCGTCACGGCACTCGTTGTGCTGGT GAAGTGGCAGCAACTAGTAATAATTCTGTTTGTGCACT TGGTGTAGCTCATGGAGCTCAAGTTGGTGGTGTACGTA TGCTAGATGGTGATGTTACTGATGCTGTTGAAGCTAGA TCTCTTAGTTTAAACCCGCAACACATCGATATTTATAG TGCCTCTTGGGGACCAGATGATGATGGCAAAACTGTTG ATGGACCAGGTGAATTAGCAACGAGAGCGTTTGTGGAA GGTGTAACAAAGGGAAGAAATGGTAAAGGTTCGATATT TGTTTGGGCTTCTGGTAATGGTGGAAGAGATCATGACA ATTGCAATTGCGATGGTTACACCCTGTCTCTTATACAC ATCTCCGAGCCCACGAGACCGTACTAG (SEQ ID NO: 13) | MFVYGLCAFFVLIHST EAHYTQQWAVHIDGGP EVANEVARDHGFINLG QIFNNYYHFAHRGVSK RSVTPNLRRQQHLQVD TRVKWAQQQKVKRRMK RDFRLQDSDPKWPSMW YLNRGNGLDMNVIPAW LEGVTGKGAVVTILDD GLEKDHPDLDQNYDPM ASYDVNNHDSDPSPRY DMIDSNRHGTRCAGEV AATSNNSVCALGVAHG AQVGGVRMLDGDVTDA VEARSLSLNPQHIDIY SASWGPDDDGKTVDGP GELATRAFVEGVTKGR NGKGSIFVWASGNGGR DHDNCNCDGYTLSLIH ISEPTRPY (SEQ ID NO: 14) |
| "85625": S8 Convertase -like with propeptide | ATGCCTCTAACCTGGGGCTTTTCGTATTTCTTTGTCT AATTAGTTATAGTATTGAAGCAGATGTATTTAGTAATT CGTTTCTTGTACGTTTCAGAAGAAATGTAGATCAACGG GAAGCTTTTAAAATCGCCGCCCGTCATGGTTTCATCAA TATGGGACCGGTTCTGGGATCAAAACAGAATAATCATT TCGTTAACCATGCTCTTCCTTCAGCAAGGACTAGAAGG AGTATTCCATTTGTGAGGCGTCTTAAAGTTGATCCATT GGTGCACACTGCAATACAACAGCCAGGATTTGTAAGGG TTAAACGAGGTTATAAGCCATTAAAGGTAGAAAATCTC GTTCAAAATATAAAACCTCATAAAGATCCAGCTGATCC ATATTTTCCTTTACAATGGTATCTAAAAAATACAGGAC AAAATGGTGGAAAAGCAAAACTCGATTTGAATGTGGAA GCTGCTTGGGCACAAGGAATTACCGGAAAAAACATTAC AACTGCTATTATGGATGACGGTGTCGATTATATGCATC CAGATTTAAAATTTAACTACAATGCGAAAGCAAGTTAC GATTTCAGCAGTAACGACCCTTTTCCTTATCCAAGATA CACAGATGATTGGTTCAACAGTCATGGAACTCGATGTG CAGGTGAAGTAGCTGCTGCTAGGGACAACGGAATTTGC GGTGTTGGTGTAGCATACAACTCAAAAATTGCTGGTAT TCGCATGTTAGATCAACCCTACATGACTGATTTAATTG AAGCTAATTCAATGGGTCATGAACCAAATTTAATAGAC ATATATAGTGCTTCTTGGGGTCCAACAGACGATGGAAA AACTGTTGACGGTCCTAGGAACGCTACAATGAGAGCAA TTGTCAGGGGTGTTAATGAGGGTCGTAATGGTTTGGGT AACATTTACGTATGGGCGAGTGGTGATGGTGGTGAAGA CGACGATTGCAATTGTGATGGATACGCTGCAAGTATGT GGACCATCAGTATCAACAGTGCAATTAATGATGGACAA AATGCTCATTACGATGAAAGCTGCTCATCGACACTTGC TTCCACATTTAGCAACGGCGCTAAGGATCCTCACACCG | MPLTWGLEVELCLISY SIEADVFSNSELVRER RNVDQREAFKIAARHG FINMGPVLGSKQEYHF VNHALPSARTRRSIPF VRRLKVDPLVHTAIQQ PGFVRVKRGYKPLKVE NLVQNIKPHKDPADPY FPLQWYLKNTGQNGGK AKLDLNVEAAWAQGIT GKNITTAIMDDGVDYM HPDLKENYNAKASYDE SSNDPFPYPRYTDDWE NSHGTRCAGEVAAARD NGICGVGVAYNSKIAG IRMLDQPYMTDLIEAN SMGHEPNLIDIYSASW GPTDDGKTVDGPRNAT MRAIVRGVNEGRNGLG NIYVWASGDGGEDDDC NCDGYAASMWTISINS AINDGQNAHYDESCSS TLASTFSNGAKDPHTG VATTDLYGKCTTTHSG TSAAAPEAAGVFALAL EANNKLSWRDIQHLTV LTSKRNSLFDAKGREH WTMNGVGLEFNHLFGF GVLDAGAMVALAKQWK |

| Nucleotide and Encoded Amino Acid Sequences of Certain Embodiments of the Disclosure | | |
|---|---|---|
| Description | Nucleotide Sequence | Encoded Amino Acid Sequence |
| | GAGTGGCAACAACGGATCTGTATGGAAAATGTACTACA ACTCATTCTGGAACATCAGCTGCAGCACCTGAAGCAGC AGGTGTATTTGCACTTGCTTTGGAAGCAAACAATAAAT TGTCTTGGAGGGACATACAACATTTAACAGTATTAACA TCAAAAGAAATTCACTTTTTGATGCTAAAGGTCGTTT TCATTGGACTATGAATGGTGTAGGATTAGAATTTAATC ATTTGTTTGGATTTGGCGTATTAGATGCTGGAGCAATG GTAGCTTTAGCAAAACAATGGAAAACAGTTCCAGCAAG ATACCATTGCGAAGCTGGAATTGTATCTGAACCACAAA AAATTCCATCTAGTAAATCGTTAATATTGAAAATAAAA ACAAACGCATGTGAAGGACAAAATACTGAAGTTAAATA TTTGGAACATGTACAAGCAGTTTTATCATTGAATGCAA GTCGGAGAGGAGATTTAGAAATATTTCTTACATCACCA ATGGGTACTAGATCGATGATTTTAAGTCGAAGAAGAAA TGATGAGGATGCTCGTGATGGTTTTACAAAATGGCCTT TTATGACTACACATACTTGGGGTGAATATCCACAAGGA ACATGGTTATTAGAAATTGGTTTTAATTCTCAAACCCC ACAAACTGGTTATTTCAAAGAATGGACTTTGATGTTGC ATGGAACTAGGGATCCTCCATACACTGAGTTGTCAGTA TTAGATCCACATTCTAAACTGGCTATAGTGAAGAAAGC TCATGAGGGTCAAGCAAAATTGTAA (SEQ ID NO: 15) | TVPARYHCEAGIVSEP QKIPSSKSLILKIKTN ACEGQNTEVKYLEHVQ AVLSLNASRRGDLEIF LTSPMGTRSMILSRRR NDEDARDGFTKWPFMT THTWGEYPQGTWLLEI GENSQTPQTGYFKEWT LMLHGTRDPPYTELSV LDPHSKLAIVKKAHEG QAKL (SEQ ID NO: 16) |

Suitable nucleic acid molecules of the present disclosure also include nucleic acid molecules encoding a polypeptide having at least 90%, 91%, 92%, 93%, 94%, 95%, 96%, 97%, 98%, 99%, or 100% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO:14; or SEQ ID NO:16. In some embodiments, the nucleic acid molecule encodes a polypeptide having at least 95% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16. In some embodiments, the nucleic acid molecule encodes a polypeptide having at least 98% sequence identity with the amino acid sequence, or fragment thereof, of SEQ ID NO:2; SEQ ID NO:4; SEQ ID NO:6; SEQ ID NO:8; SEQ ID NO:10; SEQ ID NO: 12; SEQ ID NO: 14; or SEQ ID NO: 16. In some embodiments, the nucleic acid molecule encodes a polypeptide having the amino acid sequence, or fragment thereof, of SEQ ID NO:2; SEQ ID NO:4; SEQ ID NO:6; SEQ ID NO:8; SEQ ID NO:10; SEQ ID NO: 12; SEQ ID NO:14; or SEQ ID NO:16.

Methods of identifying polypeptides having a percent amino acid identity to a polypeptide sequence of interest are well known in the art. For example, identifying a polypeptide sequence of interest may be carried out using the Basic Local Alignment Search Tool (BLAST) from the U.S. National Library of Medicine National Center for Biotechnology Information. FIG. 11 provides the results of a BLAST search which identifies polypeptides sequences (Blast hits) having an amino acid percent identity to the amino acid sequences of SEQ ID NO:2; SEQ ID NO:4; SEQ ID NO:6; SEQ ID NO: 8; SEQ ID NO: 10; SEQ ID NO: 12; SEQ ID NO: 14; and SEQ ID NO:16. Blast hits are identified by GenBank sequence accession number, each of which is available in the NIH sequence database (ncbi.nlm.nih.gov/genbank/) and each of which is hereby incorporated by reference in its entirety Percent identity may be illustrated in the form of a alignment. For example, FIG. 12 provides an alignment of six exemplary polypeptide sequences of the present disclosure (i.e., SEQ ID NO:12, SEQ ID NO:14, SEQ ID NO:16, SEQ ID NO:8, SEQ ID NO: 10, and SEQ ID NO:2, respectively).

Suitable nucleic acid molecules of the present disclosure also include nucleic acid molecules having at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity with the nucleotide sequence, or fragment thereof, of SEQ ID NO:1; SEQ ID NO:3; SEQ ID NO:5; SEQ ID NO:7; SEQ ID NO:9; SEQ ID NO: 11; SEQ ID NO: 13; or SEQ ID NO:15. Thus, in some embodiments the nucleic acid molecules comprises a nucleotide sequence having at least 75% sequence identity with the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO:13; or SEQ ID NO:15. In some embodiments, the nucleic acid molecule comprises a nucleotide sequence having at least 85% sequence identity with the nucleotide sequence, or fragment thereof, of SEQ ID NO: 1; SEQ ID NO:3; SEQ ID NO:5; SEQ ID NO:7; SEQ ID NO:9; SEQ ID NO: 11; SEQ ID NO: 13; or SEQ ID NO:15. In some embodiments, the nucleic acid molecule comprises a nucleotide sequence having at least 95% sequence identity with the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO: 13; or SEQ ID NO:15. In some embodiments, the nucleic acid molecule comprises the nucleotide sequence, or fragment thereof, of SEQ ID NO:1; SEQ ID NO:3; SEQ ID NO:5; SEQ ID NO:7; SEQ ID NO:9; SEQ ID NO: 11; SEQ ID NO:13; or SEQ ID NO: 15.

The term "fragment," when used herein with respect to a given sequence, refers to a contiguous stretch of the given sequence that is shorter than the full-length of the given sequence. A fragment of a given polypeptide sequence or nucleotide sequence may be defined by its first position and its final position, in which the first and final positions each correspond to a position in the sequence of the given full-length sequence.

For a polypeptide sequence, the sequence position corresponding to the first position is situated N-terminal to the sequence position corresponding to the final position. In some embodiments, the polypeptide sequence of the fragment is the contiguous amino acid sequence or stretch of amino acids in the given polypeptide that begins at the sequence position corresponding to the first position and ending at the sequence position corresponding to the final position. A fragment may also be defined by reference to a position in the given polypeptide sequence and a length of residues relative to the referenced position, whereby the sequence of the fragment is a contiguous amino acid sequence in the given full-length polypeptide that has the defined length and that is located in the given polypeptide in reference to the defined position.

In some embodiments, the fragment of the polypeptide of the present disclosure is at least one amino acid less in length than the full-length polypeptide sequence of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO: 16.

Thus, in some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, or 385 contiguous amino acids of SEQ ID NO: 2.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, or 406 contiguous amino acids of SEQ ID NO: 4.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, or 368 contiguous amino acids of SEQ ID NO: 6.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, or 627 contiguous amino acids of SEQ ID NO: 8.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, or 197 contiguous amino acids of SEQ ID NO: 10.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, or 185 contiguous amino acids of SEQ ID NO: 12.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, or 311 contiguous amino acids of SEQ ID NO: 14.

In some embodiments, the fragment of the polypeptide of the present disclosure may comprise a contiguous amino acid sequence having 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, or 627 contiguous amino acids of SEQ ID NO: 16.

In some embodiments, the fragment comprises a non-contiguous amino acid sequence with reference to a polypeptide having the amino acid sequence of SEQ ID NO:2; SEQ ID NO:4; SEQ ID NO:6; SEQ ID NO:8; SEQ ID NO:10; SEQ ID NO:12; SEQ ID NO:14; or SEQ ID NO:16. Accordingly, the fragment may comprise two or more contiguous sequences or stretches of amino acids in the reference polypeptide having the amino acid sequence of SEQ ID NO:2; SEQ ID NO:4; SEQ ID NO:6; SEQ ID NO:8; SEQ ID NO: 10; SEQ ID NO: 12; SEQ ID NO:14; or SEQ ID NO:16.

In some embodiments, the fragment of the polypeptide of the present disclosure retains the functional characteristics of the reference polynucleotide sequence (e.g., the amino acid sequence of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16). Thus, in some embodiments, the fragment of the polypeptide of the present disclosure retains the thermostability, catalytic efficiency, specific activity, and/or substrate specificity of the full-length polypeptide of the present disclosure. In some embodiments, the fragment of the polypeptide of the present disclosure has enhanced thermostability, catalytic efficiency, specific activity, and or/substrate specificity as compared to the full-length polypeptide of the present disclosure. In some embodiments, the recombinantly produced polypeptide of the present disclosure has enhanced or increased thermostability, catalytic efficiency, specific activity, and or/substrate specificity as compared to a polypeptide that is not recombinantly produced (e.g., one naturally expressed in its native host).

"Thermally stable", "thermostable", "thermostability", "thermotolerance" and the like refer to polypeptides and fragments of polypeptides of the present disclosure that retain a specified amount of enzymatic activity after exposure to a temperature over a given period of time under conditions prevailing during the hydrolysis of keratin substrates.

The term "enhanced stability" or "increased stability" in the context of a property such as thermostability refers to a higher retained keratin hydrolytic activity over time as compared to another reference enzyme comprising keratin hydrolytic activity.

The polypeptide or fragment of the polypeptide of the present disclosure may comprise a modified amino acid sequence as compared to the amino acid sequence of SEQ ID NO:2; SEQ ID NO:4; SEQ ID NO:6; SEQ ID NO:8; SEQ ID NO: 10; SEQ ID NO: 12; SEQ ID NO:14; or SEQ ID NO:16, or a fragment thereof. The modified sequence may comprise at least one substitution, deletion, or insertion in its amino acid sequence that makes it different in sequence from the reference polypeptide sequence (e.g., the amino acid sequence of SEQ ID NO:2; SEQ ID NO:4; SEQ ID NO:6; SEQ ID NO:8; SEQ ID NO: 10; SEQ ID NO: 12; SEQ ID NO:14; or SEQ ID NO: 16, or a fragment thereof).

The polypeptide or fragment of the polypeptide of the present disclosure may comprise post-translational modifications, e.g., glycosylation, acetylation, phosphorylation, palmitoylation, sumoylation, prenylation, methylation, and/or sialylation.

For a nucleic acid sequence, the sequence position corresponding to the first position is situated upstream or 5' to the sequence position corresponding to the final position. The sequence of the fragment is the contiguous nucleic acid sequence or stretch of nucleic acids in the given polypeptide that begins at the sequence position corresponding to the first position and ending at the sequence position corresponding to the final position. A fragment may also be defined by reference to a position in the given nucleotide sequence and a length of residues relative to the referenced position, whereby the sequence of the fragment is a contiguous nucleic acid sequence in the given full-length nucleotide that has the defined length and that is located in the given nucleotide in reference to the defined position.

In some embodiments, the recombinant nucleic acid construct further includes a 5' DNA promoter sequence and a 3' terminator sequence, where the nucleic acid molecule, the DNA promoter sequence, and the termination sequence are operatively coupled to permit transcription of the nucleic acid molecule.

As used herein, the terms "promoter" or "promoter region" or "promoter sequence" are used interchangeably, and refer to a segment of a nucleic acid sequence, typically but not limited to DNA, that controls the transcription of the nucleic acid sequence to which it is operatively linked. The promoter region includes specific sequences that are sufficient for polymerase recognition, binding, and transcription initiation. In addition, the promoter region can optionally include sequences which modulate this recognition, binding, and transcription initiation activity of an RNA polymerase. These sequences may be cis-acting or may be responsive to trans-acting factors. The promoter may be constitutive or regulated, depending upon the nature of the regulation.

In some embodiments, the promoter and/or the terminator is heterologous to the nucleic acid molecule encoding a polypeptide having at least 90% sequence identity with the amino acid sequence, or fragment thereof, of SEQ ID NO:2, SEQ ID NO:4, SEQ ID NO:6, SEQ ID NO:8, SEQ ID NO: 10, SEQ ID NO: 12, SEQ ID NO: 14, or SEQ ID NO: 16. As used herein, the term "heterologous to the nucleic acid molecule" refers to a nucleic acid molecule (e.g., a promoter sequence or terminator sequence) that is not operably linked to a nucleic acid molecule in nature (e.g., not operably linked to a nucleic acid molecule encoding a polypeptide having at least 90% sequence identity with the amino acid sequence, or fragment thereof, of SEQ ID NO:2, SEQ ID NO:4, SEQ ID NO:6, SEQ ID NO:8, SEQ ID NO: 10, SEQ ID NO: 12, SEQ ID NO:14, or SEQ ID NO:16).

The terms "operably linked" or "operatively linked" are used interchangeably and refer to the functional relationship of the nucleic acid sequences with regulatory sequences of nucleotides (e.g., a promoter sequence). For example, operative linkage of nucleic acid sequences, typically DNA, to a regulatory sequence or promoter region refers to the physical and functional relationship between the DNA and the regulatory sequence or promoter such that the transcription of such DNA is initiated from the regulatory sequence or promoter, by an RNA polymerase that specifically recognizes, binds and transcribes the DNA. In order to optimize expression and/or in vitro transcription, it may be possible to modify the regulatory sequence for the expression of the nucleic acid or DNA in the cell type for which it is expressed. The desirability of, or need of, such modification may be empirically determined.

The present disclosure is not restricted to any specific promoter or terminator. Suitable promoter and terminator sequences are well known in the art. In some embodiments, the promoter is a bacterial promoter, a yeast promoter, a fungal promoter, an insect promoter, an algal promoter, a plant promoter, or a mammalian promoter.

Suitable bacterial cell promoters include, without limitation, T3 bacteriophage promoter, T7 bacteriophage promoter, T7lac promoter (promoter from T7 bacteriophage plus lac operators), Sp6 bacteriophage promoter, lac promoter, araBad promoter (promoter of the arabinose metabolic operon), E. coli trp promoter (promoter from tryptophan operon), and Ptac promoter (hybrid promoter of lac and trp). Additional suitable bacterial promoters include, without limitation, recA promoter, ribosomal RNA promoter, the $P_R$ and $P_L$ promoters of coliphage lambda and others, including but not limited, to lacUV5, ompF, bla, and Ipp.

Suitable yeast cell promoters include, among others, promoters for metallothionein, 3-phosphoglycerate kinase (Hitzeman et al., "Isolation and Characterization of the Yeast 3-Phosphoglycerokinase Gene (PGK) by an Immunological Screening Technique," *J. Biol. Chem.* 255(24):2073-2080 (1980), which is hereby incorporated by reference in its entirety) or other glycolytic enzymes (Hess et al., "Cooperation of Glycolytic Enzymes, *J. Adv. Enzyme Reg.* 7:149-167 (1969) and Holland & Holland, "Isolation and Identification of Yeast Messenger Ribonucleic Acids Coding for Enolase, Glyceraldehyde-3-Phosphate Dehydrogenase, and Phosphoglycerate Kinase," *Biochem.* 17(23): 4900-4907 (1978), which are hereby incorporated by reference in their entirety), such as enolase, glyceraldehyde-3-phosphate dehydrogenase, hexokinase, pyruvate decarboxylase, phosphofructokinase, glucose-6-phosphate isomerase, 3-phosphoglycerate mutase, pyruvate kinase, triosephosphate isomerase, phosphoglucose isomerase, and glucokinase. Other suitable yeast promoters are further described in EP A-73,657 to Hitzeman, which is hereby incorporated by reference in its entirety. Another alternative is the glucose-repressible ADH2 promoter described by Russell et al., "Nucleotide Sequence of the Yeast Alcohol Dehydrogenase II Gene," *J. Biol. Chem.* 258(4): 2674-2682 (1982) and Beier et al., "Characterization of a Regulatory Region Upstream of the ADR2 Locus of *S. cerevisiae*," Nature 300(5894): 724-728 (1982), which are hereby incorporated by reference in their entirety.

Suitable fungal promoters include, among others, alcohol dehydrogenase I promoter (aleA), TAKA-amylase A promoter (amyB), blue light-inducible gene promoter (bli-3), benzoate p-hydrolase promoter (bphA), catalase promoter (catR), cellobiohydrolase I promoter (cbhI), glucose repressor promoter (cre1), endoxylanase promoter (exylA), 1,3-beta-glucanosyltransferase promoter (gas), glucoamylase A promoter (glA), glucoamylase promoter (gla1), siderophore transporter promoter (mir 1), nitrite reductase promoter (niiA), catabolic 3-dehydroquinase promoter (qa-2), endoxylanase promoter (Smxyl), copper transporter promoter (tcu-I), thiamine thiazole synthase promoter (thiA), blue light receptor promoter (vvd), endoxylanase promoter (xyl1, xylP, xyn1), transcription factor promoter (zeaR) (see, e.g., Kluge et al., "Inducible Promoters and Functional Genomic Approaches for the Genetic Engineering of Filamentous Fungi," *Appl. Microbiol. Biotechnol.* 102(15): 6357-6372 (2018), which is hereby incorporated by reference in its entirety).

Additional suitable fungal promoter include, without limitation, promoters obtained from the genes encoding *Aspergillus oryzae* TAKA amylase, *Rhizomucor miehei* aspartic proteinase, *Aspergillus niger* neutral alpha-amylase, *Aspergillus niger* acid stable alpha-amylase, *Aspergillus niger* or *Aspergillus awamori* glucoamylase (glaA), *Rhizomucor miehei* lipase, *Aspergillus nidulans* triose phosphate isomerase, *Aspergillus oryzae* alkaline protease, *Aspergillus oryzae* triose phosphate isomerase, *Aspergillus nidulans* acetamidase, *Fusarium oxysporum* trypsin-like protease (as described in U.S. Pat. No. 4,288,627, which hereby incorporated by reference in its entirety), and hybrids thereof.

Additional suitable yeast promoters include, without limitation, promoters obtained from the *Saccharomyces cerevisiae* enolase (ENO-1) gene, the *Saccharomyces cerevisiae* galactokinase gene (GAL1), the *Saccharomyces cerevisiae* alcohol dehydrogenase/glyceraldehyde-3-phosphate dehydrogenase genes (ADH2/GAP), and the *Saccharomyces cerevisiae* 3-phosphoglycerate kinase gene.

Suitable insect cell promoters include, without limitation, *Orgyia pseudotsugata* OpIE2 promoter, *Bombyx mori* cytoplasmic actin gene (BmA3) promoter, *Bombyx mori* heat shock protein (Bmhsp$^{90P2.9k}$) promoter, *P. vanderplanki* 121 promoter, *Drosophila melanogaster* actin 5C promoter, and *Drosophila melanogaster* Meigen heat shock protein 70 (hsp70) promoter (see, e.g., Miyata et al., "Identification of a Novel Strong Promoter from the Anhydrobiotic Midge, *Polypedilum vanderplanki*, with Conserved Function in Various Insect Cell lines," *Scientific Reports* 9(1):7004 (2019), which is hereby incorporated by reference in its entirety). Additional suitable insect cell promoters include viral promoters (e.g., IE1, IEN (IE2) IF0, 39K, gp64, DA26, ETL, 35K, capsid (p39) p10 and the polyhedrin promoter).

Suitable algal promoters include, among others, Cauliflower mosaic virus (CaMV) 35S, ribulose bisphosphate carboxylase (RBCS2 promoter), photosystem I complex promoter (PSAD promoter), rucoxanthin-chlorophyl binding protein (FCP promoter), ubiquitin promoter fused with the TMB-omega translation enhancer element, glyceraldehyde-3-phosphate dehydrogenase (GAPDH), nitrate reductase promoter (NIT1 promoter), and cytochrome c6 promoter (CYC6 promoter) (see, e.g., Doron et al., "Transgene Expression in Microalgae—From Tools to Applications," *Front. Plant. Sci.* (2016), which is hereby incorporated by reference in its entirety).

Suitable plant promoters include, without limitation, Cauliflower mosaic virus (CaMV) 35S, opine promoters, plant ubiquitin (Ubi), rice actin 1 (Act-1), and maize alcohol dehydrogenase 1 (Adh-1) promoters (see, e.g., Ali and Kim et al., "A Fruitful Decade Using Synthetic Promoters in the Improvement of Transgenic Plants," *Front. Plant Sci.* 10:1433 (2019), which is hereby incorporated by reference in its entirety).

Suitable mammalian cell promoters include, without limitation, the elongation factor 1-alpha promoter (EF1a) promoter, a phosphoglycerate kinase-1 promoter (PGK) promoter, a cytomegalovirus immediate early gene promoter (CMV), a chimeric liver-specific promoter (LSP), a cytomegalovirus enhancer/chicken beta-actin promoter (CAG), a tetracycline responsive promoter (TRE), a transthyretin promoter (TTR), a simian virus 40 promoter (SV40), a CK6 promoter, a mouse mammary tumor virus (MMTV) promoter, a metallothionein-1 promoter, an adenovirus E1a promoter, an immediate early promoter, an immunoglobulin heavy chain promoter, and an RSV-LTR promoter.

As used herein, the term "terminator sequence" or "transcriptional terminator sequence" refers to a nucleic acid sequence that is positioned downstream or 3' to a coding sequence which is recognized by a host cell to terminate transcription. Any terminator sequence which is functional in the selected host cell may be used. The terminator sequence may include a polyadenylation recognition sequence and/or any other sequence that encodes a regulatory signal that can affect mRNA processing or expression of an encoded polypeptide sequence. In some embodiments, the terminator sequence promotes the release of the transcription complex from a nucleic acid molecule encoding a polypeptide of the present disclosure.

In some embodiments, the terminator sequence is a bacterial terminator sequence, a yeast terminator sequence, a fungal terminator sequence, an insect terminator sequence, an algal terminator sequence, a plant terminator sequence, or a mammalian terminator sequence.

Terminator sequences are well known in the art for bacterial cells, yeast cells, fungal cells, insect cells, algal cells, plant cells, and mammalian cells.

Exemplary fungal terminator sequences are obtained from genes encoding *Aspergillus niger* neutral alpha-amylase, *Aspergillus oryzae* TAKA amylase, *Aspergillus niger* glucoamylase, *Aspergillus nidulans* anthranilate synthase, *Aspergillus niger* alpha-glucosidase, and *Fusarium oxysporum* trypsin-like protease. Exemplary yeast terminator seuqences are obtained from genes encoding *Saccharomyces cerevisiae* enolase, *Saccharomyces cerevisiae* cytochrome C (CYC1), or *Saccharomyces cerevisiae* glyceraldehyde-3-phosphate dehydrogenase.

In some embodiments, the encoded polypeptide or fragment of the polypeptide has enzymatic activity. In some embodiments, the encoded polypeptide or fragment of the polypeptide is capable of degrading keratin (catalyzing keratin degradation in the presence or absence of disulfide reductase or reducing agent), and/or assisting in degrading keratin (degradation in the presence of disulfide reductase, reducing agent, and/or other keratinase) (see. e.g., Qiu et al., Microbial Enzymes Catalyzing Keratin Degradation: Classification, Structure, Function," *Biotechnol. Adv.* 44:107607 (2020), which is hereby incorporated by reference in its entirety). In some embodiments, the encoded polypeptide or fragment of the polypeptide comprises a catalytic domain of one or more of: AprE-like Serine Protease (e.g., a polypeptide having at least 90% sequence identity with the amino acid sequence, or fragment thereof, of SEQ ID NO:2), a metalloprotease (e.g., a polypeptide having at least 90% sequence identity with the amino acid sequence, or fragment thereof, of SEQ ID NO:4), a carboxypeptidase A/B-like protease (e.g., a polypeptide having at least 90% sequence identity with the amino acid sequence, or fragment thereof, of SEQ ID NO:6), an aminopeptidase-N-like protease (e.g., a polypeptide having at least 90% sequence identity with the amino acid sequence, or fragment thereof, of SEQ ID NO:8), a GILT-reductase-like protease (e.g., a polypeptide having at least 90% sequence identity with the amino acid sequence, or fragment thereof, of SEQ ID NO: 10), a trypsin-like protease (e.g., a polypeptide having at least 90% sequence identity with the amino acid sequence, or fragment thereof, of SEQ ID NO:12), an S8 Convertase-like protease (e.g., a polypeptide having at least 90% sequence identity with the amino acid sequence, or fragment thereof, of SEQ ID NO:14), an S8 convertase-like with propeptide (e.g., a polypeptide having at least 90% sequence identity with the amino acid sequence, or fragment thereof, of SEQ ID NO:16).

Also contemplated are expression vectors comprising a recombinant nucleic acid construct of the present disclosure; a plasmid comprising a recombinant nucleic acid construct of the present disclosure; and a host cell transformed with a recombinant nucleic acid construct, an expression vector, or a plasmid of the present disclosure. Recombinant nucleic acid molecules, expression vectors, and/or plasmids according to the present disclosure can be expressed in a host cell, and the encoded polynucleotides isolated, according to techniques that are known in the art.

Generally, the use of recombinant expression systems involves inserting the nucleic acid molecule encoding the amino acid sequence of the desired peptide into an expression system to which the molecule is heterologous (i.e., not naturally present). One or more desired nucleic acid molecules encoding a peptide of the invention may be inserted into the vector. When multiple nucleic acid molecules are inserted, the multiple nucleic acid molecules may encode the same or different peptides. The heterologous nucleic acid molecule is inserted into the expression system or vector in proper sense (5'→3') orientation relative to the promoter and any other 5' regulatory molecules, and correct reading frame.

The preparation of the nucleic acid constructs can be carried out using standard cloning procedures well known in the art as described by Joseph Sambrook et al., MOLECULAR CLONING: A LABORATORY MANUAL (Cold Springs Harbor 1989). U.S. Pat. No. 4,237,224 to Cohen and Boyer, which is hereby incorporated by reference in its entirety, describes the production of expression systems in the form of recombinant plasmids using restriction enzyme cleavage and ligation with DNA ligase. These recombinant plasmids are then introduced by means of transformation and replicated in a suitable host cell.

A variety of genetic signals and processing events that control many levels of gene expression (e.g., DNA transcription and messenger RNA ("mRNA") translation) can be incorporated into the nucleic acid construct to maximize protein production. For the purposes of expressing a cloned nucleic acid sequence encoding a desired protein, it is advantageous to use strong promoters to obtain a high level of transcription. Depending upon the host system utilized, any one of a number of suitable promoters may be used. Suitable exemplary promoter are well known to those of ordinary skill in the art and are identified supra.

There are other specific initiation signals required for efficient gene transcription and translation in prokaryotic cells that can be included in the nucleic acid construct to maximize protein production. Depending on the vector system and host utilized, any number of suitable transcription and/or translation elements, including constitutive, inducible, and repressible promoters, as well as minimal 5' promoter elements, enhancers or leader sequences may be used. For a review on maximizing gene expression see Roberts and Lauer, "Maximizing Gene Expression On a Plasmid Using Recombination *In Vitro,*" *Methods in Enzymology* 68:473-82 (1979), which is hereby incorporated by reference in its entirety.

A nucleic acid molecule encoding an isolated protein of the present disclosure, a promoter molecule of choice, including, without limitation, enhancers, and leader sequences; a suitable 3' regulatory region to allow transcription in the host, and any additional desired components, such as reporter or marker genes, are cloned into the vector of choice using standard cloning procedures in the art, such as described in Joseph Sambrook et al., MOLECULAR CLONING: A LABORATORY MANUAL (Cold Springs Harbor 1989); Frederick M. Ausubel, SHORT PROTOCOLS IN MOLECULAR BIOLOGY (Wiley 1999); and U.S. Pat. No. 4,237,224 to Cohen and Boyer, which are hereby incorporated by reference in their entirety.

Once the nucleic acid molecule encoding the protein has been cloned into an expression vector, it is ready to be incorporated into a host. Recombinant molecules can be introduced into cells, without limitation, via transfection (if the host is a eukaryote), transduction, conjugation, mobilization, or electroporation, lipofection, protoplast fusion, mobilization, or particle bombardment, using standard cloning procedures known in the art, as described by JOSEPH SAMBROOK et al., MOLECULAR CLONING: A LABORATORY MANUAL (Cold Springs Harbor 1989), which is hereby incorporated by reference in its entirety.

A variety of suitable host-vector systems may be utilized to express the recombinant protein or polypeptide. Primarily, the vector system must be compatible with the host used. Host-vector systems include, without limitation, the following: bacteria transformed with bacteriophage DNA, plasmid DNA, or cosmid DNA; microorganisms such as yeast containing yeast vectors; mammalian cell systems infected with virus (e.g., vaccinia virus, adenovirus, etc.); insect cell systems infected with virus (e.g., baculovirus); and plant cells infected by bacteria.

Purified proteins may be obtained by several methods readily known in the art, including ion exchange chromatography, hydrophobic interaction chromatography, affinity chromatography, gel filtration, and reverse phase chromatography. The protein is preferably produced in purified form (preferably at least about 80% or 85% pure, more preferably at least about 90% or 95% pure) by conventional techniques. Depending on whether the recombinant host cell is made to secrete the protein into growth medium (see U.S. Pat. No. 6,596,509 to Bauer et al., which is hereby incorporated by reference in its entirety), the protein can be isolated and purified by centrifugation (to separate cellular components from supernatant containing the secreted protein) followed by sequential ammonium sulfate precipitation of the supernatant. The fraction containing the protein is subjected to gel filtration in an appropriately sized dextran or polyacrylamide column to separate the protein of interest from other proteins. If necessary, the protein fraction may be further purified by HPLC.

Some embodiments of the present disclosure are directed to a recombinant nucleic acid construct, an expression vector, or a plasmid of the present disclosure where the nucleic acid molecule encodes two or more of the polypeptide or fragment of the polypeptide. Thus, some embodiments of the present disclosure are directed to a host cell transformed with a recombinant nucleic acid construct, an expression vector, or a plasmid of the present disclosure where the nucleic acid molecule encodes two or more of the polypeptide or fragment of the polypeptide. In some embodiments, the host cell does not naturally express the polypeptide or fragment of the polypeptide (i.e., the polypeptide or fragment of the polypeptide is heterologous or exogenous to the host cell).

Suitable host cells are well known in the art and include, without limitation, a bacterial cell, a fungal cell, an insect cell, an algal cell, a plant cell, or a mammalian cell.

Suitable bacterial host cells include, without limitation, *Agrobacterium* (e.g., *Agrobacterium tumefaciens*); *Bacillus* (e.g., *Bacillus cereus, Bacillus subtilis, Bacillus thuringiensis, Bacillus weihenstephanensis*); *Bartonella* (e.g., *Bartonella henselae, Bartonella schoenbuchensis*); *Bdellovibrio* (e.g., *Bdellovibrio bacteriovorus, Bdellovibrio starri, Bdellovibrio stolpii*); *Bifidobacterium* (e.g., *Bifidobacterium adolescentis, Bifidobacterium bifidum, Bifidobacterium lactis, Bifidobacterium longum*); *Bordetella* (e.g., *Bordetella pertussis*); *Borrelia* (e.g., *Borrelia burgdorferi*); *Brucella* (e.g., *Brucella abortus, Brucella bronchiseptica*); *Burkholderia* (e.g., *Burkholderia cenocepacia, Burkholderia fungorum, Burkholderia mallei, Burkholderia pseudomallei*); *Campylobacter* (e.g., *Campylobacter fecalis, Campylobacter pylori, Campylobacter sputorum*); *Chlamydia* (e.g., *Chlamydia pneumoniae, Chlamydiapsittaci, Chlamydia trachomatis*); *Clostridium* (e.g., *Clostridium difficile, Clostridium novyi, Clostridium oncolyticum, Clostridium perfringens, Clostridium sporogenes, Clostridium tetani*); *Corynebacterium* (e.g., *Corynebacterium diphtheriae, Corynebacterium glutamicum, Corynebacterium jeikeium*); *Edwardsiella* (e.g., *Edwardsiella hoshinae, Edwardsiella ictaluri, Edwardsiella tarda*); *Enterobacter* (e.g., *Enterobacter derogenes, Enterobacter cloacae, Enterobacter sakazakii*); *Enterococcus* (e.g., *Enterococcus avium, Enterococcus faecalis, Enterococcus faecium, Enterococcus gallinarum*); *Escherichia* (e.g., *Escherichia coli*); *Eubacterium* (e.g., *Eubacterium lentum, Eubacterium nodatum, Eubacterium timidum*); *Helicobacter* (e.g., *Helicobacter pylori*); *Klebsiella* (e.g., *Klebsiella oxytoca, Klebsiella pneumoniae*); *Lactobacillus* (e.g., *Lactobacillus bulgaricus, Lactobacillus casei, Lactobacillus delbrueckii, Lactobacillus plantarum*); *Lactobacterium* (e.g., *Lactobacterium fermentum*); *Lactococcus* (e.g., *Lactococcus lactis, Lactococcus plantarum*); *Legionella* (e.g., *Legionella pneumophila*); *Listeria* (e.g., *Listeria innocua, Listeria ivanovii, Listeria monocytogenes*); *Microbacterium* (e.g., *Microbacterium arborescens, Microbacterium lacticum*); *Mycobacterium* (e.g., *Bacille Calmette-Guérin* (BCG), *Mycobacterium avium, Mycobacterium bovis, Mycobacterium paratuberculosis, Mycobacterium tuberculosis*); *Neisseria* (e.g., *Neisseria gonorrhoeae, Neisseria lactamica, Neisseria meningitidis*; *Pasteurella* (e.g., *Pasteurella haemolytica, Pasteurella multocida*); *Salmonella* (e.g., *Salmonella bongori, Salmonella enterica* ssp.; *Shigella* (e.g., *Shigella dysenteriae, Shigella flexneri, Shigella sonnei*); *Staphylococcus*(e.g., *Staphylococcus aureus, Staphylococcus lactis, Staphylococcus saprophyticus*; *Streptococcus* (e.g., *Streptococcus gordonii, Streptococcus lactis, Streptococcus pneumoniae, Streptococcus pyogenes, Streptococcus salivarius*); *Treponema* (e.g., *Treponema denticola, Treponema pallidum*); *Vibrio* (e.g., *Vibrio cholerae*); *Yersinia* (e.g., *Yersinia enterocolitica, Yersinia pseudotuberculosis*).

Suitable fungal cells include yeast cells such as those from, without limitation, *Saccharomyces, Candida, Cryptococcus, Hansenula, Karwinskia, Kluyveromyces, Pichia, Rhodotorula, Schizosaccharomyces, Torulaspora, Torulopsis,* and *Yarrowia*. For example, suitable fungal cells include *Saccharomyces cerevisiae* (e.g., BY4741 and AH109) cells, *Saccharomyces carlsbergensis* cells, *Candida albicans* cells, *Candida kefyr* cells, *Candida tropicalis* cells, *Cryptococcus laurentii* cells, *Cryptococcus neoformans* cells, *Hansenula anomala* cells, *Hansenula polymorpha* cells, *Karwinskia humboldtiana* cells, *Kluyveromyces fragilis* cells, *Kluyveromyces lactis* cells, *Kluyveromyces marxianus* var. *lactis* cells, *Pichia pastoris* cells, *Rhodotorula rubra* cells, *Schizosaccharomyces pombe* cells, *Torulaspora delbrueckii* cells, *Torulopsis glabrata* cells, and *Yarrowia lipolytica* cells.

Additional suitable fungal cells include those from, without limitation, *Acremonium*, *Aspergillus*, *Fusarium*, *Humicola*, *Mucor*, *Myceliophthora*, *Neurospora*, *Penicillium*, *Thielavia*, *Tolypocladium*, or *Trichoderma*. For example, suitable fungal cells include *Aspergillus aculeatus* cells, *Aspergillus awamori* cells, *Aspergillus clavatonanicus* cells, *Aspergillus clavatus* cells, *Aspergillus foetidus* cells, *Aspergillus giganteus* cells, *Aspergillus japonicas* cells, *Aspergillus longivesica* cells, *Aspergillus niger* cells, *Aspergillus pallidus* cells, *Aspergillus parasiticus* cells, *Aspergillus phoenicis* cells, *Aspergillus rhizopodus* cells, or *Aspergillus saitoi* cells. In some embodiments, the host cells are *Fusarium bactridioides* cells, *Fusarium cerealis* cells, *Fusarium crookwellense* cells, *Fusarium culmorum* cells, *Fusarium graminearum* cells, *Fusarium graminum* cells, *Fusarium heterosporum* cells, *Fusarium negundi* cells, *Fusarium reticulatum* cells, *Fusarium roseum* cells, *Fusarium sambucinum* cells, *Fusarium sarcochroum* cells, *Fusarium sulphureum* cells, or *Fusarium trichothecioides* cells.

Suitable insect host cells include, without limitation, S2 (*Drosophila melanogaster*, Diptera) cells, SaPe-4 (*Sarcophaga peregrina*, Diptera) cells, Sf9 (*Spodoptera frugiperda*, Lepidoptera) cells, and Tc81 (*Tribolium castaneum*, Coleoptera) cells, AeAl-2 (*Aedes albopictus*) cells, and BmN4 (*Bombyx mori*) cells. In some embodiments, the insect cells are from Sf9, Sf21, High Five™, or S2 cell lines.

Suitable algal host cells include, without limitation, *Chlorella* cells, *Nitzschia alba* cells, *Tetraselmis* cells, *Crypthecodinium* cells, *Chlamydomonas* cells (e.g., *Chlamydomonas reinhardtii* 137c and *Synechococcus elongatus* PPC 7942 cells), as well as *Parachlorella kessleri* cells, *Parachlorella beijerinckii* cells, *Neochloris oleabundans* cells, *Bracteacoccus* cells, including *B. grandis* cells, *B. cinnabarinas* cells, and *B. aerius* cells, *Bracteococcus* sp. cells or *Scenedesmus rebescens* cells. Additional suitable algal host cells include, without limitation, *Achnanthes orientalis* cells; *Agmenellum* cells; *Amphiprora hyaline* cells; *Amphora* cells, including *A. coffeiformis* cells such as *A. c. linea* cells, *A. c. punctata* cells, *A.c. taylori* cells, *A.c. tenuis* cells, *A.c. delicatissima* cells, *A.c. delicatissima capitata* cells; *Anabaena* cells; *Ankistrodesmus* cells, including *A. falcatus* cells; *Boekelovia hooglandii* cells; *Borodinella* cells; *Botryococcus braunii* cells, including *B. sudeticus* cells; *Bracteoccocus* cells, including *B. aerius* cells, *B. grandis* cells, *B. cinnabarinas* cells, *B. minor* cells, and *B. medionucleatus* cells; *Cartena* cells; *Chaetoceros* cells, including *C. gracilis* cells, *C. muelleri* cells, and *C. muelleri subsalsum* cells; *Chlorococcum* cells, including *C. infusionum* cells; *Chlorogonium* cells; *Chroomonas* cells; *Chrysosphaera* cells; *Cricosphaera* cells; *Crypthecodinium cohnii* cells; *Cryptomonas* cells; *Cyclotella* cells, including *C. cryptica* cells and *C. meneghiniana* cells; *Dunaliella* cells, including *D. bardawil* cells, *D. bioculata* cells, *D. granulate* cells, *D. maritime* cells, *D. minuta* cells, *D. parva* cells, *D. peircei* cells, *D. primolecta* cells, *D. salina* cells, *D. terricola* cells, *D. tertiolecta* cells, and *D. viridis* cells; *Eremosphaera* cells, including *F. viridis* cells; *Ellipsoidon* cells; *Euglena* cells; *Franceia* cells; *Fragilaria* cells, including *C. crotonensis* cells; *Gleocapsa* cells; *Gloeothamnion* cells; *Ilymenomonas* cells; *Isochrysis* cells, including *I. aff. galbana* cells and *I. galbana* cells; *Lepocinelis* cells; *Micractinium* cells (including UTEX LB 2614 cells); *Monoraphidium* cells, including *M. minutum* cells; *Monoraphidium* cells; *Nannochloris* cells; *Nannochloropsis* cells, including *N. salina* cells; *Navicula* cells, including *N. acceptata* cells, *N. biskanterae* cells, *N. pseudotenelloides* cells, *N. pelliculosa* cells, and *N. saprophila* cells; *Neochloris oleabundans* cells: *Nephrochloris* cells; *Nephroselmis* cells; *Nitschia communis* cells; *Nitzschia* cells, including *N. alexandrina* cells, *N. communis* cells, *N. dissipata* cells, *N. frustulum* cells, *N. hantzschiana* cells, *N. inconspicua* cells, *N. intermedia* cells, *N. microcephala* cells, *N. pusilla* cells, *N. pusilla elliptica* cells, *N. pusilla monoensis* cells, and *N. quadrangular* cells; *Ochromonas* cells; *Oocystis* cells, including *O. parva* cells and *O. pusilla* cells; *Oscillatoria* cells, including *O. limnetica* cells and *O. subbrevis* cells; *Parachlorella* cells, including *P. beijerinckii* cells (including strain SAG 2046 cells) and *P. kessleri* cells (including any of SAG strains 11.80, 14.82, 21.11H9 cells); *Pascheria* cells, including *P. acidophila* cells; *Pavlova* cells; *Phagus* cells; *Phormidium* cells; *Platymonas* cells; *Pleurochrysis* cells, including *P. carterae* cells and *P. dentate* cells; *Prototheca* cells, including *P. stagnora* cells (including UTEX 327), *P. portoricensis* cells, and *P. moriformis* cells (including UTEX strains 1441, 1435, 1436, 1437, 1439); *Pseudochlorella aquatica* cells; *Pyramimonas* cells; *Pyrobotrys* cells; *Rhodococcus opacus* cells; *Sarcinoid chrysophyte* cells; *Scenedesmus* cells, including *S. armatus* cells and *S. rubescens* cells; *Schizochytrium* cells; *Spirogyra* cells; *Spirulina platensis* cells; *Stichococcus* cells; *Synecho coccus* cells; *Tetraedron* cells; *Tetraselmis* cells, including *T. suecica* cells; *Thalassiosira weissflogii* cells; and *Viridiella fridericiana* cells.

Suitable plant cells include, without limitation, cells from monocots and dicots.

Suitable mammalian cells include, without limitation, Chinese hamster ovary (CHO) cells, HeLa cells, Cos-7 cells (African green monkey kidney fibroblast-like cell line), mouse myeloma NSO cell line, mouse myeloma SP2/0 cell line, rat myeloma cell line YB2/0, Baby Hamster Kidney (BHK) cells, Human Embryonic Kidney 293 (HEK293) cells, human fibrosarcoma cell line HT01080 cells, human hepatoma Huh-7 cells, human hepatoma HepG2 cells, and PER.C6 cells.

In some embodiments, the host cell is an *E. coli* cell, a *Lactobacillus* cell, a *Bacillus* cell, a microalgal cell, an *Aspergillus* cell, or a *Pichia* cell. In some embodiments, the host cell is a yeast cell.

The various types of cells that are used herein are grown and cultured according to methods well known in the art. Generally, a cell culture medium contains a buffer, salts, energy source, amino acids (e.g., natural amino acids, non-natural amino acids, etc.), vitamins, and/or trace elements. Cell culture media may optionally contain a variety of other ingredients, including but not limited to, carbon sources (e.g., natural sugars, non-natural sugars, etc.), cofactors, lipids, sugars, nucleosides, animal-derived components, hydrolysates, hormones, growth factors, surfactants, indicators, minerals, activators of specific enzymes, activators inhibitors of specific enzymes, enzymes, organics, and/or small molecule metabolites.

Keratin-Degrading Compositions

Some aspects of the present disclosure relate to a keratin-degrading composition comprising a polypeptide having at least 75%, 76%, 77%, 78%, 79%, 80%, 81%, 82%, 83%, 84%, 85%, 86%, 87%, 88%, 89%, 90%, 91%, 92%, 93%, 94%, 96%, 97%, 98%, 99%, or more sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO:16.

Another aspect of the present disclosure relates to a keratin-degrading composition comprising a polypeptide having at least 90% sequence identity with the amino acid sequence, or fragment thereof, of SEQ ID NO:2, SEQ ID NO:4; SEQ ID NO:6; SEQ ID NO:8; SEQ ID NO: 10; SEQ ID NO:12; SEQ ID NO:14; or SEQ ID NO: 16, where the polypeptide is capable of degrading keratin or assisting in degrading keratin; and a carrier.

In some embodiments, the polypeptide is a recombinant polypeptide. Suitable recombinant polypeptides of the present disclosure (e.g., a polypeptide having at least 90% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO: 16) and fragments and modifications thereof are described in more detail supra.

The composition may comprise a polypeptide having at least 90%, 91%, 92%, 93%, 94%, 95%, 96%, 97%, 98%, 99%, or 100% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO: 16. Thus, in some embodiments, the composition comprises a polypeptide having at least 95% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO: 16. In some embodiments, the composition comprises a polypeptide having at least 98% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO:16. In some embodiments, the composition comprises a polypeptide comprising the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO: 16.

In some embodiments, the polypeptide is a keratinase. As used herein, the term "keratinase" refers to a proteolytic enzyme that hydrolyzes keratin. The keratinase may be selected from, e.g., an aminopeptidase-N-like enzyme, a trypsin-like enzyme, a GILT-like reductase, an AprE-like convertase, and an S8-convertase.

The composition may comprise one or more of a cell of the present disclosure, a cell extract derived from a cell of the present disclosure, or a cell lysate derived from a cell of the present disclosure. Suitable cells are described in more detail supra.

As used herein, the term "cell lysate" refers to a composition obtained by disruption of cellular membranes. Cell lysates may be prepared by contacting a cell of the present disclosure with a chemical reagent (e.g., a detergent or lysis buffer such) or by mechanical disruption of cellular membranes (e.g., by using a French press, sonication, homogenization, nebulization, freeze-thaw, etc.). Suitable chemical reagents for cell lysis include, without limitation, M-PER™ reagent, T-PER™ reagent, N-PERT™ reagent, NE-PER™ reagent, B-PER™ reagent, Y-PER™ reagent, I-PER™ reagent, P-PER™ reagent. Suitable additional chemical reagents include detergents such as Triton X-100, Triton X-114, NP-40, Brij-35, Brij-58, Tween-20, Tween-80, octylglucoside, octylthioglucoside, SDS, and CHAPS.

The term "cell extract" may refer to purified and/or concentrated components derived from a cell lysate. For example, the cell extract may be prepared by centrifuging a cell lysate to remove cellular debris. Thus, in some embodiments, the cell extract is free of cellular debris. The cell extract may be further purified by filtration (e.g., by centrifugal filtration and/or dialysis).

The keratin-containing composition may be a solid or a solution.

The carrier to be used for the solution may vary depending on the polypeptide of the disclosure. In some embodiments, the carrier is an aqueous liquid. Thus, in some embodiments, the carrier is water. The aqueous liquid may be an aqueous buffer, e.g., a Tris-HCl buffer or an ammonium bicarbonate buffer. In some embodiments, the buffer is a 50 mM Tris-HCl (pH 8) buffer. In some embodiments, the buffer is a 50 mm ammonium bicarbonate (pH 7.8) buffer.

In some embodiments, the polypeptide of the present disclosure degrades keratin or assists in degrading keratin at a temperature in the range of 20 to 80 degrees C. For example, the polypeptide of the present disclosure may degrade keratin or assist in degrading keratin at a temperature of about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., or about 80° C.

In some embodiments, the polypeptide of the present disclosure degrades keratin or assists in degrading keratin at a temperature in the range of 20 to 42 degrees C.

In some embodiments, the polypeptide of the present disclosure degrades keratin or assists in degrading keratin at a temperature in the range of 40° C. to 60° C. In some embodiments, the polypeptide of the present disclosure degrades keratin or assists in degrading keratin at a temperature in the range of 45° C. to 55° C. In some embodiments, the polypeptide of the present disclosure degrades keratin or assists in degrading keratin at a temperature of about 50° C.

In some embodiments, the polypeptide of the present disclosure degrades keratin or assists in degrading keratin at a temperature in the range of 28° C. to 50° C. In some embodiments, the polypeptide of the present disclosure degrades keratin or assists in degrading keratin at a temperature in the range of 29° C. to 34° C. In some embodiments, the polypeptide of the present disclosure degrades keratin or assists in degrading keratin at a temperature of about 30° C.

In some embodiments, the polypeptide degrades keratin or assists in degrading keratin at a pH range of pH 2.0 to pH 12.0. For example, the polypeptide of the present disclosure may degrade keratin or assist in degrading keratin at a pH of about 2.0, at a pH of about 2.5, at a pH of about 3.0, at a pH of about 3.5, at a pH of about 4.0, at a pH of about 4.5, at a pH of about 5.0, at a pH of about 5.5, at a pH of about 6.0, at a pH of about 6.5, at a pH of about 7.0, at a pH of about 7.5, at a pH of about 8.0, at a pH of about 8.5, at a pH of about 9.0, at a pH of about 9.5, at a pH of about 10.0, at a pH of about 10.5, at a pH of about 11.0, at a pH of about 11.5, or at a pH of about 12.0. In some embodiments, the polypeptide degrades keratin or assists in degrading keratin at a pH range of pH 2.5 to pH 8.5.

In some embodiments, the polypeptide degrades keratin or assists in degrading keratin at a pH in the range of 7.0 to 8.0, 7.0 to 8.5, or 7.0 to 9. In some embodiments, the polypeptide degrades keratin or assists in degrading keratin at a pH in the range of 7.5 to 8.5. In some embodiments, the polypeptide degrades keratin or assists in degrading keratin at a pH in the range of 7.5 to 8.0. In some embodiments, the polypeptide degrades keratin or assists in degrading keratin at a pH of about 7.5. In some embodiments, the polypeptide degrades keratin or assists in degrading keratin at a pH of about 8.0.

In some embodiments, the composition comprises one or more of the following: an AprE-like Serine Protease or catalytic domain thereof (e.g., a polypeptide having at least 90% sequence identity with the amino acid sequence, or fragment thereof, of SEQ ID NO:2), a metalloprotease or catalytic domain thereof (e.g., a polypeptide having at least 90% sequence identity with the amino acid sequence, or fragment thereof, of SEQ ID NO:4), a carboxypeptidase A/B-like protease or catalytic domain thereof (e.g., a polypeptide having at least 90% sequence identity with the amino acid sequence, or fragment thereof, of SEQ ID NO:6), an aminopeptidase-N-like protease or catalytic domain thereof (e.g., a polypeptide having at least 90% sequence identity with the amino acid sequence, or fragment thereof, of SEQ ID NO:8), a GILT-reductase-like protease or catalytic domain thereof (e.g., a polypeptide having at least 90% sequence identity with the amino acid sequence, or fragment thereof, of SEQ ID NO:10), a trypsin-like protease or catalytic domain thereof (e.g., a polypeptide having at least 90% sequence identity with the amino acid sequence, or fragment thereof, of SEQ ID NO: 12), an S8 Convertase-like protease or catalytic domain thereof (e.g., a polypeptide having at least 90% sequence identity with the amino acid sequence, or fragment thereof, of SEQ ID NO:14), an S8 convertase-like with propeptide or catalytic domain thereof (e.g., a polypeptide having at least 90% sequence identity with the amino acid sequence, or fragment thereof, of SEQ ID NO:16).

In some embodiments, the composition comprises a combination of two or more of the polypeptides. Thus, in some embodiments, the composition comprises: (i) aminopeptidase-N-like protease and an AprE-like Serine Protease; (ii) an aminopeptidase-N-like protease and a GILT reductase; or (iii) an aminopeptidase-N-like protease, an AprE-like Serine Protease, and a GILT reductase. For example, the composition may comprise: (i) a polypeptide having at least 90% sequence identity with the amino acid sequence, or fragment thereof, of SEQ ID NO:2 and a polypeptide having at least 90% sequence identity with the amino acid sequence, or fragment thereof, of SEQ ID NO:8; (ii) a polypeptide having at least 90% sequence identity with the amino acid sequence, or fragment thereof, of SEQ ID NO:2 and a polypeptide having at least 90% sequence identity with the amino acid sequence, or fragment thereof, of SEQ ID NO:10; or a polypeptide having at least 90% sequence identity with the amino acid sequence, or fragment thereof, of SEQ ID NO:2, a polypeptide having at least 90% sequence identity with the amino acid sequence, or fragment thereof, of SEQ ID NO:8, or (iii) a polypeptide having at least 90% sequence identity with the amino acid sequence, or fragment thereof, of SEQ ID NO:2 and a polypeptide having at least 90% sequence identity with the amino acid sequence, or fragment thereof, of SEQ ID NO:10.

In some embodiments, the composition further comprises a reducing agent. Suitable reducing agents include, without limitation, sodium metabisulfite, sodium sulfite, sodium bisulfite, calcium sulfite, sodium thioglycolate, phosphites, 2-mercaptoethanol, bis (2-mercaptoethyl) sulfone, 2, 3-dimercapto-1-propanol, dithiothreitol, dithiobutylamine, L-cysteine, ethyl cysteine, methyl cysteine, trialkylphosphine, tris (2-carboxyethyl) phosphine hydrochloride, and combinations thereof. Additional suitable reducing gents include, without limitation, urea, thiourea, guanidinium salts, and combinations thereof.

In some embodiments, the reducing agent reduces disulfide bonds. Thus, in some embodiments, the reducing agent is sodium metabisulfite, sodium sulfite, sodium bisulfite, calcium sulfite, and/or sodium thioglycolate.

In some embodiments, the composition further comprises a chaotropic agent. As described herein, the chaotropic agent acts to disrupt the sufficiently compact beta sheet structure of keratin. Chaotropic agents act to disrupt protein structure by destabilizing non-covalent forces, i.e., hydrogen bonding interactions, van der waals forces, hydrophobic interactions, and ionic interaction mediated interactions. By disrupting the non-covalent interactions, the chaotropic agent makes it possible for additional solvent to penetrate the beta sheet structure of keratin. This allows the protein to be more easily solubilized and results in solubilizing additional amounts of protein. Suitable chaotropic agents include, without limitation, urea, thiourea, guanidinium salts, or combinations thereof.

Methods For Recombinantly Producing A Polypeptide

Some aspects of the present disclosure relate to a method of recombinantly producing a polypeptide. This method involves transforming a host cell with a heterologous nucleic acid molecule, where the nucleic acid molecule encodes a polypeptide having at least 75%, 76%, 77%, 78%, 79%, 80%, 81%, 82%, 83%, 84%, 85%, 86%, 87%, 88%, 89%, 90%, 91%, 92%, 93%, 94%, 96%, 97%, 98%, 99%, or more sequence identity with the amino acid sequence, or fragment thereof, of SEQ ID NO:2; SEQ ID NO:4; SEQ ID NO:6; SEQ ID NO:8; SEQ ID NO:10; SEQ ID NO:12; SEQ ID NO:14; or SEQ ID NO:16.

Yet another aspect of the present disclosure relates to a method of recombinantly producing a polypeptide. The method involves transforming a host cell with a heterologous nucleic acid molecule, where the nucleic acid molecule encodes a polypeptide having at least 90% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO: 16.

In some embodiments, the nucleic acid molecule encodes a polypeptide having at least 90%, 91%, 92%, 93%, 94%, 95%, 96%, 97%, 98%, 99%, or 100% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO:16. Thus, in some embodiments, the nucleic acid molecule encodes a polypeptide having at least 95% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO:16. In some embodiments, the nucleic acid molecule encodes a polypeptide having at least 98% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO:14; or SEQ ID NO:16. In some embodiments, the nucleic acid molecule encodes a polypeptide comprising the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO:16.

In some embodiments, the nucleic acid molecule comprises a nucleotide sequence having at least 75%, 76%, 77%, 78%, 79%, 80%, 81%, 82%, 83%, 84%, 85%, 86%, 87%, 88%, 89%, 90%, 91%, 92%, 93%, 94%, 96%, 97%, 98%, 99%, or more sequence identity with the amino acid sequence, or fragment thereof, of SEQ ID NO:1; SEQ ID NO:3; SEQ ID NO:5; SEQ ID NO:7; SEQ ID NO:9; SEQ ID NO:11; SEQ ID NO: 13; or SEQ ID NO:15. Thus, in some embodiments, the nucleic acid molecule comprises a nucleotide sequence having at least 75% sequence identity with the amino acid sequence, or fragment thereof, of SEQ ID NO:1; SEQ ID NO:3; SEQ ID NO:5; SEQ ID NO:7; SEQ ID NO:9; SEQ ID NO: 11; SEQ ID NO: 13; or SEQ ID NO:15. In some embodiments, the nucleic acid molecule comprises a nucleotide sequence having at least 85% sequence identity with the amino acid sequence, or fragment thereof, of SEQ ID NO:1; SEQ ID NO:3; SEQ ID NO:5; SEQ ID NO:7; SEQ ID NO:9; SEQ ID NO:11; SEQ ID NO:13; or SEQ ID NO:15. In some embodiments, the nucleic acid molecule comprises a nucleotide sequence having at least 95% sequence identity with the amino acid sequence, or fragment thereof, of SEQ ID NO: 1; SEQ ID NO:3; SEQ ID NO:5; SEQ ID NO:7; SEQ ID NO:9; SEQ ID NO:11; SEQ ID NO:13; or SEQ ID NO:15.

In some embodiments, the nucleic acid molecule comprises the nucleotide sequence of SEQ ID NO:1; SEQ ID NO:3; SEQ ID NO:5; SEQ ID NO: 7; SEQ ID NO:9; SEQ ID NO:11; SEQ ID NO:13; or SEQ ID NO:15.

In some embodiments, the encoded polypeptide or fragment of the polypeptide is capable of degrading keratin or assisting in degrading keratin.

Suitable host cells for use in the methods described herein are described in more detail supra and include, e.g., a bacterial cell, a fungal cell, an insect cell, an algal cell, a plant cell, and a mammalian cell.

In some embodiments, the host cell is an *Escherichia coli* cell, a *Lactobacillus* cell, a *Bacillus* cell, a microalgal cell, an *Aspergillus* cell, or a *Pichia* cell (e.g., *Pichia pastoris*).

In some embodiments, the host cell is a yeast cell. Suitable yeast cells are described herein above and include, without limitation, different strains of *Saccharomyces cerevisiae*. Additional suitable yeast cells include, without limitation, *Kluyveromyces, Torulaspora, Schizosaccharomyces, Hansenula, Torulopsis, Candida,* and *Karwinskia*.

In some embodiments, the host cell is a fungal cell. Suitable fungal cells include, without limitation, *Aspergillus, Trichoderma,* and *Neurospora*. For example, the host cells may be *Aspergillus niger* cells.

In some embodiments, the yeast cell is a methylotrophic yeast cell. Methylotrophic yeast are those yeast genera capable of utilizing methanol as a carbon source for the production of the energy resources necessary to maintain cellular function and containing a gene for the expression of alcohol oxidase. Typical methylotrophic yeasts include members of the genera *Pichia, Hansenula, Torulopsis, Candida,* and *Karwinskia*. These yeast genera can use methanol as a sole carbon source. In some embodiments, the methylotrophic yeast cell is a *Pichia pastoris* yeast cell.

In some embodiments, the methods of recombinantly producing a polypeptide as described herein further involve culturing the transformed host cell under conditions effective to express the polypeptide having at least 90% sequence identity with the amino acid sequence, or fragment thereof, of SEQ ID NO:2, SEQ ID NO:4, SEQD ID NO:6, SEQ ID NO:8, SEQ ID NO:10, SEQ ID NO: 12, SEQ ID NO: 14, or SEQ ID NO: 16.

Also contemplated are polypeptides produced according to any one of the methods disclosed herein and compositions including such polypeptides. Accordingly, in some embodiments, the methods of producing a polypeptide as described herein further involve isolating the polypeptide produced according to the methods described herein.

In some embodiments, isolating the polypeptide produced according to the methods described herein involves selecting or screening for a transformed host cell comprising the heterologous nucleic acid molecule of the present disclosure. In some embodiments, the isolating step involves separating the polypeptides of the present disclosure from other polypeptides in, e.g., a cell culture, a cell lysate, or a cell extract.

In some embodiments, isolating involves purifying the polypeptides of the present disclosure. In some embodiments, purifying the polypeptides of the present disclosure involves the selective enrichment of the polypeptides of the present disclosure from cell culture. In some embodiments, purifying the polypeptides of the present disclosure is carried out by extraction (e.g., by repeated freezing and thawing, sonication, homogenization by high pressure, or permeabilization by organic solvents), precipitation and differential solubilization (e.g., by ammonium sulfate precipitation), ultracentrifugation (e.g., by sucrose gradient centrifugation), and chromatographic methods (e.g., by size exclusion chromatography, ion exchange chromatography, affinity chromatography, metal binding, immunoaffinity chromatography, or high performance liquid chromatography).

Methods of Degrading Keratin

As described herein supra, feather waste is generated at over 15 million metric tons every year. While a small portion of these feathers are incinerated, processed to make feather meal, or used for other niche purposes, the vast majority are treated as waste and discarded in landfills (Arunachalam, et al., "Enzymatic Reduction of Disulfide Bonds in Lysosomes: Characterization of a Gamma-interferon-inducible Lysosomal Thiol Reductase (GILT)," *PNAS* 97:745-750 (2000) and Baker, J E, "Isolation and Properties of Digestive Carboxypeptidases From Midguts of Larvae of the Black Carpet Beetle *Allagenus megatoma,*" *Insect. Biochem.* 11:583-591 (1981a), which are hereby incorporated by reference in their entirety). Feather waste comprises large amounts of keratin.

Keratin is an insoluble and protein-rich epidermal material found in, e.g., feather, wool, and hair. It is produced in substantial amounts as co-product from poultry processing plants and pig slaughterhouses. Keratin is packed by disulfide bonds and hydrogen bonds and is classified as α-keratin and β-keratin according to its secondary structure. α-keratin is primarily present in mammalian epidermal materials, such as hair, wool, and horn, while β-keratin is mainly found in birds and reptiles, e.g., in chicken feathers and reptile scales (see, e.g., Qiu et al., Microbial Enzymes Catalyzing Keratin Degradation: Classification, Structure, Function," *Biotechnol. Adv.* 44:107607 (2020), which is hereby incorporated by reference in its entirety).

A further aspect of the present disclosure relates to a method of degrading keratin. This method involves providing a keratin-degrading composition according to the present disclosure and contacting the keratin-degrading composition with a material comprising keratin under conditions effective to degrade the keratin.

As described herein, keratin is classified into alpha-keratin and beta-keratin based on its secondary protein structure. In alpha keratins, alpha-helical coils type I (acidic) and type II (basic/neutral) protein chains are coiled together to form elongated alpha-helix filaments that form fibrils by interchain bonding, while beta-keratin mainly comprises beta-sheets (see, e.g., Qiu et al., "Microbial Enzymes Catalyzing Keratin Degradation: Classification, Structure, Function," *Biotechnol. Adv.* 15(44): 107607 (2020), which is hereby incorporated by reference in its entirety).

The keratin described according to embodiments of the disclosure may be alpha keratin and/or beta keratin.

In some embodiments of the present disclosure, the keratin is alpha keratin. Alpha keratins may be found in the hair (including wool and pig hair), horns, nails, claws and hooves of mammals.

In some embodiments of the present disclosure, the keratin is beta keratin. As disclosed herein, beta keratins may be found in, e.g., feathers, beaks, and claws of birds and porcupines. Accordingly, the material comprising keratin may be feathers (e.g., poultry feathers such as chicken feathers). Beta keratins may also be found in nails and claws of reptiles and shells of Testudines.

In some embodiments of the present disclosure, the material comprising keratin comprises both alpha keratin and beta keratin. For example, chicken feathers contain ordered alpha-helix as well as beta-sheet structure, as well as some disordered structures. Chicken feathers comprise barbules, barbs, and rachis. As shown in FIG. 10, the barbs branch out from the central stiff rachis, and each barb is linked with adjacent barbs by barbules. The structural differences present in different parts of the feather may be related to the variety and structure of the proteins. On average, whole feathers contain 32.2% of alpha-helix, 53.6% of beta-sheets and random coils, and 14.2% of turns (Qiu et al., "Microbial Enzymes Catalyzing Keratin Degradation: Classification, Structure, Function," *Biotechnol. Adv.* 15(44): 107607 (2020), which is hereby incorporated by reference in its entirety). Thus, in some embodiments, the material comprising keratin of the present disclosure is feather waste (e.g., poultry feather waste, duck feather waste, turkey feather waste). The feather waste may be untreated feather waste.

The material comprising keratin of the present disclosure may include any substance which comprises keratin, e.g., skin, hair, wool, silk, nails, scales, fiber, leather, meat, and/or feathers. In some embodiments, the material comprising keratin comprises feathers (e.g., poultry feathers).

Suitable keratin-degrading compositions are described in more detail supra and may include, e.g., one or more polypeptides of the present disclosure (e.g., a polypeptide having at least 70%, at least 80%, or at least 90% sequence identity with the amino acid sequence, or fragment thereof, of SEQ ID NO:2, SEQ ID NO:4, SEQ ID NO:6, SEQ ID NO:8, SEQ ID NO:10, SEQ ID NO:12, SEQ ID NO: 14, or SEQ ID NO:16).

In some embodiments, the contacting step is carried out for about 10 minutes to about 96 hours; for about 20 minutes to about 96 hours; for about 30 minutes to about 96 hours; for about 40 minutes to about 96 hours; for about 50 minutes to about 96 hours; for about 60 minutes to about 96 hours; for about 1 hour to about 96 hours; for about 2 hours to about 96 hours; for about 3 hours to about 96 hours; for about 4 hours to about 96 hours; for about 5 hours to about 96 hours; for about 6 hours to about 96 hours; for about 7 hours to about 96 hours; for about 8 hours to about 96 hours; for about 9 hours to about 96 hours; for about 10 hours to about 96 hours; for about 11 hours to about 96 hours; for about 12 hours to about 96 hours; for about 13 hours to about 96 hours; for about 14 hours to about 96 hours; for about 15 hours to about 96 hours; for about 16 hours to about 96 hours; for about 17 hours to about 96 hours; for about 18 hours to about 96 hours; for about 19 hours to about 96 hours; for about 20 hours to about 96 hours; for about 21 hours to about 96 hours; for about 22 hours to about 96 hours; for about 23 hours to about 96 hours; for about 24 hours to about 96 hours; for about 36 hours to about 96 hours; for about 48 hours to about 96 hours; for about 60 hours to about 96 hours; or any amount of time there between.

In some embodiments, the contacting step is carried out for at least 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, 49 hours, 50 hours, 51 hours, 52 hours, 53 hours, 54 hours, 55 hours, 56 hours, 57 hours, 58 hours, 59 hours, 60 hours, or more.

In some embodiments, the contacting step is carried out at a pH range of pH 2.5 to pH 8.5. For example, the contacting step may be carried out at a pH of about 6.0, about 6.5, about 7.0, about 7.5, or about 8.0.

It is routine work for the skilled person to determine the degree of degradation. For example, the degree of degradation may be determined by weight loss of the material comprising keratin by using the following formula:

$$\text{weight loss (\%)} = \frac{\text{initial weight of material} - \text{final weight of material}}{\text{initial weight of material}} \times 100$$

In some embodiments, the contacting step is carried out until at least 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 100 wt % of the material comprising keratin is degraded.

In some embodiments, at least 5 g, 10 g, 20 g, 30 g, 40 g, 50 g, 60 g, 70 g, 80 g, 90 g, or 100 g of the material comprising keratin is provided. 100 g, 200 g, 300 g, 400 g, 500 g, 600 g, 700 g, 800 g, 900 g, or 1000 g of the material comprising keratin is provided. In some embodiments, at least 1 kg, 5 kg, 10 kg, 20 kg, 30 kg, 40 kg, 50 kg, 60 kg, 70 kg, 80 kg, 90 kg, or 100 kg of the material comprising keratin is provided.

In some embodiments, the method of degrading keratin of the present disclosure further involves mechanically processing the material comprising keratin. Mechanically processing the material comprising keratin may involve milling, grinding, shredding, cutting, dicing, emulsifying, homogenizing, high pressure homogenizing, and combinations thereof. In some embodiments, mechanically processing the material comprising keratin reduces the size of the material comprising keratin by at least about 10%, 20%, 30%, 40%, 50%, 60%, 70%, 80%, 90%, or more.

Mechanically processing the material comprising keratin may be carried out prior to the contacting step, during the contacting step, or after the contacting step.

In some embodiments, the method of degrading keratin of the present disclosure further involves sterilizing the material comprising keratin prior to the contacting step. For example, the keratin material may be steam sterilized prior to the contacting step. Suitably, the steam sterilization comprises a step of contacting the material comprising keratin to steam for a time and at a temperature sufficient to facilitate the subsequent enzymatic degradation thereof, even if this steam treatment step does not accomplish a complete sterilization of the material comprising keratin. Suitably, the steam sterilization may comprise contacting the material comprising keratin to steam under pressure, in an enclosed chamber, at 80° C. to 125° C. for at least 1 minute, 2 minutes, 3 minutes, 4 minutes, at least 5 minutes, at least 10 minutes, at least 15 minutes, or at least 20 minutes. Suitably, the steam sterilization may comprise contacting the material comprising keratin to steam under pressure, in an enclosed chamber, at 120° C. to 125° C. for at least 1 minutes, 2 minutes, 3 minutes, 4 minutes, at least 5 minutes, at least 10 minutes, at least 15 minutes, or at least 20 minutes. Suitably, the time and temperature of steam treatment may be less than those employed in commercial steam hydrolysis processes, which employ treatment times of 35 minutes or more at steam pressures of about 35 p.s.i. or more.

Also contemplated are methods of preparing feather meal. This method involves providing a composition comprising feathers (e.g., poultry feathers), degrading the composition comprising feathers according to any of the methods disclosed herein to produce a degraded feather composition, and drying the isolated feather composition, thereby producing a feather meal.

EXAMPLES

The examples below are intended to exemplify the practice of embodiments of the disclosure but are by no means intended to limit the scope thereof.

Materials and Methods for Examples 1-6

Insect Cultures

The BCB colony was gifted from SC Johnson's Institute of Insect Science for Family Health, Racine WA. Cultures were maintained according to the directions of the provider. Lighting was kept to a minimum throughout the duration of the experiment to encourage feeding activity.

Sample Preparation

Larvae were randomly selected in groups of four and placed into 5 cm×3 cm cylindrical polystyrene containers with no food source. Specimens were allowed to acclimate to the new environment for 24 hours in total darkness before proceeding. This time also served as a brief starvation period to clear the gut of any food particles. After the 24-hour acclimation, a food source was added to the containers, either a small segment of washed, poultry feather for the experimental group (segment weights ranging from 0.3-0.5 g), or 2-3 nuggets of puppy chow (Nestlé Purina PetCare Company, St. Louis, MO), for the control-fed group. The insects were monitored daily for feeding activity and those that were seen actively feeding on substrate for several hours were chosen for processing.

cDNA Library Construction

Total RNA was extracted from homogenized whole larval bodies. RNA purity was analyzed and only samples exhibiting a 260/280 ratio of above 1.7 and a 260/230 of above 1.2 were considered for further processing. RQN (RNA integrity number) scores of the RNA samples were determined at the Cornell Genomics facility, Ithaca NY. Samples scoring a 7.5 or above were used for cDNA library construction. The resulting 10 samples each contained approximately 2 µg total RNA from four specimens from the respective treatment. Each 2 µg RNA library was used to construct a cDNA library for a total of 10 cDNA libraries, six representing the feather-fed group and four representing the control-fed group. First strand cDNA synthesis was constructed using the High Capacity First Strand cDNA Synthesis Kit from Applied Biosystems (Cat: 4368814, Foster City CA), according to the manufacturer's instruction. Oligo-dT was used as a primer to capture mRNA from total RNA input. Second strand synthesis was performed using the Second Strand Buffer system from Invitrogen, Waltham MA (Cat: 10812014), and RNase H as a priming reagent. Libraries were blunted with T4 polymerase and submitted to Cornell Biotechnology Core Facility, Ithaca NY, for sequencing.

Next Generation Sequencing cDNA libraries were prepared for sequencing by the Cornell University Genomics Core Facility, Ithaca NY, using the Illumina NexTera Flex Library Prep kit according to the manufacturer's instructions. Next generation sequencing was performed on the Illumina MiSeq Next Generation Sequencer, with 2×250 base pair paired-end reads.

Transcriptome Construction and Quality Assessment

Initial raw read quality was assessed using FastQCv0.11.5 (Andrew 2015) and read adapters were trimmed off using Trimmomatic v.36 (Bolger et al. 2014). The transcriptome was assembled de novo using Trinity v2.4.0 in strand specific mode. The Trinity (Haas et al. 2013) toolkit program TrinityStats was used to compute contig Nx statistics. Transcriptome completeness was assessed using BUSCO v3 (Rong et al. 2017) using the Insecta odb9 reference dataset. Sequences were deposited under NCBI BioProject TSA, accession number PRJNA633669.

Identifying Potential Contaminating Genes

Reads from each sample were blasted against the NCBI BLAST (Altschul et al., "Basic Local Alignment Search Tool," *J. Mol. Biol.* 215:403-410 (1990) and Johnson et al., "NCBI BLAST: A Better Web Interface," *Nucleic Acids Res.* 36:5-9 (2008), which are hereby incorporated by reference in their entirety) database using the program FastQ (Wingett and Andrews 2018) using an e-value cutoff of E<1e-20). Non-insect species and genus returned included *Polynucleobacter necessaries, Ralstonia solanacearum, Echerichia coli*, and *Wolbachia*. Respective genomes for each potential contaminant were acquired from NCBI and consolidated into a database (*Wolbachia*: NC_010981.1 NC_021084, *P. necessaries*: NC_010531.1, *R. solanacearum*:

NC_003295.1, *E. coli*: NC_000913.3). BLASTn (Johnson et al., "NCBI BLAST: A Better Web Interface," *Nucleic Acids Res.* 36:5-9 (2008), which is hereby incorporated by reference in its entirety) was used to screen this database with the transcriptome as a query to identify all transcripts that returned a significant hit (e-value 1×10^-6) to the contaminating genomic database. Returned hits were flagged for future analysis and annotated using BLAST, but were excluded from the remainder of this study.

Blast2Go Annotation

Longest transcripts per gene were extracted via Trinity (Haas et al., "De Novo Transcript Sequence Reconstruction From RNA-seq Using the Trinity Platform for Reference Generation and Analysis," *Nat. Protoc.* 8:1494-1512 (2013), which is hereby incorporated by reference in its entirety) and transcripts were converted to protein sequences using TransDecoder (Tang et al., "Identification of Protein Coding Regions in RNA Transcripts," *Nucleic Acids Res.* 43:78-78 (2015), which is hereby incorporated by reference in its entirety) and then run through NCBI BlastP (Johnson et al., "NCBI BLAST: A Better Web Interface," *Nucleic Acids Res.* 36:5-9 (2008), which is hereby incorporated by reference in its entirety). The resulting .xml file was loaded onto Blast2Go v2.0 (OmicsBox V1.2.4)(Gotz et al 2008) for further annotation and analysis.

Peptidase Library

The completed transcriptome was compared against the MEROPS database (https://www.ebi.ac.uk/merops/) (Rawlings et al 2018) using HMMER (Eddy 2011; Finn et al. 2011) (v3.1b2) with default parameters and a similarity cutoff of 1. All transcriptome ID's with matches to entries in the database were extracted and their relative alignments generated. Because each sequence often generated two or more alignments with peptide sequences, only the top MEROPS hit for each Trinity ID were considered. To further narrow down this list, all duplicate genes and isoforms were removed so that each Trinity Gene ID was associated with one peptidase hit. These resulting 4019 sequences were annotated using the MEROPS database (Rawlings et al 2018) to generate respective peptidase clans and families, and also the Interpro (https://www.ebi.ac.uk/interpro/) and Uniprot (https://www.uniprot.org/) websites for descriptions and additional information.

Peptidase Comparisons to Other Insect Genomes

Five insect genomes of species similar in taxonomy to the BCB were accessed through InsectBase (Yin et al., "InsectBase: A Resource for Insect Genomes and Transcriptomes," *Nucleic Acids Res.* 44:801-807 (2016), which is hereby incorporated by reference in its entirety). Genomes were used in lieu of whole-body transcriptomes due to lack of availability of transcriptomic data on these species. Species included the Mountain pine beetle (*Dendroctonus ponderosae*), the Red Flour beetle (*Tribolium castaneum*), the Taurus scarab (*Onthophagus taurus*), the Colorado potato beetle (*Leptinotarsa decimlineata*), and the Asian long-horned beetle (*Anoplophora glabripennis*), all of which were chosen for their classification in the order Coleoptera. These genomes were compared to the MEROPS database as described previously and the resulting list of peptidases annotated as above using the same databases.

Sequence Homology Screening

Transcripts were grouped by similarity into gene clusters using the package CD-hit (Limin et al., "CD-HIT: Accelerated for Clustering the Next-Generation Sequencing Data," *Bioninformatics* 28(23):3150-3152 (2012), which is hereby incorporated by reference in its entirety). Longest isoforms per gene were extracted using the appropriate Trinity script and these sequences were collectively used as a database for screening. Since all keratinases are grouped under the superfamily of S8 peptidases (Barrett and Rawlings, "Families and Clans of Serine Peptidases," *Arch. Biochem. Biophys.* 318:247-250 (1995) and Hedstrom, L, "Serine Protease Mechanism and Specificity," *Chem. Rev.* 102:4501-4524 (2002), which are hereby incorporated by reference in their entirety), the queries used were either previously identified keratinases with available protein sequences, or a group model representing all S8 peptidases to identify all S8 peptidases in the transcriptome.

Keratinases included those from *Fervidobacterium pennivorans* (UniProt: Q93LQ6) (Kluskens et al., "Molecular Characterization of Fervidolysin, a Subtilisin-like Serine Protease From the Thermophilic Bacterium *Fervidobacterium pennivorans*," *Extremophiles* 6:185-194 (2002), which is hereby incorporated by reference in its entirety), *Bacillus licheniformis* (UniProt: Q53521) (Manczinger et al., "Isolation and Characterization of a New Keratinolytic *Bacillus licheniformis* Strain," *World J. Microb. Biot.* 19:35-39 (2003), which is hereby incorporated by reference in its entirety), *Parengyodontium album* (UniProt: P06873) (Ren et al., "Improving the Catalytic Performance of Proteinase K From *Parengyodontium album* for Use in Feather Degradation," *Int. J. Biol. Macromol.* 154: 1586-1595 (2020), which is hereby incorporated by reference in its entirety), *Streptomyces fradiae* var. K11 (Uniprot: Q5K2P7) (Li et al., "Functional Expression of the Keratinolytic Serine Protease Gene sfp2 From *Streptomyces fradiae* var. k11 in *Pichia pastoris*," *Protein Exp. Purif.* 54:79-86 (2007), which is hereby incorporated by reference in its entirety), *Brevibacilllus* sp. KN50 (UniProt: A0A1VIFQJ4), *Bacillus subtilis* (UniProt: A0A1L4AJA4) (Mazotto et al., "Biodegradation of Feather Waste by Extracellular Keratinases and Gelatinases From *Bacillus* spp," *World J. Microb. Biot.* 27:1355-1365 (2011), which is hereby incorporated by reference in its entirety), *Bacillus pumilus* (UniProt: A0A1BIGE37) (Kumar et al., "Characterization of an Alkaline Active-thiol Forming Extracellular Serine Keratinase by the Newly Isolated *Bacillus pumilus*," *J. Appl. Microbiol.* 104:411-419 (2008), which is hereby incorporated by reference in its entirety), and *Aspergillus niger* (UniProt: A0A0F6PMU4) (Chen et al., "Prokaryotic Expression and Characterization of a Keratinolytic Protease From *Aspergillus niger*," *Biologia* 70:157-164 (2015), which is hereby incorporated by reference in its entirety). The S8 peptidase model was obtained through Pfam 32.0 (Pfam: PF00082). Screening was performed using HMMER (Eddy, SR, "Accelerated Profile HMM Searches," *PLOS Comput. Biol.* 7:1002195 (2011) and Finn et al., "HMMER Web Server: Interactive Sequence Similarity Searching," *Nucleic Acids Res.* 39:29-37 (2011), which are hereby incorporated by reference in their entirety) (v3.1b2) with the same parameters mentioned above.

Differential Expression

Figure 5:
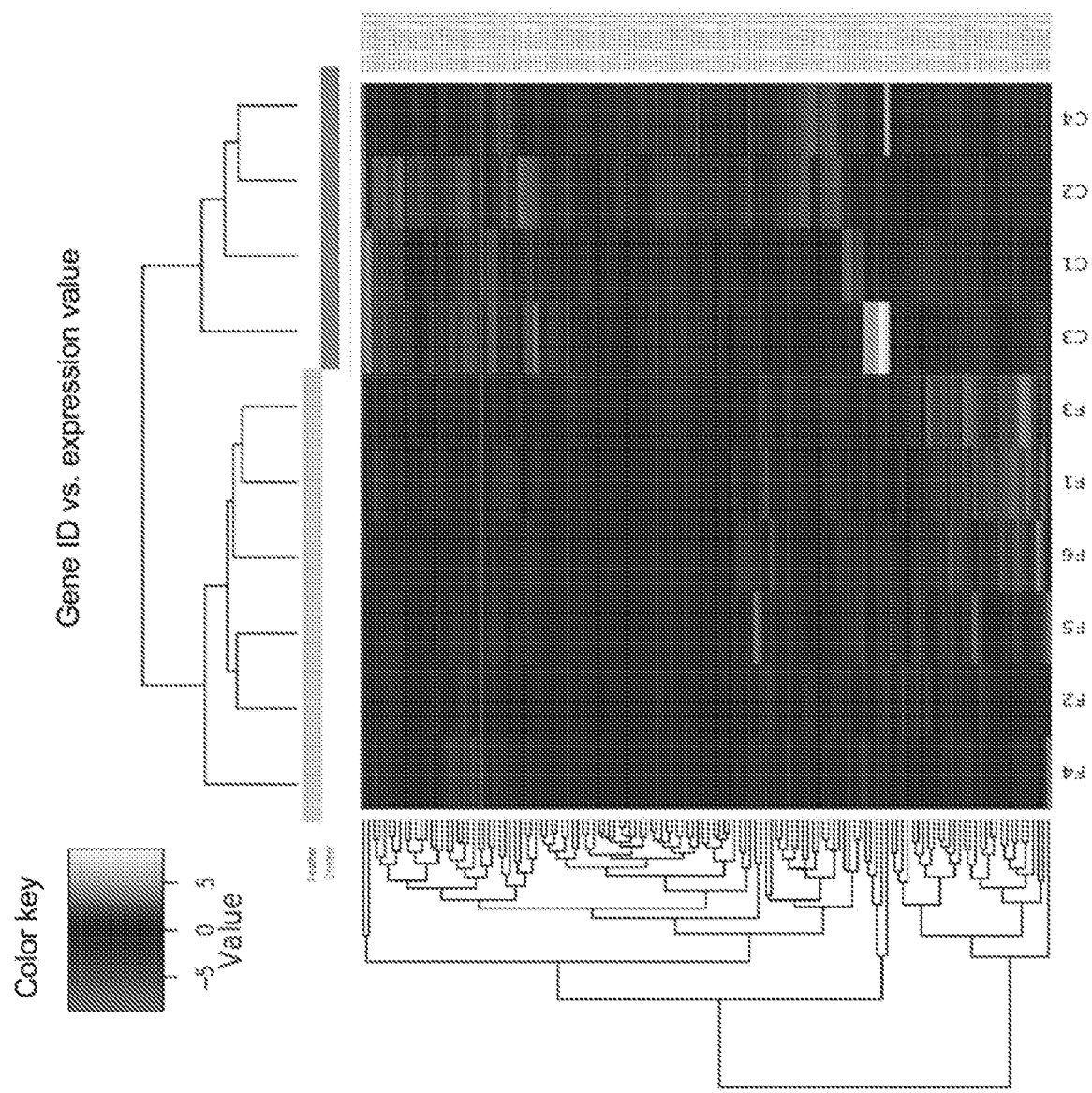
FIG. 5 is a heat plot of differentially expressed genes in control-fed vs. feather-fed groups of the BCB transcriptome. Differential expression was generated using a false discovery rate (FDR) cutoff of p=0.001 and a log 2 fold change of C≥2. Color key; gene ID vs expression value for samples C1-C4, F1-F6.

Transcriptome index and alignment was performed using Bowtie v2.0 (Langmead et al., "Ultrafast and Memory-efficient Alignment of Short DNA Sequences to the Human Genome," *Genome Biol.* 10:1-10 (2009), which is hereby incorporated by reference in its entirety) and read counts for each gene and isoform quantified by RSEM (Li and Dewey, "CN RSEM: Accurate Transcript Quantification From RNA-seq Data With or Without a Reference Genome," *BMC Biomformaties* 12: 1-16 (2011), which is hereby incorporated by reference in its entirety). Gene counts for each sample were combined into a matrix and differentially expressed genes between the feather fed group and the control group were identified using the Bioconductor edgeR package (Robinson et al., "edgeR: a Bioconductor Package for Differential Expression Analysis of Digital Gene Expression Data," *BIONFP* 26:139-140 (2010), which is hereby incorporated by reference in its entirety). This data was normalized using the trimmed mean of M-values (TMM) normalization method. Clustering of differentially expressed genes and statistics was performed using Trinity (Haas et al., "De Novo Transcript Sequence Reconstruction From RNA-seq Using the Trinity Platform for Reference Generation and Analysis," *Nat. Protoc.* 8:1494-1512 (2013), which is hereby incorporated by reference in its entirety). Two sets of filtering parameters were used to identify differentially expressed genes; the more stringent filtering using a false discovery rate (FDR) cutoff of $p=0.001$ and a log 2 fold change of $C \geq 2$ as well as $p=0.05$ and $C \geq 1$, respectively (FIG. 5). The list of differentially expressed genes was then compared with the peptidase library generated previously.

Annotation of All Gene Candidates

To further filter the list of candidates from both differential expression and homology screening, only unique (non-duplicated) sequences with a complete open reading frame (ORF) were considered. Remaining sequences were then run through the NCBI conserved domain database using an e-value of 0.01 (Marchler-Bauer et al., "CDD/SPARCLE: Functional Classification of Proteins via Subfamily Domain Architectures," *Nucleic Acids Res.* 45:200-203 (2017), which is hereby incorporated by reference in its entirety, and NCBI BLASTx (Johnson et al., "NCBI BLAST: A Better Web Interface," *Nucleic Acids Res.* 36:5-9 (2008), which is hereby incorporated by reference in its entirety) to predict function. Sequences were then analyzed for secretion tags, secretion location, and transmembrane domains using the programs SignalP 4.0 (Petersen et al., "SignalP 4.0: Discriminating Signal Peptides from Transmembrane Regions," *Nat. Methods* 8:785-786 (2011), which is hereby incorporated by reference in its entirety), TargetP 2.0 (Armenteros et al., "Detecting Sequence Signals in Targeting Peptides Using Deep Learning," *Life Sci. Alliance* 2:5 (2019), which is hereby incorporated by reference in its entirety), and Phobius (Käll et al., "Advantages of Combined Transmembrane Topology and Signal Peptide Prediction—the Phobius Web Server," *Nucleic Acids Res.* 35:429-432 (2007), which is hereby incorporated by reference in its entirety).

Example 1—Transcriptome Stats and Assembly Quality

The transcriptome assembly contained 193,103 genes with 401,337 transcripts. Median and average contig length based on all transcripts was 546 and 1,126.11, respectively, with 451,950,598 total assembled bases. BUSCO (Simão et al., "BUSCO): Assessing Genome Assembly and Annotation Completeness with Single-copy Orthologs," *BIONFP* 31:3210-3212 (2015), which is hereby incorporated by reference in its entirety) scoring on the complete transcriptome revealed 97% completeness (78.0% duplicated, 18.3% singles), with 1.8% fragmented and 1.2% missing sequences. Re-running the program on the longest isoforms per gene received a score of 93.7% (68.2% singles, 25.5% doubles), with 2.7% fragmented and 3.6% missing sequences.

Example 2—Blast2Go Annotation

The transcriptome assembly allowed 68,345 protein sequences to be annotated using Blast2Go (Götz et al., "High-throughput Functional Annotation and Data Mining with the Blast2GO Suite," *Nucleic Acids Res.* 36:3420-3435 (2008), which is hereby incorporated by reference in its entirety). However, 24,329 of those sequences did not result in any BLAST hits and were therefore not annotated with this interface. Of the annotated sequences, 17,875 were classified as enzymes (2,603 EC:1, 6,331 EC:2, 6,317 EC:3, 738 EC:4, 551 EC:5, 784 EC:6, 436 EC:7) (FIG. 1).

Example 3—Peptidase Library

A total of 3577 gene sequences had significant hits to proteases listed in the MEROPS database. These were mainly distributed among metallo, serine, and cysteine proteases types (Table 1, FIG. 2). The clans that represented the greatest number of sequences included the SC (serine carboxypeptidase D), PA (chymotrypsin A—cattle-type), MA (thermolysin), and CA (papain) groups. Glutamic and asparagine proteases were the least prevalent with only 5 and 12 sequences returned. Zero hits were returned for threonine proteases. An additional 441 sequences were homologous to peptidase inhibitors (identified as those starting with I or J) (Table 2). Of the 3577 peptidase sequences, 559 contained a signal peptide. Overall the largest number of signal peptides were present in the clans that also corresponded to the largest presence in the transcriptome, namely PA (133 sequences), MA (77 sequences), SC (68 sequences), and CA (63 sequences) clans (Table 1). Peptidases with signal peptides represented 23.6%, 15.5%, 16.7%, and 12.6% of these clans, respectively. Clans (excluding those with <10 total sequence hits) with the largest proportional number of signal peptides included SR (lactoferrin; 5 of 12), MC (carboxypeptidase A1; 18 of 52), MH (aminopeptidase Ap1; 19 of 62), and SB (subtilisin; 35 of 168).

TABLE 1

Distribution of Protease Clans by Proportion in the BCB Transcriptome*

| Clan | Number of Hits | Percentage of Hits |
|---|---|---|
| Chymotrypsin A (PA) | 563 | 14.0 |
| Thermolysin (MA) | 508 | 12.6 |
| Papain (CA) | 499 | 12.4 |
| Serine carboxypeptidase D (SC) | 408 | 10.2 |
| Pepsin A (AA) | 223 | 5.5 |
| Subtilisin (SB) | 203 | 5.1 |
| Alpha-1 peptidase inhibitor (ID) | 151 | 3.8 |
| Archean proteasome (PB) | 114 | 2.8 |
| Other | 1350 | 33.6 |
| Total | 4019 | |

*Clans with the largest representation included PA (chymotrypsin A proteases), MA (thermolysin proteases), CA (papain proteases), and SC (serine carboxypeptidase D proteases) clans.

TABLE 2

Distribution of Peptidase Inhibitor Clans by Proportion in the BCB Transcriptome*

| Clan | Number of Hits | Percentage of Hits |
| --- | --- | --- |
| Alpha 1 (ID) | 151 | 25.5 |
| Ovomucoid (IA) | 45 | 7.6 |
| Ovocystatin (IH) | 39 | 6.6 |
| Aprotinin (IB) | 21 | 3.5 |
| Survivin (IV) | 19 | 3.2 |
| Soybean Kunitz trypsin (IC) | 18 | 3.0 |
| Alpha-2 macroglobulin (IL) | 17 | 2.9 |
| Pro-eosinophil major basic protein (JB) | 13 | 2.2 |
| Hirudin (IM) | 11 | 1.9 |
| Other | 258 | 43.6 |
| Total | 592 | |

*The largest inhibitor groups included the ID (Alpha-1 inhibitors), IA (ovomucoid inhibitors) and IH (ovocystatin inhibitors).

Example 4—Comparison to Other Insect Genomes

The transcriptome peptidase library exhibited similarities to those of other insect genomes in terms of proportions of protease types (FIG. 2). Aspartic proteases constituted the smallest proportion of sequences in every species, and the remainder were distributed fairly evenly amongst cysteine, metallo, mixed, and serine peptidases. Breaking these peptidase types down by class, the transcriptome exhibits the most similarities to Dendroctonus ponderosae in that the highest number of proteases were in the PA (chymotrypsin A—cattle-type), MA (thermolysin), CA (papain), and SC (serine carboxypeptidase D) clans, respectively. Differentiating the transcriptome from other insect species was the small portion of "unknown peptidases", as well as two groups not seen in any other insect species (glutamic, asparagine).

Example 5—Differential Expression and Overlap with the Peptidase Library

Figure 3A:
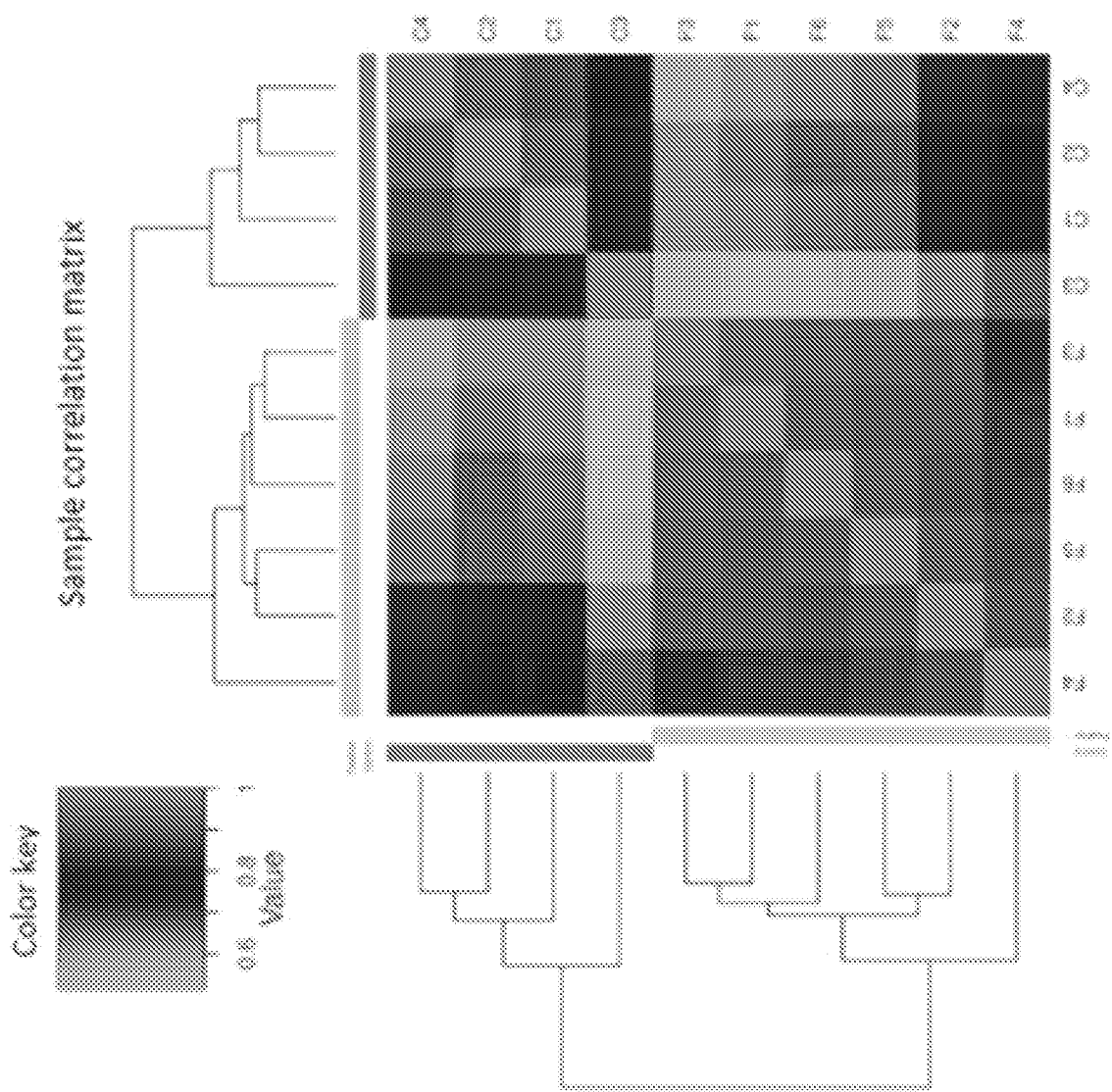
FIG. 3A and FIG. 3B are differential expression graphs of the BCB transcriptome. Differential expression generated Volcano plots depicting differentially expressed transcripts generated using Trinity is shown in FIG. 3A and clustering abundance of transcripts across all 10 cDNA samples is shown in FIG. 3B.
Figure 3B:
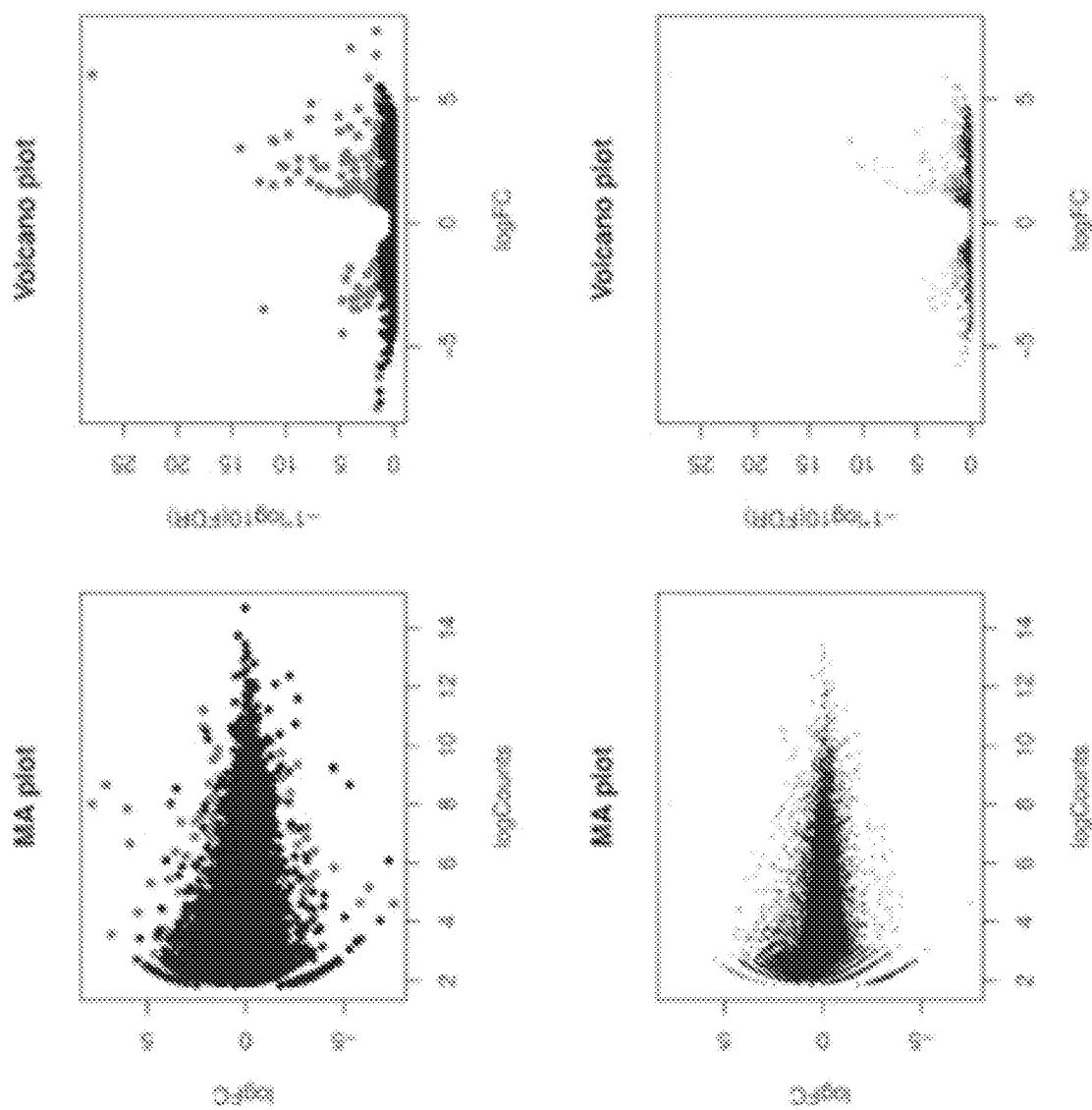

Differential expression with default filtering parameters (FDR cutoff of 0.05 and log FC cutoff of 1) returned 31 upregulated genes in the feather-fed group and 101 upregulated genes in the chow-fed group (FIG. 3). More stringent filtering (FDR cutoff of 0.001 and a log FC cutoff of 2) returned only the top nine upregulated genes in the feather group and 32 in the chow-fed group. In comparing the list of differentially expressed genes to the list of transcriptomic peptidases, 21 of the 101 upregulated genes in the control-fed group were identified as peptidases. Of these 21 peptidases, nearly half were serine, and the remaining were largely either cysteine or metalloproteases.

Figure 4A:
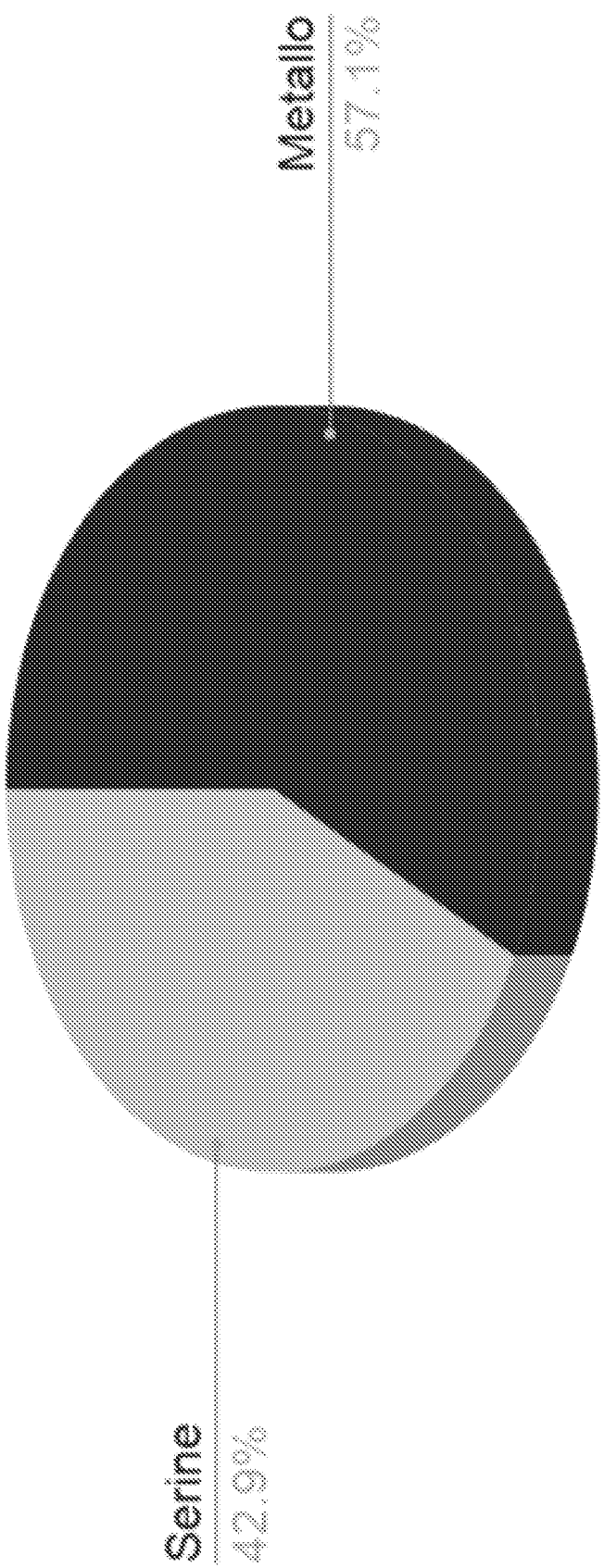
FIG. 4A and FIG. 4B are pie charts showing upregulated gene distribution in BCB transcriptome. Distribution of upregulated genes by peptidase type is shown in both feather-fed (FIG. 4A) and control-fed groups (FIG. 4B).
Figure 4B:
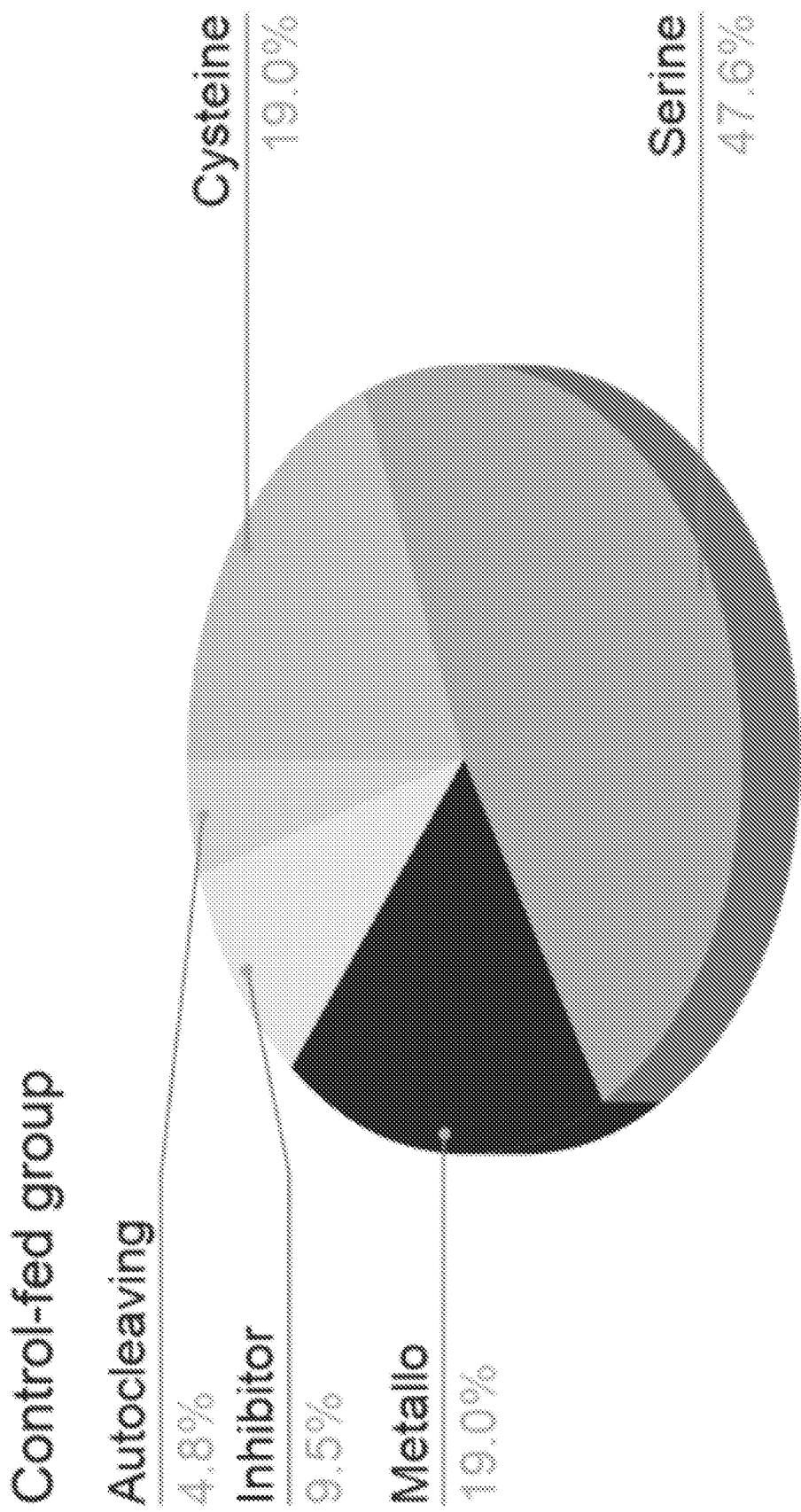

Annotation of the longest enzymes resulted in a handful of proteases pertaining to metabolism or digestion, including a trypsin, sedolisin, carboxylesterase, carboxypeptidase, and two lipases. Of the 31 upregulated genes in the feather fed group, 14 were identified as peptidases. All of these 14 were classified as either serine or metalloproteases, with the distribution fairly split between these two groups (43% and 57%, respectively), more specifically the chymotrypsin and metallocarboxypeptidase groups (PA and MC, respectively) (FIG. 4). Annotation of the upregulated genes revealed a significant number of proteolytic enzymes pertaining to digestion, including three trypsin-like serine proteases, four M14 metallocarboxypeptidases, an endoplasmic reticulum aminopeptidase 1-like, a zinc-dependent dipeptidase, and an MI peptidase. Based on homology, the trypsins, metalloproteases, and aminopeptidase are likely to play a role in digestion which makes them ideal candidate genes to explore for keratinolytic properties, though only those gene candidates with the longest and complete ORF will be considered for future expression studies. Proportionally, the feather-fed group contained a much greater proportion of upregulated proteolytic enzymes that are likely to play a role in digestion than the control-fed group. While not included in the peptidase library, an additional notable upregulated gene in the feather-fed group included a lysosomal thiol reductase (GILT-like enzyme), which is an enzyme mainly used in the reduction of disulfide bonds.

Example 6—S8 Peptidase Enzymes in BCB Transcriptome

Screening using both the S8 peptidase model and existing keratinolytic enzymes returned 85 sequences with significant overlap with the different keratinases, with all but three of these sequence returns overlapping with at least one keratinase. These three sequences were considered unique to the S8 peptidase group. Five sequence hits (two from P. album, two from S. fradice, and one from B. pumilis) were completely unique, not being found in any other keratinase group or in the S8 peptidase group. An additional three sequences were found redundantly in the P. album group, the B. licheniformis group, the S. fradiae group, the B. pumilis group, and the A. niger keratinase group, but were not found in the S8 peptidase group. Only one sequence returned in the S8 group matched with all eight of the keratinases. No sequences returned via homology screening overlapped with those returned from differential expression. After eliminating sequences that were redundantly found in other hits, lacked a complete ORF, or without BLAST or NCBI hit results, this combined list of 93 hits from all keratinases and S8 peptidases was reduced to 21 sequences (Table 3).

TABLE 3

Candidate Genes in the BCB Transcriptome Identified Through Homology Based Screening.*

| Sequence ID | Overlaps | Length (bp) | Signal Peptide | Description |
| --- | --- | --- | --- | --- |
| TRINITY_DN37801_c0_g2_i1\|m.12472 | 8 | 867 | No | AprE-like serine protease |
| TRINITY_DN42649_c0_g1_i12\|m.48656 | 7 | 3420 | No | S8 peptidase with TPII region |
| TRINITY_DN43062_c0_g1_i12\|m.53596 | 7 | 1161 | Yes | AprE-like serine protease |
| TRINITY_DN43062_c0_g1_i16\|m.53597 | 7 | 3144 | Yes | S8 peptidase SKI-like |
| TRINITY_DN45840_c1_g1_i7\|m.84313 | 7 | 3400 | Yes | S8 peptidase with furin-like repeats and propeptide |

TABLE 3-continued

Candidate Genes in the BCB Transcriptome Identified Through Homology Based Screening.*

| Sequence ID | Overlaps | Length (bp) | Signal Peptide | Description |
|---|---|---|---|---|
| TRINITY_DN45933_c0_g1_i4\|m.85625 | 7 | 1887 | Yes | S8 peptidase with furin-like repeats and propeptide |
| TRINITY_DN45933_c0_g1_i9\|m.85631 | 7 | 1302 | No | S8 peptidase with furin-like repeats |
| TRINITY_DN47985_c2_g1_i1\|m.109906 | 7 | 897 | No | S8 peptidase SKI-like |
| TRINITY_DN47985_c2_g1_i4\|m.109909 | 7 | 2310 | No | S8 peptidase SKI-like |
| TRINITY_DN47985_c2_g1_i5\|m.109912 | 7 | 1431 | No | S8 peptidase SKI-like |
| TRINITY_DN118094_c0_g1_i1\|m.11688 | 6 | 273 | No | AprE-like serine protease |
| TRINITY_DN41478_c1_g4_i4\|m.37927 | 6 | 1158 | No | AprE-like serine protease |
| TRINITY_DN45081_c1_g1_i30\|m.75635 | 6 | 940 | Yes | S8 peptidase with furin-like repeats |
| TRINITY_DN45933_c0_g1_i14\|m.85635 | 6 | 591 | No | AprE-like serine protease with propeptide |
| TRINITY_DN20432_c0_g1_i1\|m.3589 | 5 | 855 | No | AprE-like serine protease |
| TRINITY_DN37169_c0_g1_i3\|m.10905 | 5 | 1803 | Yes | AprE-like serine protease |
| TRINITY_DN42034_c0_g1_i14\|m.43559 | 5 | 3687 | Yes | S8 peptidase with furin-like repeats and propeptide |
| TRINITY_DN42034_c0_g1_i9\|m.43557 | 5 | 1143 | Yes | S8 peptidase with furin-like repeats |
| TRINITY_DN46375_c1_g4_i1\|m.90775 | 5 | 1143 | Yes | S8 peptidase with furin-like repeats |
| TRINITY_DN36147_c0_g1_i1\|m.9537 | 4 | 768 | No | AprE-like serine protease with propeptide |
| TRINITY_DN41478_c1_g4_i5\|m.37933 | 4 | 1698 | No | AprE-like serine protease |

*Complete list of sequence candidates from homology-based screening. Sequence ID and length were generated in Trinity and the number of keratinase overlaps were calculated from homology screening. Presence of a signal peptide was determined through collective results from SignalP, TargetP, and Phobius. Conserved domain descriptions were determined using the CDD v3.18 database (Marchler-Bauer et al., "CDD/SPARCLE: Functional Classification of Proteins via Subfamily Domain Architectures," Nucleic Acids Res. 45: 200-203 (2017), which is hereby incorporated by reference in its entirety) with a cutoff value of .01.

Discussion of Examples 1-6

Prior to this study, there has been no genomic or sequence-based data available on the BCB. This information is necessary to further investigate and characterize the digestive enzymes responsible for this organism's unique ability to break down keratin. This study documents a de novo transcriptome assembly on two populations of BCB analyzed with two complementary screening methods to identify keratinolytic enzyme candidates in this species. The complete profile of proteolytic enzymes was also explored and compared to other insect genomes.

Proteolytic Enzymes in the BCB

The large number and diversity of peptidases seen in the transcriptome could be due to the highly variable diet of the BCB, which would require a larger and more robust selection of digestive enzymes to be present to process a myriad of food sources. Furthermore, the highly capable digestive tract of the BCB may also explain the high percentage of unassigned enzymes, some of which may be keratinolytic in nature or unlike any previously identified proteases. However, it is also possible that the limitations of both transcriptomic construction and homology screening influenced these factors. Further study is required to more carefully dissect all unknown peptidase sequences and classify them accordingly in order to better characterize the true distribution of proteolytic enzymes in this species. Additionally, it would be beneficial to explore the potential influence of microbial species that may be aiding in proteolysis and digestion in the BCB. It is thought that the BCB and other insect species, such as the clothes moth, that are able to consume keratin rely on the aid of gut endosymbionts in the digestion of keratin-rich materials (Baker, J E, "Isolation and Properties of Digestive Carboxypeptidases From Midguts of Larvae of the Black Carpet Beetle Attagenus megatoma," Insect. Biochem. 11:583-591 (1981a), which is hereby incorporated by reference in its entirety). Though all reads showing homology to potential contaminating bacterial or other microbial strains were removed during construction of the transcriptome, these would be a possible source of proteolytic enzymes to be explored in the future.

Comparison to Other Insect Genomes

Ecologically the BCB is similar to all five of the insect species mentioned in this study for varying reasons. Like the BCB, the red flour beetle (Tang et al., "Identification of Protein Coding Regions in RNA Transcripts," Nucleic Acids Res. 43:78-78 (2015), which is hereby incorporated by reference in its entirety), Colorado potato beetle (Hare, JD, "Ecology and Management of the Colorado Potato Beetle," Annu. Rev. Entomol. 35:81-100 (1990), which is hereby incorporated by reference in its entirety), Asian long-horned beetle (Hu et al., "Ecology and Management of Exotic and Endemic Asian Longhorned Beetle Anoplophora glabripennis," Agric. For. Entom. 11:359-375 (2009), which is hereby incorporated by reference in its entirety), and mountain pine beetle (Keeling et al., "Draft Genome of the Mountain Pine Beetle, Dendroctonus ponderosae Hopkins, A Major Forest Pest," Genome Biology 14:R27 (2013), which is hereby incorporated by reference in its entirety) are all pest species that prey on and infest certain niche food sources, and can cause significant damage to ecosystems if not managed properly. Therefore, looking at the proteolytic enzymes and their inhibitors in these species is a useful tool in designing biopesticides and chemicals that may aid in mitigating their destructive cthology. This tactic has already been utilized in creating a pesticide specific to the Colorado potato beetle (Šmid Et Al., "Clitocypin, A Fungal Cysteine Protease Inhibitor, Exerts Its Insecticidal effect on Colorado Potato Beetle Larvae by Inhibiting Their Digestive Cysteine Proteases," *Pestic. Biochem. Phys.* 122:59-66 (2015), which is hereby incorporated by reference in its entirety), and could similarly be applied to the BCB.

The taurus scarab (Losey and Vaughan, "The Economic Value of Ecological Services Provided by Insects," *Bioscience* 56:311-323 (2006), which is hereby incorporated by reference in its entirety), while not typically classified as a pest species, also has similarities to the BCB in its potential as a waste reducer, as it has been utilized in the breakdown of manure and other livestock waste. Looking at the proteolytic profile of each of these species is useful for examining the general overview of peptidases and their relative distributions, and also for exploring the enzymes that could be responsible for the specific digestive capacity of interest.

While a direct comparison of transcriptomes would have been ideal in this study, there is a lack of available transcriptomes on species that are taxonomically similar to the BCB. It appears that while the transcriptome has a significantly greater number of sequences to analyze compared to genomic entries, the number of sequences that fall into each peptidase type are proportionally very similar.

Candidate Genes Identified from Differential Expression

Comparing differentially expressed genes with those derived from proteolytic screening showed that a substantial proportion of upregulated genes in both of the treatment groups were homologous to existing peptidases, namely serine, cysteine, or metalloproteases (Table 1, FIG. 4). The feather-fed group in particular showed a high abundance of peptidases in its upregulated gene pool (nearly 50%), possibly an attestation to the recruitment of specialty proteolytic enzymes needed to metabolize feather protein. Trypsin is an omnipotent serine protease (Kühne, W, "Ueber das Trypsin (Enzym des Pankreas)," *FEBS Letters* 62:8-12 (1976), which is hereby incorporated by reference in its entirety) found in the digestive tracts of vertebrates and insects (Kühne, W, "Ueber das Trypsin (Enzym des Pankreas)," *FEBS Letters* 62:8-12 (1976) and Lazarević and Janković-Tomanić, "Dietary and Phylogenetic Correlates of Digestive Trypsin Activity in Insect Pests," *Entom. Exp. Appl.* 157: 123-151 (2015), which are hereby incorporated by reference in their entirety). Because trypsin is not known to exhibit keratinolytic properties in most species, this may be a novel and unique feature of the trypsin-like enzymes found in the Black Carpet Beetle that could have evolved due to the specialized diet of the host. Aminopeptidase-N has been previously documented to exhibit significant activity in insect midguts, mimicking the role of its homolog in the mammalian kidney (Wang et al., "Molecular Characterization of Four Midgut Aminopeptidase N Isozymes From the Cabbage Looper, *Trichoplusia*," *Insect Biochem Mol Biol* 35:611-620 (2005), which is hereby incorporated by reference in its entirety).

GILT reductase is known to have disulfide bond-reducing properties and is predicted to play a role in antigen display and processing (Arunachalam, et al., "Enzymatic Reduction of Disulfide Bonds in Lysosomes: Characterization of a Gamma-interferon-inducible Lysosomal Thiol Reductase (GILT)," *PNAS* 97:745-750 (2000) and Phan et al., "Gamma-interferon-inducible Lysosomal Thiol Reductase (GILT): Maturation, Activity, and Mechanism of Action," *J. Biol. Chem.* 275:25907-25914 (2000), which are hereby incorporated by reference in their entirety). This reducing property may be critical to dissolving the high cysteine and disulfide bond content in feather and other keratin-rich materials. While this enzyme did not show the highest protein release in its expression in bacteria, its function as a disulfide bond reducer still makes it a likely and unique player in feather hydrolysis.

Though there were a number of upregulated genes predicted to pertain to digestion in the feather-fed group, there were comparatively fewer predicted digestive enzymes upregulated in the control-fed group. This is likely due to chemical and mechanical differences in the varying food substances of each treatment group which would influence gene regulation; there is evidence that the BCB exhibits specificity in the release of digestive enzymes based on type and volume of specific compounds present in the gut (Baker JE Substrate specificity in the control of digestive enzymes in larvae of the black carpet beetle. *J. Insect Physiol.* 23:749-753 (1977), which is hereby incorporated by reference in its entirety). Given the chemically inert nature of the feather, more specialized enzymes, including oxidoreductases and strong proteases, would be necessary to degrade this substrate. This is supported by the diversity of digestive enzymes upregulated in the feather-fed group. Simpler and more digestible substrates, such as the chow fed to the control group, would likely not require such an array of enzymes and would be able to be degraded by proteases with broad specificity such as trypsin, lipase, and glucosidase. Consequently, these more omnipotent enzymes were what was upregulated in the control-fed group.

Candidate Genes Identified Through Sequence Homology Screening

Several keratinolytic enzymes with full available gene sequences were chosen as queries for homology-based screening. S8 peptidases, which are most commonly endopeptidases (Barrett and Rawlings, "Families and Clans of Serine Peptidases," *Arch. Biochem. Biophys.* 318:247-250 (1995) and Hedstrom, L, "Serine Protease Mechanism and Specificity," *Chem. Rev.* 102:4501-4524 (2002), which are hereby incorporated by reference in their entirety), include most currently described keratinases including those secreted from fungal and bacterial strains characterized in the literature. These enzymes are also typically quite broad in substrate specificity, and are ubiquitous throughout all biological kingdoms (Barrett and Rawlings, "Families and Clans of Serine Peptidases," *Arch. Biochem. Biophys.* 318.247-250 (1995) and Hedstrom, L, "Serine Protease Mechanism and Specificity," *Chem. Rev.* 102:4501-4524 (2002), which are hereby incorporated by reference in their entirety).

Homology based screening, while a quick and easy method to pull similar sequences from a database, is somewhat restrictive in application: queries in this case are limited to either models representing enzyme types (for S8 peptidases), or currently documented keratinases with available gene sequences. An additional limitation is that currently characterized keratinases are typically functionally suboptimal due to thermophilic conditions or certain chemical and/or physical pretreatments or reductions required (Brandelli, A, "Bacterial Keratinases: Useful Enzymes for Bioprocessing Agroindustrial Wastes and Beyond," *Food Bioproc Tech.* 1:105-116 (2008); Brandelli et al., "Biochemical Features of Microbial Keratinases and Their Production and Applications," *Appl. Microbiol. Biotech* 85:1735-1750 (2010); and Lange et al., "Microbial Decomposition of Keratin in Nature—A New Hypothesis of Industrial Relevance," *Appl. Microbiol. Biotechnol.* 100:2083-

2096 (2016), which are hereby incorporated by reference in their entirety). While these may be suitable for small-scale application, utilizing these enzymes for industrial purposes would be unsustainable and costly. This brings about the need to search for alternative, more effective keratinases that can function at conventional temperatures (~20° C.-30° C.) and pH ranges (pH 5.0-8.0). Homology scans to these existing keratinases, therefore, may select sequences that exhibit similar suboptimal properties such as extremophilic character, or general ineffectiveness. In addition, homology-based screening using HMMER, while more robust than a BLAST search or other similar programs (Eddy, S R, "Accelerated Profile HMM Searches," *PLoS Comput. Biol.* 7:1002195 (2011), which is hereby incorporated by reference in its entirety), may exclude sequences of interest that are dissimilar enough to queries so that they are not picked up by the algorithms. Such may be the case with enzymes that have convergently evolved keratinolytic properties but share little sequence or structural similarity to the query keratinases utilized in this study. In addition, there may be larger differences between keratinases in eukaryotic vs. prokaryotic organisms, which would limit the effectiveness of using microbial keratinases as queries. Applicant aimed to correct this by relaxing the specificity cutoff, which would allow for more dissimilar sequences to be picked up by the model.

Despite these limitations, homology-based screening did return an encouraging list of candidates with potential keratinolytic properties (Table 3). These candidates identified through homology screening but not functionally tested in this study, specifically those with a high number of matches to existing keratinases, would be appropriate to explore for feather-degrading activity in future assays.

Materials and Methods for Examples 7-8

Gene Candidate Selection

Candidate genes for functional expression were previously selected from a list of genes candidates identified through differential expression and homology screening as described in Examples 1-6. These top candidates were chosen from the differentially expressed group based on the presence of a complete ORF, and a functional prediction as one with high keratinolytic potential/digestive properties. Special preference was given to sequences with a signal peptide. For the sequence homology group, top candidates were chosen based on the number of hits to existing keratinases (at least six), presence of a signal peptide, and unique predicted function. Function and general description were determined using conserved domains (Marchler-Bauer et al., "CDD/SPARCLE: Functional Classification of Proteins via Subfamily Domain Architectures," *Nucleic Acids Res.* 45:200-203 (2017), which is hereby incorporated by reference in its entirety) and NCBI BLAST (Johnson et al., "NCBI BLAST: A Better Web Interface," *Nucleic Acids Res.* 36:5-9 (2008), which is hereby incorporated by reference in its entirety).

These final six candidate sequences were synthesized from Integrated DNA Technologies (Coralville, Iowa). Sequences were flanked with Gateway technology recombination sites, as well as a Kozak sequence and Shine Dalgarno sequence for expression purposes.

Expression in *E. coli*

All six candidates were cloned into the T7-promoter based expression vector pDEST14 using Invitrogen's Gateway Technology (Carlsbad, CA). PUC 19 was used as a vector control. *E. coli* C41 pLysS cells (Milliporesigma, Burlington MA) were used for expression to minimize basal expression of protein and also to reduce potential cell proteolysis by the recombinant protein. Transformations were performed according to the manufacturer's protocol. Protein was induced with IPTG to a final concentration of 0.1 mM in 50 ml of cell culture and induction was allowed to proceed for three hours. After induction, the culture was spun down and the cells resuspended in Tris-HCL pH 8.0. Cells were lysed by sonication (two repetitions of four minutes with four second pulses at 60 hz) and the lysate spun again to remove all cellular debris. The supernatant containing the protein was passed through a 10 kDa centrifugal filter to concentrate the protein of interest.

Functional Assays

The concentrated protein supernatant from each expression system was used as the crude enzyme for functional assays against a solution of 0.1% casein dissolved in Tris-HCl buffer pH 8.0. The most promising candidates were then tested against. For feather substrate, enzymes were also used in combination to test the efficacy of certain combined enzymatic treatments, while keeping volume consistent.

Functional assays were based on methods described in Kunitz, M, "Crystalline Soybean Trypsin Inhibitor: II. General Properties," *J. Gen. Physiol.* 30:291-310 (1947), which is hereby incorporated by reference in its entirety, with modification; crude enzyme solutions were incubated with casein substrate for one hour or feather substrate for 24 hours and stopped with trichloroacetic acid (TCA). Innate controls for each treatment received TCA prior to addition of substrate, and were used as a background reading for normalizing concentrations. Samples were spun down after stopping and the total protein release contained in the supernatant was measured by bicinchoninic acid assay (BCA) (Smith et al., "Measurement of Protein Using Bicinchoninic Acid," *Anal Biochem* 150:76-85 (1985), which is hereby incorporated by reference in its entirety) using bovine serum albumin (BSA) as a standard. Buffer only was used as a negative control and a 1 mg/mL solution of Proteinase K was used as a positive control. Statistical analysis was performed on net average change in absorbance using a mixed linear effects model in R.

Optimization Assays

Two enzymes, 43962 (aminopeptidase-N like) and 44648 (GILT-reductase like) were chosen for optimization studies based on high performance against casein and highest keratinolytic potential from predicted function. Crude enzyme was incubated with 0.1% sterile poultry feather homogenized in Tris-HCl buffer of varying pH: 3.5, 5.5, 6.5, 7.5, 8.0, 9.5, 10.5, 12.0, or in buffer pH 8.0 at varying temperatures: 25° C., 30° C., 40° C., 50° C., 60° C., 70° C., and 80° C. Reactions followed the same protocol as described above and total soluble protein released into solution was measured using BCA after 24 hours.

Example 7—Feather Degrading Activities of the Digestive Enzymes Expressed in *E. coli*

The final list of candidates from the differentially expressed group after filtering included a GILT-like reductase, an aminopeptidase-N-like, and trypsin-like enzymes. The candidates chosen from the homology screening group were an APRE protease, an S8-convertase-like, and an S8 convertase with pre and pro peptides (Table 4). All starting concentrations of crude enzyme in bacterial lysate were around 1 mg/mL, comparable with Proteinase K, allowing for direct comparison between groups.

The aminopeptidase was also relatively thermotolerant, with activity levels above 50% from 40° C. to 80° C. (FIG. 8B). Maximum activity levels for this enzyme was seen at 50° C. The reductase also exhibited thermotolerance, with

TABLE 4

Top Keratinolytic Gene Candidates from the Black Carpet Beetle Transcriptome and Relative Predicted Functions.

| Gene ID[3±] | Length (bp) | Conserved domain[1*] | | | Top BLAST Hit[**] | | | |
|---|---|---|---|---|---|---|---|---|
| | | Description | Interval | E-value | Description | Organism | Cover | Identity |
| 43962 | 1890 | Peptidase M1, ERAP-1 C-terminal | 1-654, 892-1779 | 9.00E−94 | Aminopeptidase-N like | *Osmia bicornis bicornis* | 95% | 37% |
| 44648 | 597 | GILT reductase | 64-381 | 1.13E−32 | GILT-like protein | *Leptinotarsa decemlineata* | 99% | 40% |
| 45417 | 561 | Trypsin-like serine protease | 4-552 | 9.30E−62 | Chymotrypsin-1 like | *Nicrophorus vespilloides* | 99% | 53% |
| 53596 | 1161 | AprE serine protease | 553-1113 | 4.62E−20 | Membrane bound transcription factor | *Tribolium castaneum* | 97% | 86% |
| 75635 | 939 | Propeptide and S8 convertase | 67-291, 310-918 | 2.00E−111 | Furin-like protease | *Tribolium castaneum* | 97% | 83% |
| 85625 | 1887 | Propeptide and S8 convertase, convertase p-domain | 76-312, 370-1260, 1522-1785 | 1.32E−173 | Neuroendocrine convertase | *Tribolium castaneum* | 99% | 87% |

*Relative conserved domain descriptions, intervals, and E-values were determined using the conserved domains database v3.18 with a cutoff value of .01.
**Top BlastX hit descriptions, organism, percent coverage and identity were determined using NCBI BlastX using default parameters.
±Annotations of six candidates chosen for functional expression with sequence lengths generated by Trinity. 43962, 44648, and 45417 were identified via differential expression, while 53596, 75635, and 85625 were identified using homology screening.

Figure 6:
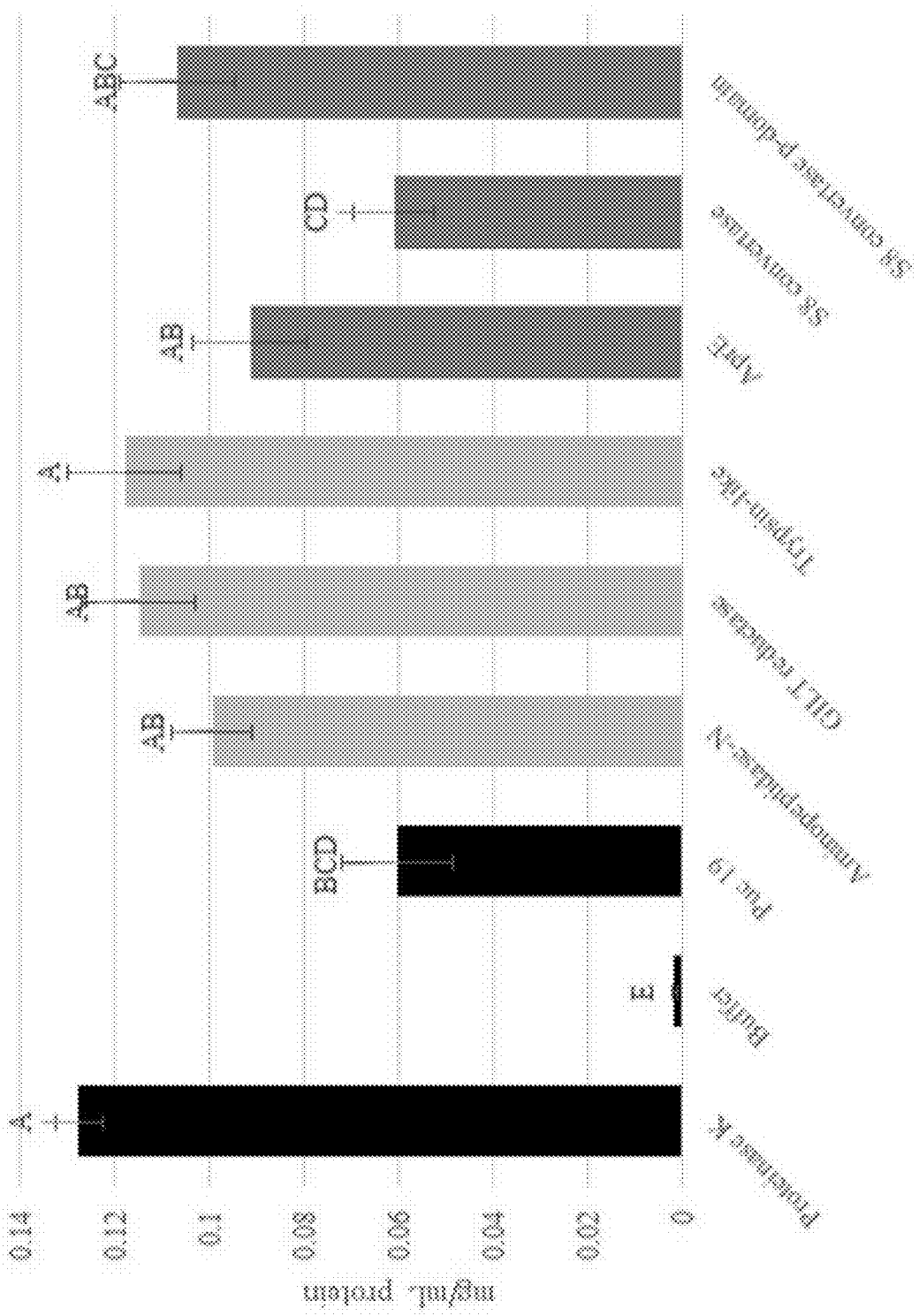
FIG. 6 is a bar graph showing the net change in soluble protein after one hour incubation of enzymes with 0.1% casein substrate at 30° C. Starting concentration of all crude enzyme solutions and Proteinase K were approximately 1 mg/mL. Positive control Proteinase K exceeded the proteolytic activity of other enzyme candidates, though these were not far behind in activity. Protein was quantified using BCA assay with bovine serum albumin as a standard. Statistical analysis was performed on normalized values using R and a linear mixed effects model. Letter groups indicate statistical significance of p=0.05.

For the casein substrate, the positive control solution of 1 mg/mL Proteinase K exhibited the most release of protein, though protein levels from the enzyme candidates did not fall far behind these levels. The average net protein release by all candidates were statistically different from the negative control, buffer only, confirming proteolytic activity (FIG. 6).

Figure 7:
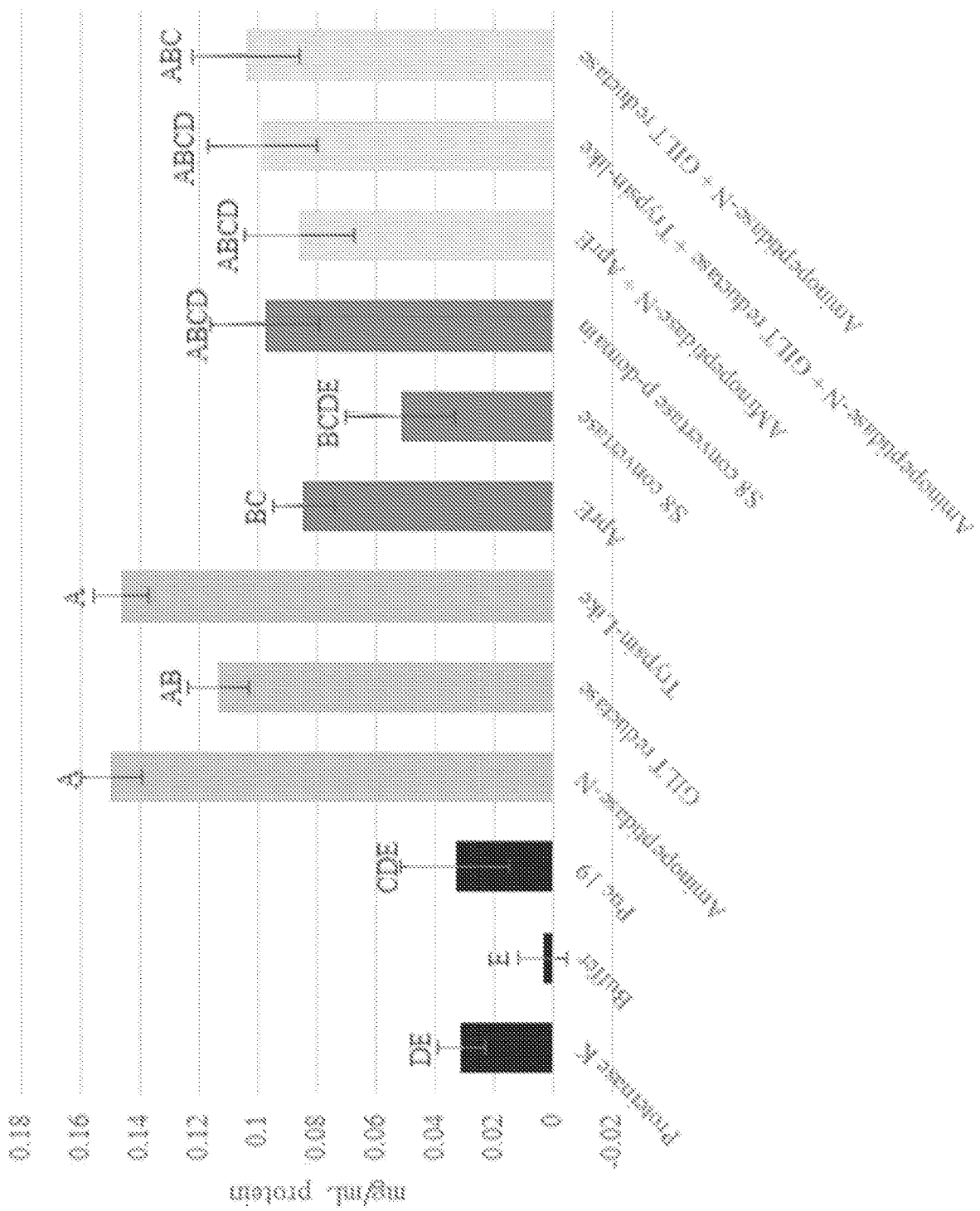
FIG. 7 is a bar graph showing the net change in soluble protein after 24 hours of incubation of individual enzymes or enzyme combinations with 0.1% feather homogenate substrate at 30° C. Starting concentration of all crude enzymes and Proteinase K were approximately 1 mg/mL. All enzymatic treatments exceeded positive and negative controls in keratinolytic activity after the 24 hour incubation period. Protein was quantified using BCA assay with bovine serum albumin as a standard. Statistical analysis was performed on normalized values using R and a linear mixed effects model. Letter groups indicate statistical significance of p=0.05.

For feather homogenate substrate, all enzymes except for one S8 peptidase displayed a significantly increased protein release relative to controls, with protein levels reaching 2-3 times that of Proteinase K (FIG. 7). The top performing candidates overall included the aminopeptidase-N-like and trypsin-like enzymes from the differentially expressed group, each displaying an approximate four-fold increase in protein release compared to Proteinase K. The GILT-like reductase was not statistically different in performance than the AprE-like and S8-convertase with propeptide enzymes from homology screening. The three controls, including Proteinase K, were not statistically different from one another, though average net protein release was slightly higher for Proteinase K and the Puc19 groups compared to buffer only (FIG. 7).

Example 8—Optimization Assays

Figure 8A:
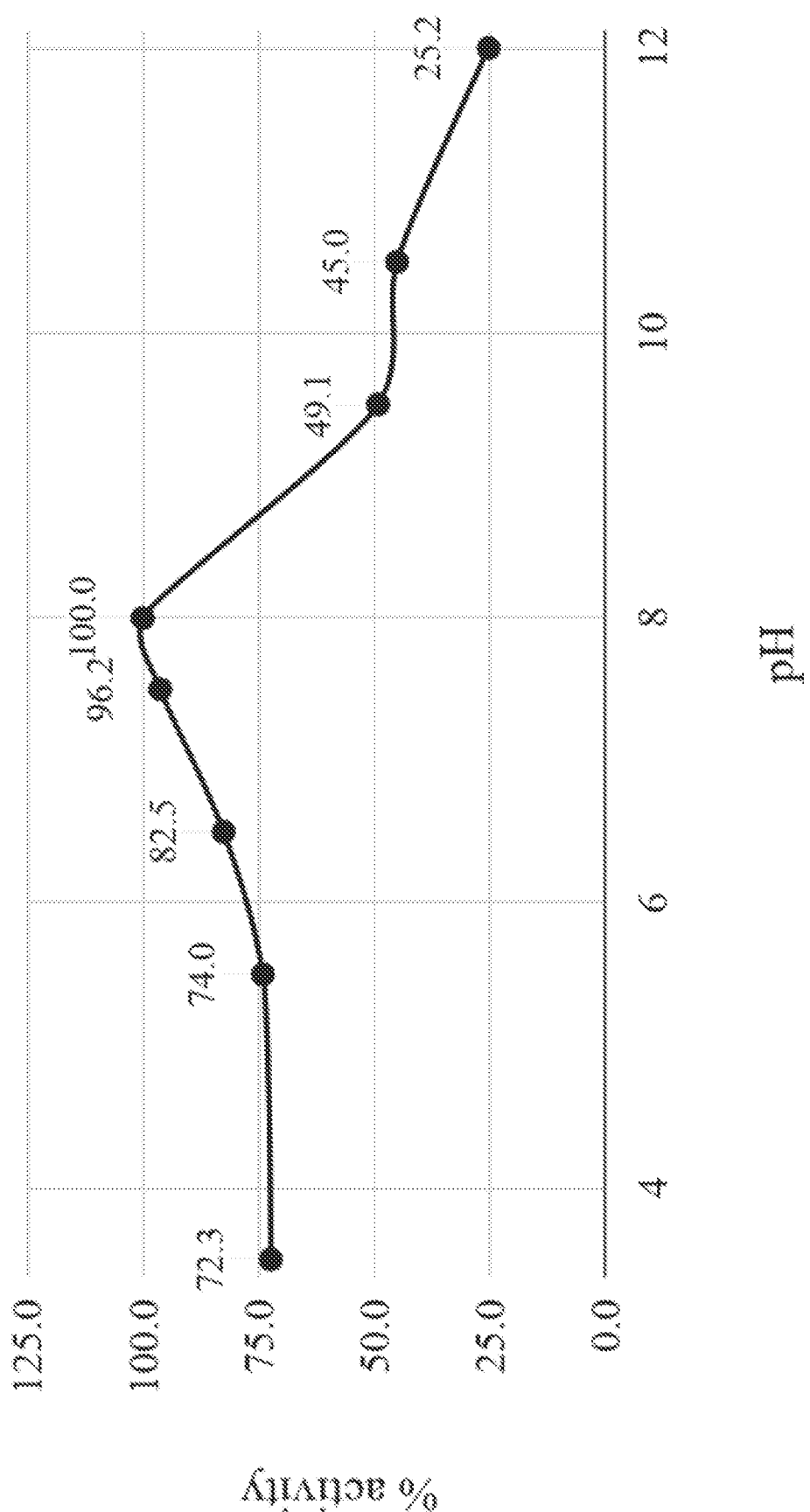
FIG. 8A and FIG. 8B are graphs showing aminopeptidase-N like activity across various pH (FIG. 8A) and temperature (FIG. 8B) ranges. Optimal pH is seen at 8.0, though activity remains above 70% for 3.5-8.0. Activity remains above 50% between 40° C. and 80° C., exhibiting the thermotolerance of this enzyme. Optimal temperature is determined to be at 50° C.
Figure 8B:
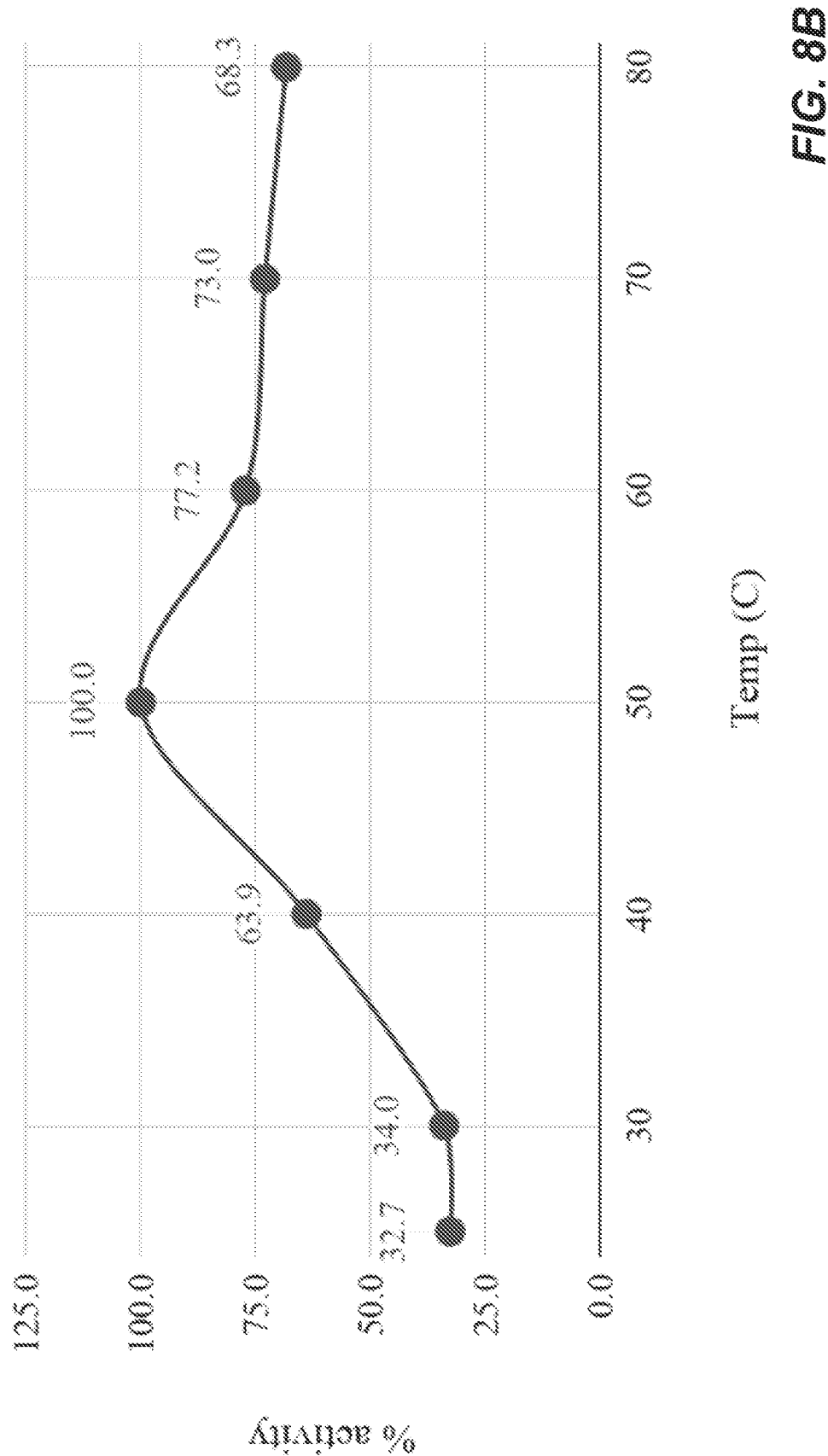
Figure 9A:
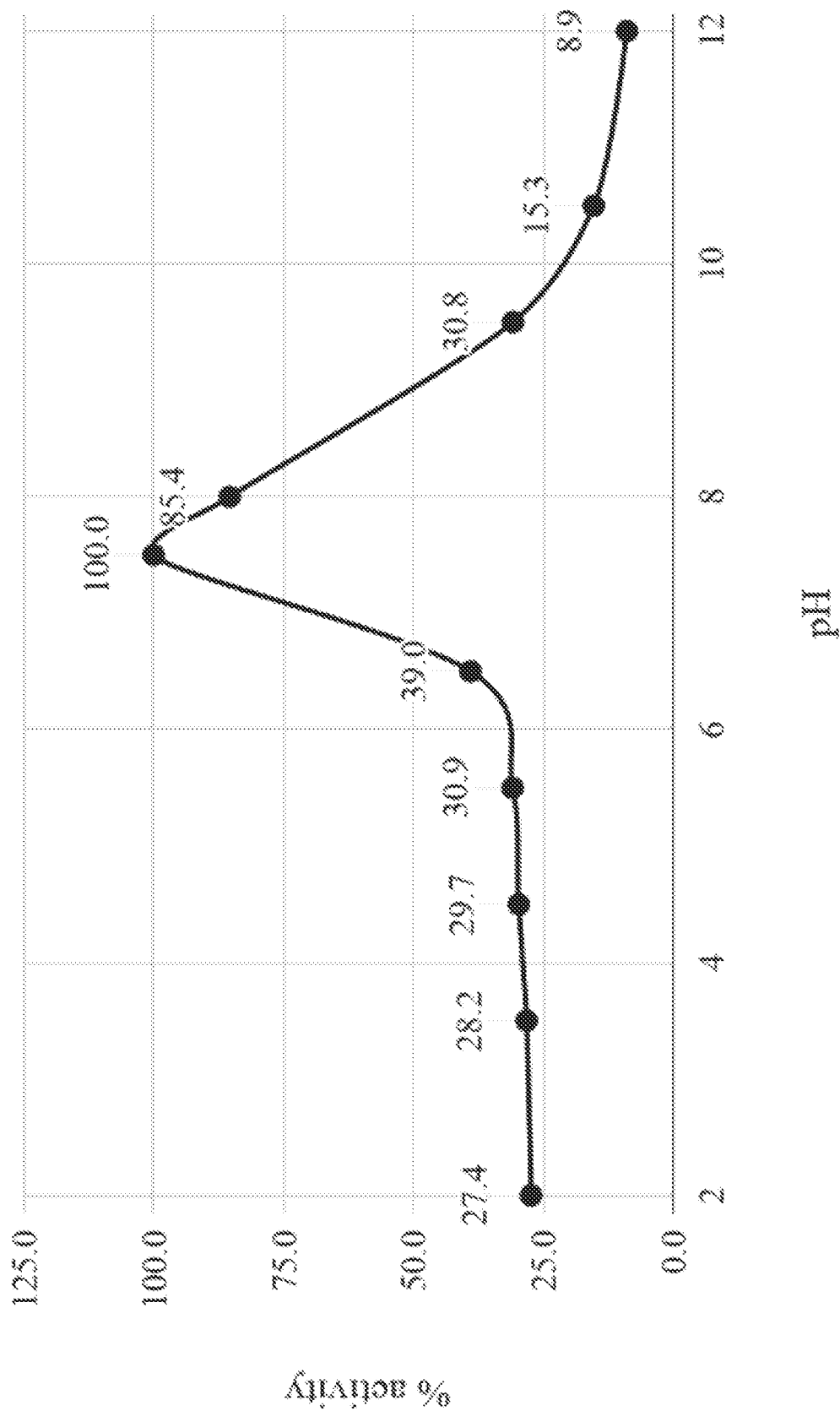
FIG. 9A and FIG. 9B are graphs showing GILT-reductase like activity over various pH (FIG. 9A) and temperature (FIG. 9B) ranges. The optimal pH is determined to be approximately 7.5, with activity levels declining rapidly before and after this range. A general thermotolerance is seen, however, with activity levels remaining above 90% between 30° C. and 50° C.
Figure 9B:
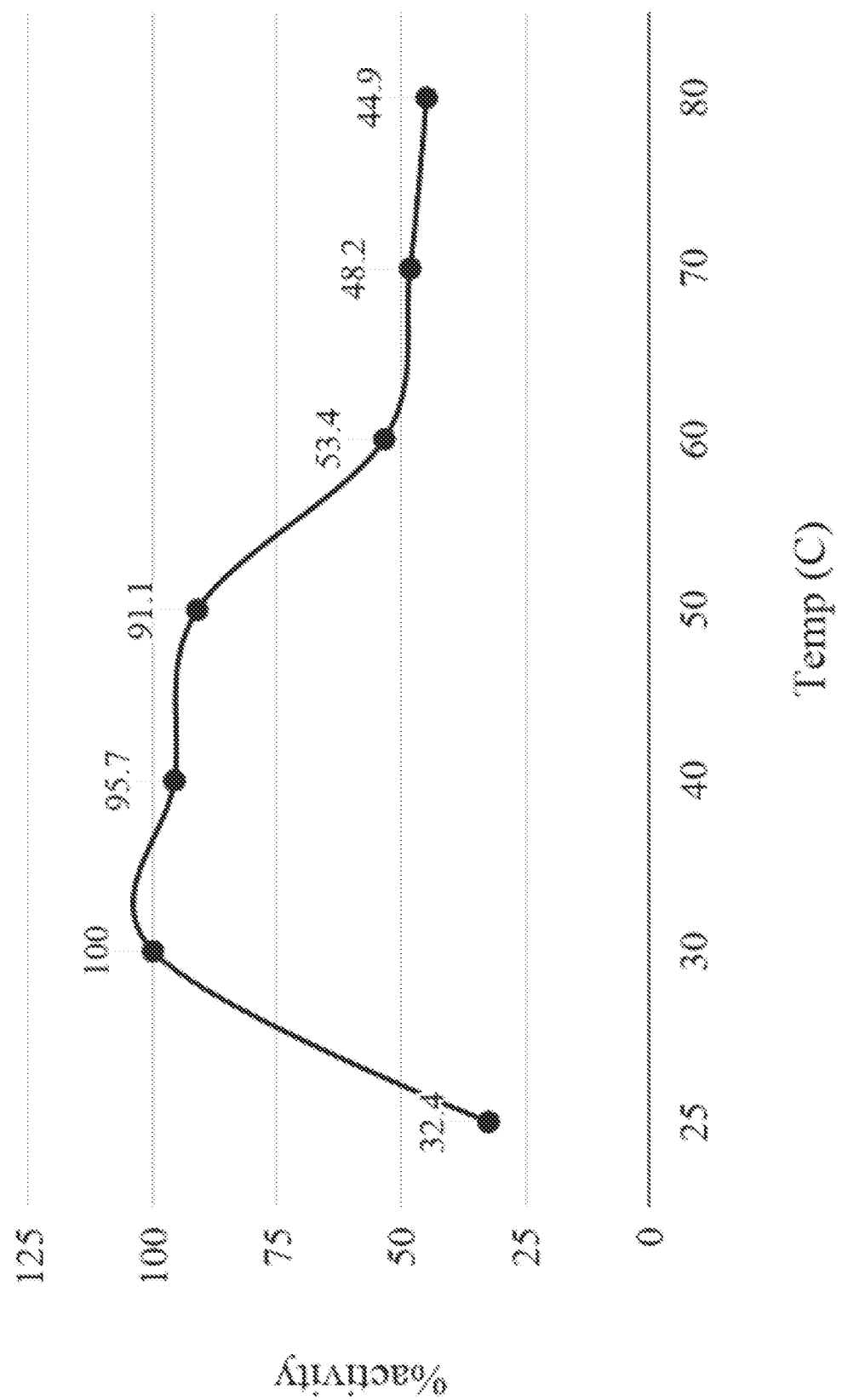

Maximum activity levels for the reductase and aminopeptidase were seen at pH levels 7.5 and 8.0, respectively (FIG. 8A, FIG. 9A). The aminopeptidase, however, tolerated a range of acidic pH levels, with activity remaining above 70% from pH 3.5 to 8.0. This activity quickly dropped to less than 50% at pH 9.5 to 12.0 (FIG. 7). The reductase, in contrast, was quite specific to pH 7.5, and activity levels dropped significantly to less than 40% before 7.5 and after 8.0 (FIG. 8A).

activity greater than 90% between 30° C. and 50° C., and maximum activity at 30° C. (FIG. 9B).

Discussion of Examples 7-8

Functional Expression of Candidate Genes in *E. coli*

All candidates overall resulted in a higher degradation of casein than puc 19 vector control, but were not as effective as Proteinase K. This caseinolytic activity was expected for all keratinolytic enzyme candidates, which are likely to exhibit generalized proteolytic activity at their base function.

While all of the enzyme candidates displayed statistically higher caseinolytic activity compared to the buffer-only, not all of these groups had statistically increased keratinolytic activity. Proteinase K in particular displayed a markedly different release of protein between the two substrates, with keratinolytic activity similar to background levels displayed by the puc19 control. This is despite the relatively high concentration used (1 mg/mL), which is approximately 5-10 times higher than typical working concentrations (50-250 µg/mL). This may be due to Proteinase K's specificity towards hair and other alpha keratins, while feathers are a beta keratin and therefore of different chemical structure. Most of the candidate enzymes, however, displayed significant activity against feather substrate compared to controls, implying that the specificity of these enzymes in the black carpet beetle may be optimized towards feather keratin hydrolysis.

The aminopeptidase-like and trypsin-like enzymes were the top performing enzymes overall against the feather substrate (FIG. 7), resulting in the highest release of protein after the 24-hour incubation. This is unsurprising based on their ubiquitous roles in metabolism and digestion in other species (Adang, M J, "Insect Aminopeptidase N.," In: Barrett A (ed) Handbook of Proteolytic Enzymes, 2nd edn. Cambridge, UK, pp. 296-299 (2004); Bozić et al., "Partial Purification and Characterization of Midgut Leucyl Aminopeptidase of *Morimus funereus* (*Coleoptera: Cerambycidae*) Larvae," *Comp. Biochem. Physiol.* 134:231-241 (2003); and Wang et al., "Molecular Characterization of Four Midgut Aminopeptidase N Isozymes From the Cabbage Looper, *Trichoplusia*," *Insect Biochem. Mol. Biol.* 35:611-620 (2005), which are hereby incorporated by reference in their entirety). These may be optimized in the black carpet beetle to be able to digest keratin-rich substrates.

The GILT-like enzyme, while not displaying the highest net change in protein, is still predicted to play a key role in feather degradation by its reducing properties (Arunachalam, et al., "Enzymatic Reduction of Disulfide Bonds in Lysosomes: Characterization of a Gamma-interferon-inducible Lysosomal Thiol Reductase (GILT)," *PNAS* 97:745-750 (2000) and Phan et al., "Gamma-interferon-inducible Lysosomal Thiol Reductase (GILT): Maturation, Activity, and Mechanism of Action," *J. Biol. Chem.* 275:25907-25914 (2000), which are hereby incorporated by reference in their entirety), which would aid in dissolving the high number of cysteine and disulfide bonds present in this substrate. It is likely that this enzyme works best in conjunction with other enzymes present in the digestive tract, and may require the help of other hydrolases and proteases to fully break down feathers.

Combining certain enzymes showed that these enzymes are able to work in conjunction with one another without significant decline in activity (FIG. 7). It is currently unknown the mechanism by which these enzymes are secreted in the larval midgut, so further optimization is necessary to discover optimal conjunctive working conditions. The reductase and aminopeptidase were chosen to be combined with each other and other candidates based on their purported significant but incomplete role in feather degradation. More specifically, the reductase may be crucial for reducing the disulfide bonds present within the feather, but may not be apt at other generalized proteolysis (Arunachalam, et al., "Enzymatic Reduction of Disulfide Bonds in Lysosomes: Characterization of a Gamma-interferon-inducible Lysosomal Thiol Reductase (GILT)," *PNAS* 97:745-750 (2000) and Phan et al., "Gamma-interferon-inducible Lysosomal Thiol Reductase (GILT): Maturation, Activity, and Mechanism of Action," *J. Biol. Chem.* 275:25907-25914 (2000), which are hereby incorporated by reference in their entirety). The aminopeptidase, in contrast, would likely exhibit less specificity and have a function similar to that of the trypsin like enzyme and AprE serine protease (Adang, M J, "Insect Aminopeptidase N.," In: Barrett A (ed) Handbook of Proteolytic Enzymes, 2nd edn. Cambridge, UK, pp. 296-299 (2004); Bozić et al., "Partial Purification and Characterization of Midgut Leucyl Aminopeptidase of *Morimus funereus* (*Coleoptera: Cerambycidae*) Larvae," *Comp. Biochem. Physiol.* 134:231-241 (2003); and Wang et al., "Molecular Characterization of Four Midgut Aminopeptidase N Isozymes From the Cabbage Looper, *Trichoplusia*," *Insect Biochem. Mol. Biol.* 35:611-620 (2005), which are hereby incorporated by reference in their entirety). Future studies will aim to examine the working relationship between these digestive enzymes and their mechanism of action relative to one another.

Optimization

Optimal temperatures of insect midgut secreted aminopeptidases vary widely, ranging from 40° C.-60° C. (Adang, M J, "Insect Aminopeptidase N.," In: Barrett A (ed) Handbook of Proteolytic Enzymes, 2nd edn. Cambridge, UK, pp. 296-299 (2004) and Bozić et al., "Partial Purification and Characterization of Midgut Leucyl Aminopeptidase of *Morimus funereus* (*Coleoptera: Cerambycidae*) Larvae," *Comp. Biochem. Physiol.* 134:231-241 (2003), which are hereby incorporated by reference in their entirety). The optimal temperature of the aminopeptidase-like enzyme from the black carpet beetle falls within this range, further supporting its homology to other insect digestive aminopeptidases. Regarding pH, Baker (Baker, J E, "Isolation and Properties of Digestive Carboxypeptidases From Midguts of Larvae of the Black Carpet Beetle *Attagenus megatoma*," *Insect Biochem* 11:583-591 (1981a) and Baker, J E, "Resolution and Partial Characterization of the Digestive Proteinases From Larvae of the Black Carpet Beetle," In: Bhaskaran G (ed) *Current Topics in Insect Endocrinology and Nutrition*, Springer, Boston, MA pp. 283-315 (1981b), which are hereby incorporated by reference in their entirety) determined the optimal pH of a digestive aminopeptidase in the larval midgut to be around 7.5, which is similar to what was determined in this study (FIG. 8A). This also falls within the range of that for other insect species, which varies from 7.0 to 8.0 (Adang, M J, "Insect Aminopeptidase N.," In: Barrett A (ed) Handbook of Proteolytic Enzymes, 2nd edn. Cambridge, UK, pp. 296-299 (2004); Baker, J E, "Isolation and Properties of Digestive Carboxypeptidases From Midguts of Larvae of the Black Carpet Beetle *Attagenus megatoma*," *Insect Biochem* 11:583-591 (1981a); and Baker, J E, "Resolution and Partial Characterization of the Digestive Proteinases From Larvae of the Black Carpet Beetle," In: Bhaskaran ((ed) *Current Topics in Insect Endocrinology and Nutrition*, Springer, Boston, MA pp. 283-315 (1981b), which are hereby incorporated by reference in their entirety).

GILT reductase is reported to have an optimal pH around 4.0-5.0 (Arunachalam, et al., "Enzymatic Reduction of Disulfide Bonds in Lysosomes: Characterization of a Gamma-interferon-inducible Lysosomal Thiol Reductase (GILT)," *PNAS* 97:745-750 (2000) and Phan et al., "Gamma-interferon-inducible Lysosomal Thiol Reductase (GILT): Maturation, Activity, and Mechanism of Action," *J. Biol. Chem.* 275:25907-25914 (2000), which are hereby incorporated by reference in their entirety), though the optimal pH for the reductase determined in this study is higher (7.5). However, the black carpet beetle reductase does exhibit a similar optimal temperature range between 37° C. and 40° C. (FIG. 9B). It's possible that this reductase, though similar in sequence to GILT reductase, differs in structure or function to a point which causes optimized conditions to differ from its homolog.

Having optimized conditions at neutral pH and lower temperature ranges gives both of these enzymes an edge over existing keratinases, which tend to be thermophilic or extremophilic (Brandelli, A, "Bacterial Keratinases: Useful Enzymes for Bioprocessing Agroindustrial Wastes and Beyond," *Food Bioproc. Tech.* 1:105-116 (2008); Brandelli et al., "Biochemical Features of Microbial Keratinases and Their Production and Applications," *Appl. Microbiol. Biotech.* 85:1735-1750 (2010); Lange et al., "Microbial Decomposition of Keratin in Nature—A New Hypothesis of Industrial Relevance," *Appl. Microbiol. Biotechnol.* 100:2083-2096 (2016); and Mazotto et al., "Production of Feather Protein Hydrolyzed by *B. subtilis* AMR and its Application in a Blend with Cornmeal by Extrusion," *LWT* 84:701-709 (2017), which are hereby incorporated by reference in their entirety). The application of these enzymes at industrial or commercial scales, therefore, would be significantly more sustainable and cost effective than other currently available enzymes that require higher temperatures or acidic buffer systems. Furthermore, neutral pH ranges are more likely to allow for the preservation of protein content compared to acidic or basic conditions, and also for this protein to more easily be recycled without pretreatment or processing.

Knowing the optimized conditions of these enzymes is crucial in beginning to understand their mechanisms of action and individual roles in keratin metabolism. Determining such conditions for the other enzyme candidates would be the next step in seeing the complete picture of keratin breakdown in this species and for knowing how to apply their unique functions at a larger scale.

Considerations for Application

Overall, the functional expression data of these candidate genes revealed a promising ability of these enzymes to degrade poultry feathers relative to the commercially available enzyme. These new enzymes can conceivably be applied towards the in vitro digestion of feathers. These assays also introduce the possibility of functional expression of these enzymes in a unicellular vehicle such as *E. coli*, which greatly broadens their application potential.

Furthermore, this study demonstrates that the digestive enzymes from the black carpet beetle exhibit keratinolytic activity towards non-chemically treated feathers and can perform under mild conditions such as neutral pH ranges and lower temperatures. This differentiates these enzymes from other currently studied microbial keratinases, which are largely nonoptimal for large-scale application due to their thermophilic nature or requirement of pretreatments (Brandelli, A, "Bacterial Keratinases: Useful Enzymes for Bioprocessing Agroindustrial Wastes and Beyond," *Food Bioproc. Tech.* 1:105-116 (2008) and Mazotto et al., "Production of Feather Protein Hydrolyzed by *B. subtilis* AMR and its Application in a Blend with Cornmeal by Extrusion," *LWT* 84:701-709 (2017), which are hereby incorporated by reference in their entirety). More importantly, the keratinolytic activity of several of these enzymes supersede that of a higher working concentration of Proteinase K, commercially advertised as a keratinase. Both of these factors have significant implications for utilizing these enzymes for commercial or industrial purposes.

Example 9—Enzyme Combinations

Candidate genes identified from the transcriptome of *Attagenus unicolor* (corresponding to polypeptides having an amino acid sequence corresponding to SEQ ID NO:8, SEQ ID NO:10, SEQ ID NO: 12, SEQ ID NO: 14, and SEQ ID NO: 16) were synthesized from Integrated DNA Technologies (Coralville, Iowa). Sequences were made to contain the Gateway cloning attB and attR recombination sites, and a Kozak sequence and Shine-Dalgarno sequence for cloning purposes. Constructs were cloned into the Gateway Technology T7-promoter based expression vector pDEST14 using the standard Gateway Technology cloning protocol using pDONR221 as an entry vector. 2 µL of final reaction was transformed into *E. coli* C41 pLysS cells for expression, which would minimize basal expression of protein and also reduce potential cell proteolysis by the recombinant protein. Transformations were plated on LB AMP plates and incubated overnight at 37° C. Three colonies from each transformation were scaled up and checked for successful insertion of the gene of interest using Sanger sequencing before proceeding.

After sequence confirmation, a single colony from each transformation was inoculated in 5 mL of LB AMP broth and grown overnight at 37° C. with agitation (250 rpm). The following morning each inoculum was diluted 1:500 in 50 mL of fresh LB AMP in a 500 mL sterile baffled flask, and returned to the incubator until an OD600 of 1.0 was reached. Protein expression was induced with a final concentration of 1 mM IPTG and was allowed to proceed for three hours. After induction, the culture was spun down and the cells resuspended in Tris-HCL pH 8.0. Cells were lysed by sonication (two repetitions of four minutes with four second pulses at 60 hz) and the lysate spun again to remove all cellular debris. The supernatant containing the protein was passed through a 10 kDa centrifugal filter to concentrate the protein of interest.

This concentrated protein was used as the crude enzyme extract for functional assays against a solution of 0.1% sterile poultry feather homogenized in Tris-HCl buffer pH 8.0. Functional assays were performed in duplicate and were based on methods described in Kunitz et al. with modification; 1 part crude enzyme (either straight from one gene or an combined equal volumes from two or more extracts) was incubated with 5 parts of feather substrate for 24 hours or casein substrate for 1 hour and stopped with 5 parts of trichloroacetic acid (TCA). Innate controls for each treatment received TCA prior to addition of substrate and were used as a background reading for later analysis. Samples were spun down after stopping with TCA and the total protein release contained in the supernatant was measured by Bicinchoninic acid assay (BCA) using bovine serum albumin as a standard. Buffer only was used as a negative control and a 1 mg/mL solution of Proteinase K was used as a positive control. Puc19 gene was used as a cellular control to measure innate protein expression exhibited by the *E. coli* cells. Statistical analysis was performed on net average change in absorbance using a mixed linear effects model in R.

Figure 13A:
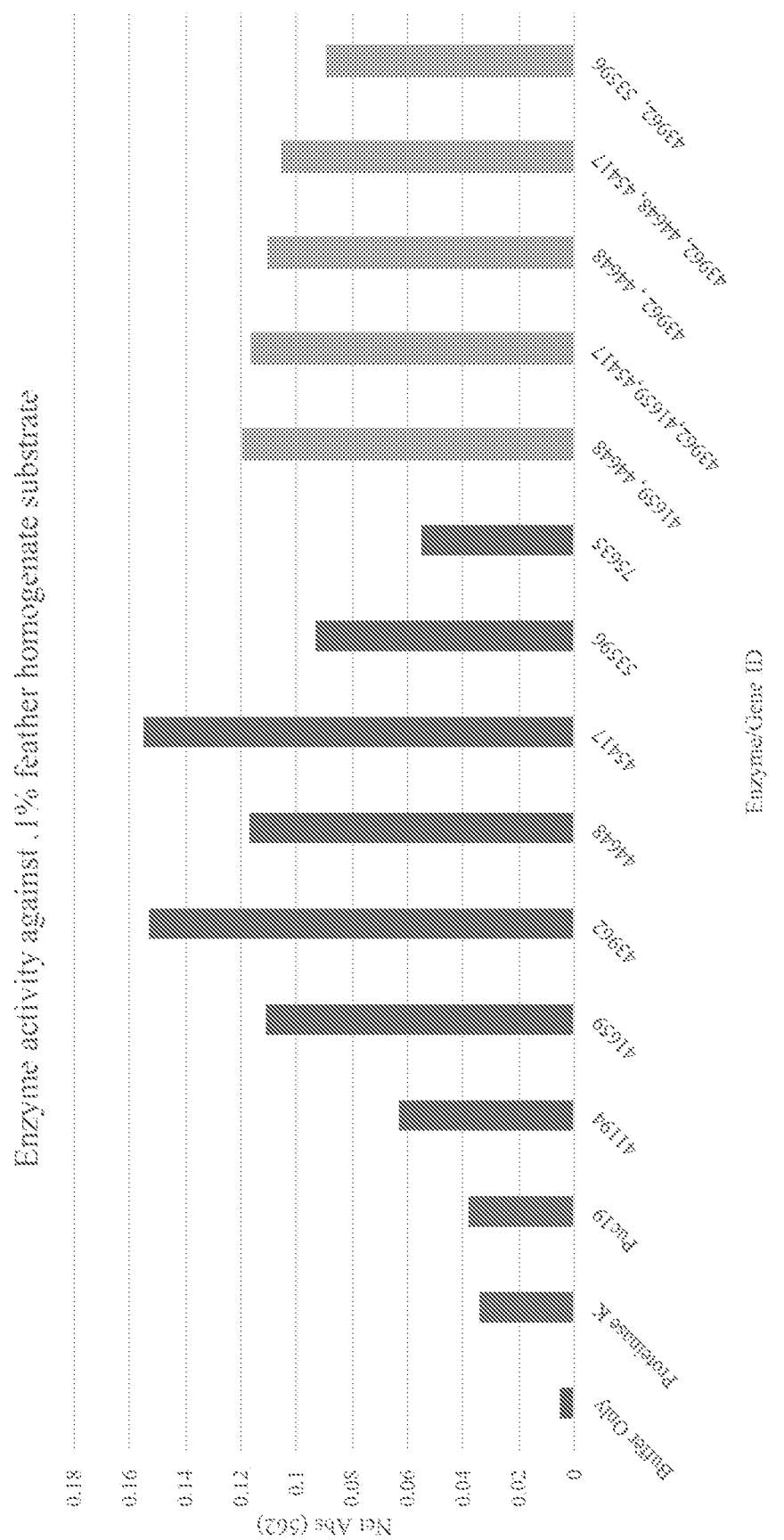

Absorbances were averaged across reads for each sample and the average control readings were subtracted to obtain a net average absorbance (FIG. 13A). Statistical analysis was done using ANOVA in R on these net average absorbances (FIG. 13B)

Example 10—Feather Fermentation in *E. coli* Culture

Feathers were gathered from Cornell University's poultry house. Feathers were washed with water and diluted ethanol and checked for mites and debris prior to drying overnight. After drying, each feather was weighed and the respective starter weights recorded. Feathers were then sterilized via autoclave (121° C. for 20 minutes) before proceeding.

*E. coli* was cultured as described in Experiment 9 up until induction of the cell culture. In addition to constructs described in Experiment 9, a construct comprising a nucleic acid sequence corresponding to SEQ ID NO: 17 (which encodes a polypeptide having the amino acid sequence of SEQ ID NO: 18) and a construct comprising a nucleic acid sequence corresponding to SEQ ID NO: 19 (which encodes a polypeptide having the amino acid sequence of SEQ ID NO:20) were also prepared (Table 5).

TABLE 5

Additional Nucleotide and Encoded Amino Acid Sequences Used in Experiment 9

| Description | Nucleotide Sequence | Encoded Amino Acid Sequence |
|---|---|---|
| 37927 | ATGCCTCGGTCGCTTCCGTCGGGCAAGGACCCGGCTGTA<br>TTGCGGCAAGAAATGCTCGACCACGGCTTGGGGCTTTTC<br>CGCGAAATTACGGTCGAAGAAAGCCGGGTAGGAGAAGTT<br>GTTGCCGCTTTGCAGAGCTTCCCTGGTGTCGAAACGGTG<br>CAAGAAGAACTTCCGATTGTCGTAGATGACGAAATTGAA<br>AAGCGAGTTAGCAGGTCGAGTAGCGCCGAGATGGGTCGT<br>TCAAGCGAGGGAGATAATTATCGATGCAAGAGCAAGTCG<br>CAGCGAAACTGCCAGTCGTATTTGGCTGACGCGAACGAC<br>CGTCATTACAACTACAACATTGGCGGGCTCAATGTGTAC<br>GCGGTGCATGAGCGGTATCCGCATAACTGGGGCAAGGGG<br>GTGAATTTGGTGTCCATAGAGGCGTCGTTCTGGGACCCG<br>GAGCACGAAGATTTGCCCGTTCAAGCGAAGATTCTCAAC<br>CCGCCCTTTTGGAAACCTGACGGGCACGATACGCTGAGC<br>GTCGGAATAATGTTTGCGAAGAGAAATGGAAAGGCGCTC<br>ACAGGCATCGCGGTCGATGCGACGCCCATGTACAGTATG<br>TACGGCTTGAAACAGTTGGGGAACATTATTCCGCTGCTC<br>AAGCCCGGCGATGTTATTCAGCTTGGGGTTCAATTCGAC<br>ACCGGCAGAGGCGGGATGGCTCCAGTGGAGTATGTTGAG<br>CCCATACGGGAGGCTATTGCTTTCCTCGTAAAACAGGGT<br>ATCCATGTTGTCATGGCCTCCGGCAACGGGTCGAACGAC<br>GTCGACCAGTACCCGAGCTGTAACCGCGAGAGGGACAGC<br>GGCGCCATTTACGCATGCGCCATCGACCCTGAGTTTGGG<br>AGTCGCGCGAGCTTCACCAATTACGGCCATCGGTGCGAC<br>TTGTACGCCTGGGGCCTGGAGGTCTACACCACCGATTAC<br>GACCGCAAATATCCCGGTGTGCACAACCGGTACGACTTC<br>CACTCGGGCACGTCAGCGTCCAATCCGCTTCTGGCGGGC<br>GTCGTGGCTCTTCTTCAAGGCATTGCATTCGAAGAGGGT<br>CTCGGGGCCATCCCCCCTCTGAAGATGCGCGAAATCCTC<br>GTGAGAACCGCCCATAAACTCCCCAAAGCTACCCCTGGT<br>TATAACCTGTCTCTTATACACATCTGA (SEQ ID NO: 17) | MPRSLPSGKDPAVLRQ<br>EMLDHGLGLFREITVE<br>ESRVGEVVAALQSFPG<br>VETVQEELPIVVDDEI<br>EKRVSRSSSAEMGRSS<br>EGDNYRCKSKSQRNCQ<br>SYLADANDRHYNYNIG<br>GLNVYAVHERYPHNWG<br>KGVNLVSIEASFWDPE<br>HEDLPVQAKILNPPEW<br>KPDGHDTLSVGIMFAK<br>RNGKALTGIAVDATPM<br>YSMYGLKQLGNIIPLL<br>KPGDVIQLGVQFDTGR<br>GGMAPVEYVEPIREAI<br>AFLVKQGIHVVMASGN<br>GSNDVDQYPSCNRERD<br>SGAIYACAIDPEFGSR<br>ASFTNYGHRCDLYAWG<br>LEVYTTDYDRKYPGVH<br>NRYDFHSGTSASNPLL<br>AGVVALLQGIAFEEGL<br>GAIPPLKMREILVRTA<br>HKLPKATPGYNLSLIH<br>I (SEQ ID NO: 18) |
| GFP | ATGAGTAAAGGAGAAGAACTTTTCACTGGAGTTGTCCCA<br>ATTCTTGTTGAATTAGATGGTGATGTTAATGGGCACAAA<br>TTTTCTGTCAGTGGAGAGGGTGAAGGTGATGCAACATAC<br>GGAAAACTTACCCTTAAATTTATTTGCACTACTGGAAAA<br>CTACCTGTTCCATGGCCAACACTTGTCACTACTTTCTCT<br>TATGGTGTTCAATGCTTTTCAAGATACCCAGATCATATG<br>AAACGGCATGACTTTTTCAAGAGTGCCATGCCCGAAGGT<br>TATGTACAGGAAAGAACTATATTTTTCAAAGATGACGGG<br>AACTACAAGACACGTGCTGAAGTCAAGTTTGAAGGTGAT<br>ACCCTTGTTAATAGAATCGAGTTAAAAGGTATTGATTTT<br>AAAGAAGATGGAAACATTCTTGGACACAAATTGGAATAC<br>AACTATAACTCACACAATGTATATCATGGCAGACAAA<br>CAAAAGAATGGAATCAAAGTTAACTTCAAAATTAGACAC<br>AACATTGAAGATGGAAGCGTTCAACTAGCAGACCATTAT<br>CAACAAAATACTCCAATTGGCGATGGCCCTGTCCTTTTA<br>CCAGACAACCATTACCTGTCCACACAATCTGCCCTTTCG<br>AAAGATCCCAACGAAAAGAGAGACCACATGGTCCTTCTT<br>GAGTTTGTAACAGCTGCTGGGATTACACATGGCATGGAT<br>GAACTATACAAATAG (SEQ ID NO: 19) | MSKGEELFTGVVPILV<br>ELDGDVNGHKESVSGE<br>GEGDATYGKLTLKFIC<br>TTGKLPVPWPTLVTTF<br>SYGVQCFSRYPDHMKR<br>HDFFKSAMPEGYVQER<br>TIFFKDDGNYKTRAEV<br>KFEGDTLVNRIELKGI<br>DEKEDGNILGHKLEYN<br>YNSHNVYIMADKQKNG<br>IKVNFKIRHNIEDGSV<br>QLADHYQQNTPIGDGP<br>VLLPDNHYLSTQSALS<br>KDPNEKRDHMVLLEFV<br>TAAGITHGMDELYK<br>(SEQ ID NO: 20) |

After cultures were induced, a single weighted sterile poultry feather was aseptically added to the culture medium and submerged via mixing. Cultures were then returned to the incubator and allowed to ferment for three days at 30° C. GFP was used as an inert control gene to measure baseline cellular proteolytic activity against feather.

After fermentation all feather and visible pieces were removed from each culture and washed with water and diluted ethanol before being allowed to dry overnight. Final weights were taken after all feather and feather pieces had completely dried and the final weights recorded (FIG. 10; Table 6).

TABLE 6

Raw Data of Feather Weights.

| Initial Weight (g) | Gene | SEQ ID NO: | OD600 at induction | Final Weight (g) | Percent Degradation |
|---|---|---|---|---|---|
| 0.0345 | 41194 | 3 | 0.818 | 0.0319 | 7.50 |
| 0.035 | 41659 | 5 | 0.810 | 0.0271 | 22.50 |
| 0.035 | 43962 | 7 | 0.848 | 0.0289 | 17.40 |
| 0.035 | 44648 | 9 | 0.841 | 0.0277 | 20.80 |
| 0.035 | 45417 | 11 | 0.866 | 0.0305 | 12.80 |
| 0.34 | GFP | 19 | 0.882 | 0.0334 | 1.70 |
| 0.34 | 37927 | 17 | 0.867 | 0.0318 | 6.50 |
| 0.333 | 85625 | 15 | 0.820 | 0.0308 | 7.50 |

EXEMPLARY ASPECTS

The disclosure is also directed to the following exemplary aspects.

Aspect 1. A recombinant nucleic acid construct comprising: a nucleic acid molecule encoding a polypeptide having at least 90% sequence identity with the amino acid sequence, or fragment thereof, of SEQ ID NO:2; SEQ ID NO:4; SEQ ID NO:6; SEQ ID NO:8; SEQ ID NO:10; SEQ ID NO:12; SEQ ID NO:14; or SEQ ID NO:16.

Aspect 2. The recombinant nucleic acid construct according to the preceding aspect further comprising: a 5' DNA promoter sequence; and a 3' terminator sequence, wherein the nucleic acid molecule, the DNA promoter sequence, and the termination sequence are operatively coupled to permit transcription of the nucleic acid molecule.

Aspect 3. The recombinant nucleic acid construct according to aspect 1 or aspect 2, where the nucleic acid molecule encodes a polypeptide having at least 95% sequence identity with the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO: 16.

Aspect 4. The recombinant nucleic acid construct according to aspect 1 or aspect 2, where the nucleic acid molecule encodes a polypeptide having at least 98% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16.

Aspect 5. The recombinant nucleic acid construct according to aspect 1 or aspect 2, where the nucleic acid molecule encodes a polypeptide comprising the amino acid sequence, or fragment thereof, of SEQ ID NO:2; SEQ ID NO:4; SEQ ID NO:6; SEQ ID NO:8; SEQ ID NO:10; SEQ ID NO:12; SEQ ID NO:14; or SEQ ID NO:16.

Aspect 6. The recombinant nucleic acid construct according to aspect 1 or aspect 2, where the nucleic acid molecule comprises a nucleotide sequence having at least 75% sequence identity with the nucleotide sequence, or fragment thereof, of SEQ ID NO: 1; SEQ ID NO:3; SEQ ID NO:5; SEQ ID NO:7; SEQ ID NO:9; SEQ ID NO:11; SEQ ID NO:13; or SEQ ID NO:15.

Aspect 7. The recombinant nucleic acid construct according to aspect 1 or aspect 2, where the nucleic acid molecule comprises a nucleotide sequence having at least 85% sequence identity with the nucleotide sequence, or fragment thereof, of SEQ ID NO: 1; SEQ ID NO:3; SEQ ID NO:5; SEQ ID NO: 7; SEQ ID NO:9; SEQ ID NO: 11; SEQ ID NO: 13; or SEQ ID NO: 15.

Aspect 8. The recombinant nucleic acid construct according to aspect 1 or aspect 2, where the nucleic acid molecule comprises a nucleotide sequence having at least 95% sequence identity with the nucleotide sequence, or fragment thereof, of SEQ ID NO: 1; SEQ ID NO:3; SEQ ID NO:5; SEQ ID NO: 7; SEQ ID NO:9; SEQ ID NO:11; SEQ ID NO: 13; or SEQ ID NO:15.

Aspect 9. The recombinant nucleic acid construct according to aspect 1 or aspect 2, where the nucleic acid molecule comprises the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO:13; or SEQ ID NO:15.

Aspect 10. The recombinant nucleic acid construct according to aspect 2, where the promoter is heterologous to the nucleic acid molecule.

Aspect 11. The recombinant nucleic acid construct according to aspect 2, wherein the promoter is a bacterial promoter, a yeast promoter, a fungal promoter, an insect promoter, an algal promoter, a plant promoter, or a mammalian promoter.

Aspect 12. The recombinant nucleic acid construct according to any of aspects 1-11, where the encoded polypeptide or fragment of the polypeptide is capable of degrading keratin, or assisting in degrading keratin.

Aspect 13. An expression vector comprising the recombinant nucleic acid construct according to any one of aspects 1-12.

Aspect 14. A plasmid comprising the recombinant nucleic acid construct according to any one of aspects 1-12.

Aspect 15. The recombinant nucleic acid construct according to any one of aspects 1-12, the expression vector according to aspect 13, or the plasmid according to aspect 14, where the nucleic acid molecule encodes two or more of the polypeptide or fragment of the polypeptide.

Aspect 16. A host cell transformed with the recombinant nucleic acid construct according to any one of aspects 1-12 or 15, the expression vector according to aspect 13 or aspect 15, or the plasmid according to aspect 14 or aspect 15.

Aspect 17. The host cell according to aspect 16, where the host cell is a bacterial cell, fungal cell, an insect cell, an algal cell, a plant cell, or a mammalian cell.

Aspect 18. The host cell according to aspect 16, where the host cell is an *E. coli* cell, a *Lactobacillus* cell, a *Bacillus* cell, a microalgal cell, an *Aspergillus* cell, or a *Pichia* cell.

Aspect 19. The host cell according to aspect 16, wherein the host cell is a yeast cell.

Aspect 20. A keratin-degrading composition comprising: a polypeptide having at least 90% sequence identity with the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO:16, wherein the polypeptide is capable of degrading keratin or assisting in degrading keratin; and a carrier.

Aspect 21. The keratin-degrading composition according to aspect 20, where the polypeptide is a recombinant polypeptide.

Aspect 22. The keratin-degrading composition according to aspect 20 or aspect 21, where the composition comprises a polypeptide having at least 95% sequence identity with the amino acid sequence, or fragment thereof, of SEQ ID NO:2, SEQ ID NO:4; SEQ ID NO:6; SEQ ID NO:8; SEQ ID NO: 10; SEQ ID NO:12; SEQ ID NO: 14; or SEQ ID NO:16.

Aspect 23. The keratin-degrading composition according to aspect 20 or aspect 21, where the composition comprises a polypeptide having at least 98% sequence identity with the amino acid sequence, or fragment thereof, of SEQ ID NO:2, SEQ ID NO:4; SEQ ID NO:6; SEQ ID NO:8; SEQ ID NO: 10; SEQ ID NO:12; SEQ ID NO: 14; or SEQ ID NO:16.

Aspect 24. The keratin-degrading composition according to aspect 20 or aspect 21, where the composition comprises a polypeptide comprising the amino acid sequence, or fragment thereof, of SEQ ID NO:2, SEQ ID NO:4; SEQ ID NO:6; SEQ ID NO:8; SEQ ID NO: 10; SEQ ID NO: 12; SEQ ID NO: 14; or SEQ ID NO: 16.

Aspect 25. The keratin-degrading composition according to any one of aspects 20-24, where the composition comprises one or more of a cell of any one of aspects 16-19, or a cell extract derived from a cell of any one of aspects 16-19.

Aspect 26. The keratin-degrading composition according to any one of aspects 20-25, wherein the composition is a solid.

Aspect 27. The keratin-degrading composition according to any one of aspects 20-25, wherein the composition is in a solution.

Aspect 28. The keratin-degrading composition according to any one of aspects 20-25, wherein the carrier is an aqueous liquid.

Aspect 29. The keratin-degrading composition according to any of aspects 20-28, where the polypeptide degrades keratin or assists in degrading keratin at a temperature in the range of 20 to 42 degrees C.

Aspect 30. The keratin-degrading composition according to any of aspects 20-29, where the polypeptide degrades keratin or assists in degrading keratin at a pH range of pH 2.5 to pH 8.5.

Aspect 31. The keratin-degrading composition according to any of aspects 20-30, where the composition comprises a combination of two or more of the polypeptides.

Aspect 32. The keratin-degrading composition according to any of aspects 20-31, wherein the composition further comprises an agent that reduces disulfide bonds.

Aspect 33. A method of recombinantly producing a polypeptide comprising: transforming a host cell with a heterologous nucleic acid molecule, wherein the nucleic acid molecule encodes a polypeptide having at least 90% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16.

Aspect 34. The method according to aspect 33, where the nucleic acid molecule encodes a polypeptide having at least 95% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16.

Aspect 35. The method according to aspect 33, where the nucleic acid molecule encodes a polypeptide having at least 98% sequence identity with the amino acid sequence, or fragment thereof, of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16.

Aspect 36. The method according to aspect 33, where the nucleic acid molecule encodes a polypeptide comprising the amino acid sequence, or fragment thereof, of SEQ ID NO:2; SEQ ID NO:4; SEQ ID NO:6; SEQ ID NO:8; SEQ ID NO: 10; SEQ ID NO: 12; SEQ ID NO: 14; or SEQ ID NO:16.

Aspect 37. The method according to aspect 33, where the nucleic acid molecule comprises a nucleotide sequence having at least 75% sequence identity with the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO:13; SEQ ID NO:15.

Aspect 38. The method according to aspect 33, where the nucleic acid molecule comprises a nucleotide sequence having at least 85% sequence identity with the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO:13; or SEQ ID NO:15.

Aspect 39. The method according to aspect 33, where the nucleic acid molecule comprises a nucleotide sequence having at least 95% sequence identity with the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO: 13; or SEQ ID NO: 15.

Aspect 40. The method according to aspect 33, where the nucleic acid molecule comprises the nucleotide sequence, or fragment thereof, of SEQ ID NO:1; SEQ ID NO:3; SEQ ID NO:5; SEQ ID NO:7; SEQ ID NO:9; SEQ ID NO:11; SEQ ID NO: 13; or SEQ ID NO:15.

Aspect 41. The method according to any of aspects 33-40, where the encoded polypeptide or fragment of the polypeptide is capable of degrading keratin or assisting in degrading keratin.

Aspect 42. The method according to aspect 33, where the host cell is a bacterial cell, fungal cell, a yeast cell, an insect cell, an algal cell, a plant cell, or a mammalian cell.

Aspect 43. The method according to aspect 33, where the host cell is an *E. coli* cell, a *Lactobacillus* cell, a *Bacillus* cell, a microalgal cell, an *Aspergillus* cell, or a *Pichia* cell.

Aspect 44. The method according to aspect 33, where the host cell is a yeast cell.

Aspect 45. A polypeptide produced according to the method of any one of aspects 33-44.

Aspect 46. A method of degrading keratin, the method comprising: providing a keratin-degrading composition according to any of aspects 20-32; and contacting the keratin-degrading composition with a material comprising keratin under conditions effective to degrade the keratin.

Aspect 47. The method according to aspect 46, where the keratin is beta keratin.

Aspect 48. The method according to aspect 47, where the keratin is alpha keratin.

Aspect 49. The method according to aspect 46, where the material comprising keratin comprises skin, hair, wool, silk, nails, scales, fiber, leather, meat, and/or feathers.

Aspect 50. The method according to aspect 49, where the material comprising keratin comprises poultry feathers.

Although preferred aspects and embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A recombinant nucleic acid construct comprising:
   a nucleic acid molecule encoding a polypeptide having at least 90% sequence identity with the amino acid sequence of SEQ ID NO:2; SEQ ID NO:4; SEQ ID NO:6; SEQ ID NO:8; SEQ ID NO:10; SEQ ID NO:12; SEQ ID NO:14; or SEQ ID NO: 16.

2. The recombinant nucleic acid construct according to claim 1 further comprising:
   a 5' DNA promoter sequence; and
   a 3' terminator sequence, wherein the nucleic acid molecule, the DNA promoter sequence, and the termination sequence are operatively coupled to permit transcription of the nucleic acid molecule.

3. The recombinant nucleic acid construct according to claim 1, wherein the nucleic acid molecule encodes a polypeptide having at least 95% sequence identity with the amino acid sequence of SEQ ID NO:2; SEQ ID NO: 4; SEQ ID NO:6; SEQ ID NO:8; SEQ ID NO:10; SEQ ID NO:12; SEQ ID NO:14; or SEQ ID NO: 16.

4. The recombinant nucleic acid construct according to claim 1, wherein the nucleic acid molecule encodes a polypeptide having at least 98% sequence identity with the amino acid sequence of SEQ ID NO:2; SEQ ID NO: 4; SEQ ID NO:6; SEQ ID NO:8; SEQ ID NO: 10; SEQ ID NO: 12; SEQ ID NO: 14; or SEQ ID NO: 16.

5. The recombinant nucleic acid construct according to claim 1, wherein the nucleic acid molecule encodes a polypeptide comprising the amino acid sequence of SEQ ID NO:2; SEQ ID NO:4; SEQ ID NO:6; SEQ ID NO:8; SEQ ID NO: 10; SEQ ID NO:12; SEQ ID NO:14; or SEQ ID NO:16.

6. The recombinant nucleic acid construct according to claim 1, wherein the nucleic acid molecule comprises a nucleotide sequence having at least 75% sequence identity with the nucleotide sequence of SEQ ID NO:1; SEQ ID NO: 3; SEQ ID NO:5; SEQ ID NO:7; SEQ ID NO:9; SEQ ID NO: 11; SEQ ID NO: 13; or SEQ ID NO: 15.

7. The recombinant nucleic acid construct according to claim 1, wherein the nucleic acid molecule comprises a nucleotide sequence having at least 85% sequence identity with the nucleotide sequence of SEQ ID NO:1; SEQ ID NO: 3; SEQ ID NO:5; SEQ ID NO:7; SEQ ID NO:9; SEQ ID NO:11; SEQ ID NO: 13; or SEQ ID NO: 15.

8. The recombinant nucleic acid construct according to claim 1, wherein the nucleic acid molecule comprises a nucleotide sequence having at least 95% sequence identity with the nucleotide sequence of SEQ ID NO:1; SEQ ID NO: 3; SEQ ID NO:5; SEQ ID NO:7; SEQ ID NO:9; SEQ ID NO:11; SEQ ID NO:13; or SEQ ID NO: 15.

9. The recombinant nucleic acid construct according to claim 1, wherein the nucleic acid molecule comprises the nucleotide sequence of SEQ ID NO:1; SEQ ID NO:3; SEQ ID NO:5; SEQ ID NO:7; SEQ ID NO:9; SEQ ID NO:11; SEQ ID NO:13; or SEQ ID NO:15.

10. The recombinant nucleic acid construct according to claim 2, wherein the promoter is heterologous to the nucleic acid molecule.

11. The recombinant nucleic acid construct according to claim 2, wherein the promoter is a bacterial promoter, a yeast promoter, a fungal promoter, an insect promoter, an algal promoter, a plant promoter, or a mammalian promoter.

12. The recombinant nucleic acid construct according to claim 1, wherein the encoded polypeptide is capable of degrading keratin, or assisting in degrading keratin.

13. An expression vector comprising the recombinant nucleic acid construct according to claim 1.

14. A plasmid comprising the recombinant nucleic acid construct according to claim 1.

15. The recombinant nucleic acid construct according to claim 1, wherein the nucleic acid molecule encodes two or more of the polypeptides.

16. A host cell transformed with the recombinant nucleic acid construct according to claim 1.

17. A keratin-degrading composition comprising:
a polypeptide having at least 90% sequence identity with the amino acid sequence of SEQ ID NO:2, SEQ ID NO:4; SEQ ID NO:6; SEQ ID NO:8; SEQ ID NO:10; SEQ ID NO:12; SEQ ID NO:14; or SEQ ID NO:16, wherein the polypeptide is capable of degrading keratin or assisting in degrading keratin; and
a carrier.

18. A method of recombinantly producing a polypeptide comprising:
transforming a host cell with a heterologous nucleic acid molecule, wherein the nucleic acid molecule encodes a polypeptide having at least 90%, at least 95%, or at least 98% sequence identity with the amino acid sequence of SEQ ID NO:2; SEQ ID NO: 4; SEQ ID NO:6; SEQ ID NO:8; SEQ ID NO: 10; SEQ ID NO:12; SEQ ID NO: 14; or SEQ ID NO: 16.

19. A polypeptide produced according to the method of claim 18.

20. A method of degrading keratin, the method comprising:
providing a keratin-degrading composition according to claim 17;
contacting the keratin-degrading composition with a material comprising keratin under conditions effective to degrade the keratin.

21. The host cell according to claim 16, wherein the host cell is a bacterial cell, fungal cell, an insect cell, an algal cell, a plant cell, or a mammalian cell.

22. The host cell according to claim 16, wherein the host cell is an *E. coli* cell, a *lactobacillus* cell, a *bacillus* cell, a microalgal cell, an *Aspergillus* cell, or a *Pichia* cell.

23. The host cell according to claim 16, wherein the host cell is a yeast cell.

24. The keratin-degrading composition according to claim 17, wherein the polypeptide is a recombinant polypeptide.

25. The keratin-degrading composition according to claim 17, wherein the composition comprises a polypeptide having at least 95% sequence identity with the amino acid sequence of SEQ ID NO:2, SEQ ID NO:4; SEQ ID NO:6; SEQ ID NO:8; SEQ ID NO: 10; SEQ ID NO: 12; SEQ ID NO:14; or SEQ ID NO:16.

26. The keratin-degrading composition according to claim 17, wherein the composition comprises a polypeptide having at least 98% sequence identity with the amino acid sequence of SEQ ID NO:2, SEQ ID NO:4; SEQ ID NO:6; SEQ ID NO:8; SEQ ID NO: 10; SEQ ID NO: 12; SEQ ID NO:14; or SEQ ID NO:16.

27. The keratin-degrading composition according to claim 17, wherein the composition comprises a polypeptide comprising the amino acid sequence of SEQ ID NO:2, SEQ ID NO:4; SEQ ID NO:6; SEQ ID NO:8; SEQ ID NO:10; SEQ ID NO:12; SEQ ID NO:14; or SEQ ID NO:16.

28. The keratin-degrading composition according to claim 17, wherein the composition comprises one or more of a cell of claim 16, or a cell extract derived from a cell of claim 16.

29. The keratin-degrading composition according to claim 17, wherein the polypeptide degrades keratin or assists in degrading keratin at a temperature in the range of 20 to 42 degrees C.

30. The keratin-degrading composition according to claim 17, wherein the polypeptide degrades keratin or assists in degrading keratin at a pH range of pH 2.5 to pH 8.5.

31. The keratin-degrading composition according to claim 17, wherein the composition comprises a combination of two or more of the polypeptides.

32. The keratin-degrading composition according to claim 17, wherein the composition further comprises an agent that reduces disulfide bonds.

33. The method according to claim 18, wherein the encoded polypeptide is capable of degrading keratin or assisting in degrading keratin.

34. The method according to claim 18, wherein the host cell is a bacterial cell, a fungal cell, a yeast cell, an insect cell, an algal cell, a plant cell, or a mammalian cell.

35. The method according to claim 18, wherein the host cell is an *E. coli* cell, a *Lactobacillus* cell, a *Bacillus* cell, a microalgal cell, an *Aspergillus* cell, or a *Pichia* cell.

36. The method according to claim 18, wherein the host cell is a yeast cell.

37. The method according to claim 20, wherein the keratin is beta keratin.

38. The method according to claim 20, wherein the keratin is alpha keratin.

39. The method according to claim 20, wherein the material comprising keratin comprises skin, hair, wool, silk, nails, scales, fiber, leather, meat, and/or feathers.

40. The method according to claim 39, wherein the material comprising keratin comprises poultry feathers.

* * * * *